(12) United States Patent
Driever et al.

(10) Patent No.: US 9,116,789 B2
(45) Date of Patent: *Aug. 25, 2015

(54) CHAINING MOVE SPECIFICATION BLOCKS

(75) Inventors: Peter D. Driever, Poughkeepsie, NY (US); Steven G. Glassen, Wallkill, NY (US); Kenneth J. Oakes, Wappingers Falls, NY (US); Peter G. Sutton, Lagrangeville, NY (US); Peter K. Szwed, Rhinebeck, NY (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 481 days.

This patent is subject to a terminal disclaimer.

(21) Appl. No.: 13/157,723

(22) Filed: Jun. 10, 2011

(65) Prior Publication Data

US 2012/0317392 A1 Dec. 13, 2012

(51) Int. Cl.
*G06F 12/02* (2006.01)

(52) U.S. Cl.
CPC ........ *G06F 12/0215* (2013.01); *G06F 12/0246* (2013.01)

(58) Field of Classification Search
CPC ... G06F 12/0215; G06F 9/26; G06F 9/30043; G06F 12/0246; G06F 13/16
USPC .......... 711/104, 165, 213, E12.001, E12.002
See application file for complete search history.

(56) References Cited

U.S. PATENT DOCUMENTS

| | | |
|---|---|---|
| 4,797,812 A | 1/1989 | Kihara |
| 5,377,337 A | 12/1994 | Antognini et al. |
| 5,442,802 A | 8/1995 | Brent et al. |
| 5,459,864 A | 10/1995 | Brent et al. |
| 5,461,721 A | 10/1995 | Cormier et al. |
| 5,526,484 A | 6/1996 | Casper et al. |
| 5,551,013 A | 8/1996 | Beausoleil et al. |
| 5,574,873 A | 11/1996 | Davidian |
| 5,584,042 A | 12/1996 | Cormier et al. |
| 5,613,163 A | 3/1997 | Marron et al. |
| 5,659,786 A | 8/1997 | George et al. |
| 5,784,702 A | 7/1998 | Greenstein et al. |

(Continued)

FOREIGN PATENT DOCUMENTS

| | | |
|---|---|---|
| CN | 1889030 A | 1/2007 |
| EP | 0549924 A1 | 7/1993 |

(Continued)

OTHER PUBLICATIONS

International Search Report and Written Opinion for PCT/EP2012/059862 dated May 25, 2012.

(Continued)

*Primary Examiner* — Edward Dudek, Jr.
*Assistant Examiner* — Ralph A Verderamo, III
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

An abstraction for storage class memory is provided that hides the details of the implementation of storage class memory from a program, and provides a standard channel programming interface for performing certain actions, such as controlling movement of data between main storage and storage class memory or managing storage class memory.

17 Claims, 25 Drawing Sheets

(56) References Cited

U.S. PATENT DOCUMENTS

| | | |
|---|---|---|
| 5,790,825 A | 8/1998 | Traut |
| 5,937,423 A | 8/1999 | Robinson |
| 5,944,797 A | 8/1999 | Gregg et al. |
| 6,009,261 A | 12/1999 | Scalzi et al. |
| 6,266,783 B1 | 7/2001 | Allen et al. |
| 6,308,255 B1 | 10/2001 | Gorishek, IV et al. |
| 6,463,582 B1 | 10/2002 | Lethin et al. |
| 7,373,378 B2 | 5/2008 | Bauman et al. |
| 7,627,781 B2 | 12/2009 | Michaelis et al. |
| 7,809,918 B1 | 10/2010 | Samuel |
| 7,844,756 B2 | 11/2010 | Cannon et al. |
| 2003/0188119 A1 | 10/2003 | Lubbers et al. |
| 2006/0052985 A1 | 3/2006 | Ito et al. |
| 2006/0179358 A1 | 8/2006 | Cordero et al. |
| 2006/0236048 A1 | 10/2006 | Deguchi et al. |
| 2007/0094456 A1 | 4/2007 | Matsui et al. |
| 2007/0168713 A1 | 7/2007 | Kern et al. |
| 2007/0260608 A1 | 11/2007 | Hertzberg et al. |
| 2008/0126725 A1 | 5/2008 | Morishita et al. |
| 2008/0172672 A1 | 7/2008 | Logan et al. |
| 2008/0189560 A1 | 8/2008 | Case et al. |
| 2008/0229045 A1 | 9/2008 | Qi |
| 2008/0270821 A1 | 10/2008 | Cordero et al. |
| 2009/0024653 A1 | 1/2009 | Ng et al. |
| 2009/0198908 A1 | 8/2009 | Arimilli et al. |
| 2009/0210563 A1 | 8/2009 | Flanagan et al. |
| 2009/0216519 A1 | 8/2009 | Parthasarathy et al. |
| 2010/0058021 A1 | 3/2010 | Kawamura |
| 2010/0161882 A1 | 6/2010 | Stern et al. |
| 2010/0186014 A1* | 7/2010 | Vaghani et al. ............... 718/101 |
| 2011/0047331 A1 | 2/2011 | Kasako |
| 2011/0060887 A1 | 3/2011 | Thatcher et al. |
| 2011/0113159 A1 | 5/2011 | Casper et al. |
| 2011/0219141 A1 | 9/2011 | Coile et al. |
| 2011/0320644 A1 | 12/2011 | Craddock et al. |
| 2012/0317350 A1 | 12/2012 | Driever et al. |
| 2012/0317375 A1 | 12/2012 | Driever et al. |
| 2012/0317385 A1 | 12/2012 | Driever et al. |
| 2012/0317386 A1 | 12/2012 | Driever et al. |
| 2012/0317388 A1 | 12/2012 | Driever et al. |
| 2012/0317390 A1 | 12/2012 | Bickelman et al. |
| 2012/0317391 A1 | 12/2012 | Driever et al. |
| 2012/0317393 A1 | 12/2012 | Driever et al. |
| 2012/0317445 A1 | 12/2012 | Driever et al. |
| 2013/0042062 A1 | 2/2013 | Bickelman et al. |
| 2013/0111155 A1 | 5/2013 | Driever et al. |
| 2013/0111162 A1 | 5/2013 | Driever et al. |
| 2013/0111173 A1 | 5/2013 | Driever et al. |
| 2013/0111174 A1 | 5/2013 | Driever et al. |
| 2013/0111178 A1 | 5/2013 | Driever et al. |
| 2013/0111179 A1 | 5/2013 | Driever et al. |
| 2013/0111185 A1 | 5/2013 | Driever et al. |
| 2013/0117642 A1 | 5/2013 | Driever et al. |

FOREIGN PATENT DOCUMENTS

| | | |
|---|---|---|
| JP | H09282169 A | 10/1997 |
| JP | 2006277737 A | 10/2006 |
| JP | 2007066129 A | 3/2007 |
| JP | 4746699 B1 | 8/2011 |
| WO | WO2011010344 A1 | 1/2011 |

OTHER PUBLICATIONS

International Search Report and Written Opinion for PCT/EP2012/058674 dated Sep. 6, 2012.

Z/Architecture Principles of Operation, IBM Publication No. SA22-7832-08, Aug. 2010.

International Search Report and Written Opinion for PCT/EP2012/058676 dated Sep. 10, 2012.

International Search Report and Written Opinion for PCT/EP2012/059857 dated Sep. 27, 2012, pp. 1-8.

International Search Report and Written Opinion for PCT/EP2012/059859 dated Sep. 27, 2012. pp. 1-8.

International Search Report and Written Opinion for PCT/EP2012/059855 dated Oct. 9, 2012, pp. 1-8.

International Search Report and Written Opinion for PCT/EP2012/059861 dated Oct. 22, 2012, pp. 1-9.

Office Action for U.S. Appl. No. 13/719,327 dated Mar. 22, 2013, pp. 1-14.

Office Action for U.S. Appl. No. 13/157,729 dated Mar. 25, 2013, pp. 1-19.

Office Action for U.S. Appl. No. 13/719,947 dated Apr. 1, 2013, pp. 1-15.

Office Action for U.S. Appl. No. 13/157,704 dated Apr. 2, 2013, pp. 1-25.

Fang, et al., "High Performance Database Logging Using Storage Class Memory," (ICDE), 2011 IEEE 27th International Conference on Data Engineering, Apr. 2011, pp. 1221-1231.

Office Action for U.S. Appl. No. 13/719,291 dated Apr. 4, 2013, pp. 1-13.

Communication for PCT/IB2012052558 dated May 10, 2013, pp. 1-7.

"z/Architecture Principles of Operation," IBM Publication No. SA22-7832-08, Aug. 2010, pp. 1-1496.

International Search Report and Written Opinion for PCT/EP2012/059862 dated Jul. 25, 2012, pp. 1-8.

International Search Report and Written Opinion for PCT/EP2012/058674 dated Sep. 6, 2012, pp. 1-11.

International Search Report and Written Opinion for PCT/EP2012/059675 dated Oct. 24, 2012, pp. 1-11.

"IBM System/360 and System/370 I/O Interface Channel to Control Unit Original Equipment Manufacturers' Information Systems," IBM Publication No. GA22-6974-4, Jan. 1978, 61 pages.

Final Office Action for U.S. Appl. No. 13/157,704 dated Sep. 6, 2013, pp. 1-22.

Final Office Action for U.S. Appl. No. 13/719,947 dated Sep. 6, 2013, pp. 1-13.

Tallman, P.H., "Enterprise System Architecture/390 ESCON I/O Interface," SA22-7202-01, Oct. 1990, pp. 1-190.

Communication Pursuant to Article 94(3) EPC for Application No. 12 724 326.9-1957, dated Nov. 8, 2013, pp. 1-6.

Driever et al., "Configure Storage Class Memory Command," U.S. Appl. No. 14/135,669, filed Dec. 20, 2013, 128 pages.

Communication Pursuant to Article 94(3) EPC for Application No. 12 724 327.7 —1953, dated Jan. 30, 2014, pp. 1-5.

Examination Report under Section 18(3) for Application No. GB140048.3, dated Jan. 29, 2014, pp. 1-3.

Office Action for U.S. Appl. No. 13/157,684 dated Mar. 13, 2014, pp. 1-21.

Office Action for U.S. Appl. No. 13/722,721 dated Mar. 13, 2014, pp. 1-15.

Office Action for U.S. Appl. No. 13/716,370 dated Mar. 25, 2014, pp. 1-24.

Burr, Geoffrey W., "Storage Class Memory," Non-volatile Memories Workshop 2010 [online], Apr. 2010 [retrieved on Mar. 20, 2014]. Retrieved from the Internet: <URL: http://nvmw.ucsd.edu/2010/documents/Burr_Geoggrey.pdf>.

Schmidt, Douglas C., "Asynchronous Completion Token," [online], 1999 (no further date information available) [retrieved on Mar. 3, 2014], Retrieved from the internet: <URL: http://www.CS.wustl.edu/~schmidt/PDF/ACT.pdf>.

Office Action for U.S. Appl. No. 13/157,706 dated Mar. 26, 2014, pp. 1-38.

Office Action for U.S. Appl. No. 13/722,838 dated Mar. 26, 2014, pp. 1-19.

Office Action for U.S. Appl. No. 13/157,709 dated Mar. 26, 2014, pp. 1-22.

Office Action for U.S. Appl. No. 13/157,710 dated Apr. 14, 2014, pp. 1-21.

Office Action for U.S. Appl. No. 13/718,674 dated Apr. 14, 2014, pp. 1-21.

Communication Pursuant to Article 94(3) EPC for Application No. 12722110.9 1953, dated May 8, 2014, pp. 1-6.

(56) References Cited

OTHER PUBLICATIONS

Kimura, Masahide et al., "Flash Memory Crisis in the Final Time of Fallen Championship," Nikkei Electronics, Nikkei Business Publications, Inc., No. 1049, Feb. 2, 2011, pp. 38-59 (No English Translation Available).

"Information Materials for IDS", dated May 2, 2014 (2 pages).

Final Office Action for U.S. Appl. No. 13/716,370 dated Sep. 5, 2014, 22 pages.

Final Office Action for U.S. Appl. No. 13/157,706 dated Sep. 8, 2014, 32 pages.

Office Action for U.S. Appl. No. 13/157,735 dated Sep. 29, 2014, 27 pages.

Office Action for U.S. Appl. No. 13/157,717 dated Oct. 2, 2014, 21 pages.

Office Action for U.S. Appl. No. 13/719,378 dated Oct. 10, 2014, 24 pages.

Office Action for U.S. Appl. No. 13/718,809 dated Oct. 10, 2014, 25 pages.

Communication Pursuant to Article 94(3) EPC for 12722110.9-1953 dated Nov. 25, 2014, 4 pages.

Examination Report under Section 18(3) for GB1320846.7 dated Nov. 14, 2014, 3 pages.

* cited by examiner

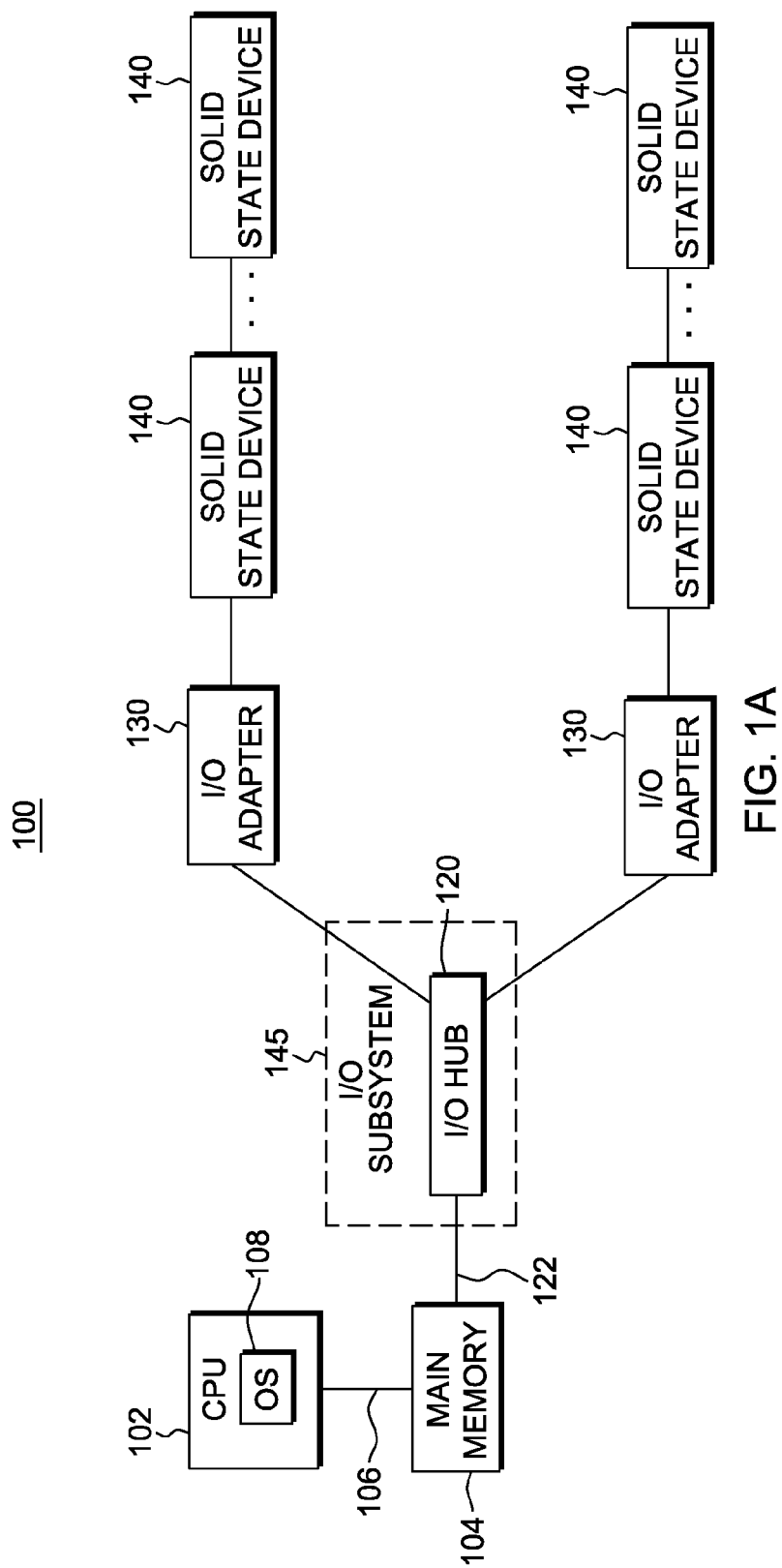

CHAINING MOVE SPECIFICATION BLOCKS

BACKGROUND

One or more aspects of the present invention relate, in general, to auxiliary storage of a computing environment, and in particular, to managing aspects of auxiliary storage.

A computing environment may include main storage (a.k.a., main memory), as well as auxiliary storage. Main storage is storage accessible to a processor which is randomly addressable by, for instance, an absolute address. Main storage is considered fast access storage compared to auxiliary storage, such as direct access storage devices (DASD) or storage class memory. Further, the addressing of main storage is considered simpler than the addressing of DASD or storage class memory.

Storage class memory, which is an external storage space outside of classical main storage, provides faster access than direct access storage devices. Unlike DASD, storage class memory is not typically implemented as mechanical-arm spinning disks, but instead, non-mechanical solid state parts. Typically, storage class memory is implemented as groups of solid state devices connected to a computing system via several input/output (I/O) adapters, which are used to map technology of an I/O device to the memory bus of the central processing unit(s).

BRIEF SUMMARY

The shortcomings of the prior art are overcome and advantages are provided through the provision of a computer program product for executing a Start Subchannel instruction in a computing environment comprising main storage and storage class memory. The computer program product includes a computer readable storage medium readable by a processing circuit and storing instructions for execution by the processing circuit for performing a method. The method includes, for instance, responsive to determining that a subchannel identified by the Start Subchannel instruction is an Asynchronous Data Mover (ADM) subchannel, performing: obtaining an operation request block from main storage, the operation request block comprising an address of an operation block; based on the address of the operation block, obtaining the operation block from main storage, the operation block consisting of a request block, a response block, and one or more first move specification blocks (MSBs), wherein the request block comprises an MSB count field having a value indicating the number of one or more first MSBs included in and referenced by the operation block, wherein the response block is configured to hold exception conditions, wherein each first move specification block is configured to include a first operation code field, a first block count field, a first main storage address field, a first storage class memory address field, a first block size field and a first flags field; obtaining a first move specification block of the one or more first move specification blocks, wherein the first flags field of the first move specification block comprises a branch-to-next MSB (BNM) indicator; responsive to the BNM indicator having a first BNM value, performing an operation based on a first operation code in the obtained first move specification block, the operation being performed on a number of blocks of storage class memory of a size determined by the first block size field, wherein the number of blocks is determined from the first block count field; and responsive to the BNM indicator having a second BNM value: branching to a second MSB located at an address specified by the first main storage address field of the first MSB, wherein the second MSB includes a second block size field, a second block count field and a second operation code; and performing an operation based on the second operation code in the obtained second MSB, the operation being performed on a number of blocks of storage class memory of a size determined by the second block size field, wherein the number of blocks is determined from the second block count field.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 1A depicts one embodiment of a computing environment to incorporate and use one or more aspects of the present invention;

DETAILED DESCRIPTION

Figure 1B:
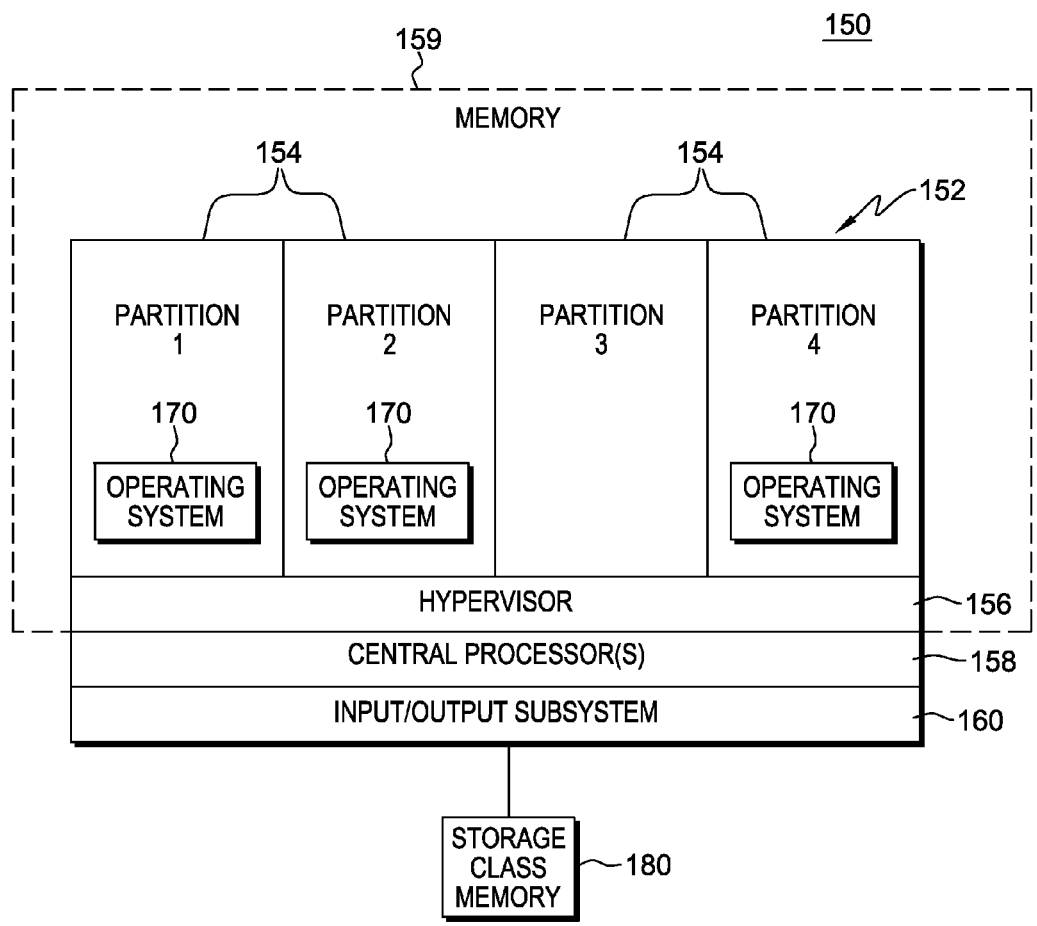
FIG. 1B depicts another embodiment of a computing environment to incorporate and use one or more aspects of the present invention.

In accordance with one or more embodiments, an abstraction for storage class memory is provided that hides the details of the implementation of storage class memory from a program (e.g., operating system), and provides a standard channel programming interface for performing certain actions, such as controlling movement of data between main storage and storage class memory.

In one example, a facility is provided, referred to as an Extended Asynchronous Data Mover (EADM) Facility, which allows programs to request the transfer of blocks of data between main storage and storage class memory, as well as request other operations. Aspects of this facility are described in detail below.

Further, associated with the EADM Facility is an optional facility referred to as an EADM Release Facility. When installed, the EADM Release Facility provides a means for the program to specify that it no longer requires the retention of the data in one or more blocks of storage class memory. It is model dependent whether the release operation is supported for all blocks of storage class memory or for only a subset of the storage class memory.

Once a block of storage class memory has been released, the program may transfer new data into the block, otherwise subsequent requests to transfer data from the block to main storage will be unsuccessful.

One embodiment of a computing environment to incorporate and/or use one or more aspects of the present invention is described with reference to FIG. 1A. Computing environment 100 is based, for instance, on the z/Architecture® offered by International Business Machines Corporation (IBM®), Armonk, N.Y. An embodiment of the z/Architecture® is described in an IBM® publication entitled "z/Architecture Principles of Operation," IBM Publication No. SA22-7832-08, August 2010, which is hereby incorporated herein by reference in its entirety. In one example, a computing environment based on the z/Architecture® includes the zEnterprise 196 (z196) system offered by International Business Machines Corporation. IBM® and z/Architecture® are registered trademarks, and zEnterprise 196 and z196 are trademarks of International Business Machines Corporation, Armonk, N.Y., USA. Other names used herein may be registered trademarks, trademarks or product names of International Business Machines Corporation or other companies.

As one example, computing environment 100 includes one or more central processing units 102 coupled to main memory 104 via one or more buses 106. One or more of the central processing units may execute an operating system 108, such as the z/OS® operating system offered by International Business Machines Corporation. In other examples, one or more of the central processing units may execute other operating systems or no operating system. z/OS® is a registered trademark of International Business Machines Corporation, Armonk, N.Y., USA.

Central processing units 102 and main memory 104 may be further coupled to an I/O hub 120 via one or more connections 122 (e.g., buses or other connections). The I/O hub provides connectivity to one or more I/O adapters 130, which are further coupled to one or more solid state devices 140. The adapters and solid state devices are an implementation of storage class memory (e.g., flash memory). The I/O hub is part of an I/O subsystem 145 facilitating one or more aspects of an embodiment.

In a further embodiment, as depicted in FIG. 1B, a computing environment 150 may include a central processing complex (CPC) 152, which is based on the z/Architecture® offered by International Business Machines Corporation. Central processor complex 152 includes, for instance, one or more partitions 154, a hypervisor 156, one or more central processors 158, and one or more components of an input/output subsystem 160. In this example, partitions 154 are logical partitions (e.g., LPARs), each of which includes a set of the system's hardware resources, virtualized as a separate system.

Each logical partition 154 is capable of functioning as a separate system. That is, each logical partition can be independently reset, initially loaded with an operating system or other control code, if desired, and operate with different programs. An operating system or application program running in a logical partition appears to have access to a full and complete system, but in reality, only a portion of it is available. A combination of hardware and licensed internal code (LIC), referred to as firmware, keeps a program in one logical partition from interfering with a program in a different logical partition. This allows several different logical partitions to operate on a single or multiple physical processors in a time-slice manner. As used herein, firmware includes, e.g., the microcode, millicode and/or macrocode of the processor (or entity performing the processing). It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In this example, several of the logical partitions have a resident operating system (OS) 170, which may differ for one or more logical partitions. In one embodiment, at least one logical partition is executing the z/OS® operating system, offered by International Business Machines Corporation, Armonk, N.Y.

Logical partitions 154 are managed by hypervisor 156, which is implemented by firmware running on central processors 158. Logical partitions 154 and hypervisor 156 each comprises one or more programs residing in respective portions of main memory 159 associated with the central processors. One example of hypervisor 156 is the Processor Resource/Systems Manager (PR/SM™), offered by International Business Machines Corporation, Armonk, N.Y.

Central processors 158 are physical processor resources that are allocated to the logical partitions. For instance, a logical partition 154 includes one or more logical processors, each of which represents all or a share of a physical processor resource 158 allocated to the partition. The logical processors of a particular partition 154 may be either dedicated to the partition, so that the underlying processor resource is reserved for that partition; or shared with another partition, so that the underlying processor resource is potentially available to another partition.

Input/output subsystem 160 (of which only a portion is depicted) provides connectivity to storage class memory 180. In this example, an address space is provided for the storage class memory which presents the memory as flat, hiding the details of the physical implementation from the program. As one example, there is one address space system-wide for the storage class memory, but from the view of a configuration (e.g., LPAR or in another embodiment, a virtualized guest) there is one address space into which storage class memory increments are populated for each configuration of the system. The storage class memory address space is separate and apart from the main storage address space.

In one particular example of the z/Architecture®, the I/O subsystem includes a channel subsystem, which, not only directs the flow of information between I/O peripheral control units (and devices) and main memory, but also between the storage class memory and main memory. However, the I/O subsystem may be other than a channel subsystem.

In the case of a channel subsystem, subchannels are used to perform EADM operations. These subchannels are referred to as Asynchronous Data Mover (ADM)-type subchannels and are associated with EADM operations, and not I/O devices, like other I/O-type subchannels. An ADM-type subchannel does not contain a device number, nor does it contain channel path information. The number of ADM-type subchannels provided for a configuration is model dependent. ADM-type subchannels are addressed by a subsystem identification word (SID).

The ADM-type subchannels are used by the Extended Asynchronous Data Mover Facility, which is an extension to the channel subsystem. As described herein, the EADM Facility allows a program to request the transfer of blocks of data between main storage and storage class memory, as well as perform other operations, such as clear a block of storage class memory or release a block of storage class memory. In one embodiment, when the EADM Facility is installed:

One or more ADM-type subchannels are provided which are used for EADM operations.

EADM operations are designated by a specified EADM-operation block (AOB). The AOB includes an EADM-request block (ARQB) and an EADM-response block (ARSB), and designates a list of EADM move-specification blocks (MSBs). For a move operation, the MSBs contain information about the blocks of data to be moved, such as the size of the blocks, the source and destination locations of the blocks, and the direction of the data movement.

The maximum number of MSBs that may be specified by an AOB is model dependent. The maximum count of blocks that an MSB may specify to be moved or operated on is also model dependent.

A program initiates EADM operations by issuing a Start Subchannel instruction that designates an ADM-type subchannel and an EADM operation request block (ORB). In turn, the EADM ORB designates an AOB. The instruction passes the contents of the EADM ORB to the designated subchannel.

When Start Subchannel is issued to initiate EADM operations, the channel subsystem asynchronously performs the specified operation.

As observed by the program, storage class memory appears to be block concurrent at a model dependent minimum block size. This model dependent value is called the SCM block concurrency size.

When EADM operations are complete, an I/O interruption is made pending to the program for the ADM-type subchannel on which the operations were initiated.

The EADM ORB includes the specification of a subchannel key and the address of the AOB to be used. The AOB is designated, for instance, on a 4 K-byte boundary and may be up to 4 K-byte in size. If more MSBs are needed than fit into a 4 K-byte AOB, the AOB may specify an MSB list that is extended into additional storage areas by using MSBs that designate the address of the next MSB in the list, instead of designating a storage area to be used for data transfer.

The first EADM operation is started by the channel subsystem using information in the designated EADM ORB and ARQB in the designated AOB to fetch an MSB. The MSB includes the information that specifies and controls the EADM operation to be processed.

Each EADM operation is represented by one MSB. An MSB may specify, for instance, a transfer of blocks of data from main storage to storage class memory; a transfer of blocks of data from storage class memory to main storage; a clearing of blocks of storage class memory; and the releasing of blocks of storage class memory.

If the blocks of storage to be transferred are not contiguous in main storage, a new MSB may be used or the MSB may use indirect addressing by specifying a list of EADM indirect data address words (AIDAWs) to designate the noncontiguous blocks.

Since an MSB specifies the transfer of data in only one direction, a new MSB is to be used when there is a change in the direction of the transfer.

The conclusion of an EADM operation is normally indicated by the combined status conditions of channel end and device end. This status combination represents the combination of primary and secondary status indicating that the subchannel is available for another start function after the status is cleared.

An EADM operation may be terminated prematurely by a Clear Subchannel instruction. Execution of the Clear Subchannel instruction terminates execution of the AOB at the subchannel, clears the subchannel of indications of the AOB in execution, and asynchronously performs the clear function.

Further details regarding the EADM ORB and related control structures are described below with reference to FIGS. 2A-2F. Initially, referring to FIG. 2A, one embodiment of an EADM ORB is described.

As one example, an EADM ORB 200 includes:

Interruption Parameter 202: This field is preserved unmodified in the subchannel until replaced by a subsequent Modify Subchannel or Start Subchannel instruction. These bits are placed in the I/O interruption code when an I/O interruption occurs for the subchannel and when an interruption request is cleared by the execution of, for instance, a Test Pending Interruption.

Subchannel Key 204: This field forms the subchannel key for the EADM operations specified by the ARQB and applies to fetching of the ARQB, fetching MSBs, storing of the ARSB, and for accessing main storage for data transfer. The value of this field is a defined value; otherwise, either a program check condition is recognized by the channel subsystem or an operand exception is recognized.

ORB Extension Control (X) 205: This field specifies whether the ORB is extended. This field is a specified value when an ADM-type subchannel is designated; otherwise, either an operand exception or a program check condition is recognized.

EADM Operation Block (AOB) Address 206: This field specifies an address of the EADM operation block (AOB). If certain bits of this field do not include a defined value, then either an operand exception or a program check condition is recognized.

If this field designates a location protected against fetching or designates a location outside of the configuration, the start function is not initiated. In this case, the subchannel becomes status pending with primary, secondary and alert status.

Channel Subsystem (CSS) Priority 208: This field includes a channel subsystem priority number that is assigned to the designated subchannel and used to order the selection of ADM-type subchannels when a start function is to be initiated for one or more subchannels that are start pending.

Storage Class Memory (SCM) Priority 210: This field includes a storage class memory priority (SCM) number that specifies the priority level that is applied to all EADM operations associated with the start function.

It is model dependent whether the contents of SCM priority field are recognized by the EADM Facility. On models that do not recognize this field, the field contents are ignored and all EADM operations associated with the start function are assigned an implicit priority number.

Format (FMT) 212: This field specifies the layout of the ORB. This field is to include a specified value when an ADM-type subchannel is designated; otherwise, an operand exception is recognized or a particular condition code is set.

The EADM operation block (AOB) specified by EADM AOB address 206 of the EADM ORB includes the information used to invoke EADM operations. An AOB is allocated, in one example, on a 4 K-byte boundary and is variable in length.

Figure 2A:
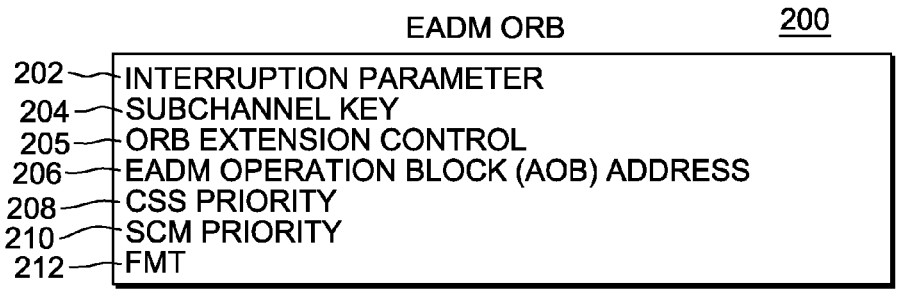
FIG. 2A depicts one embodiment of an Extended Asynchronous Data Mover operation request block used in accordance with an aspect of the present invention.
Figure 2B:
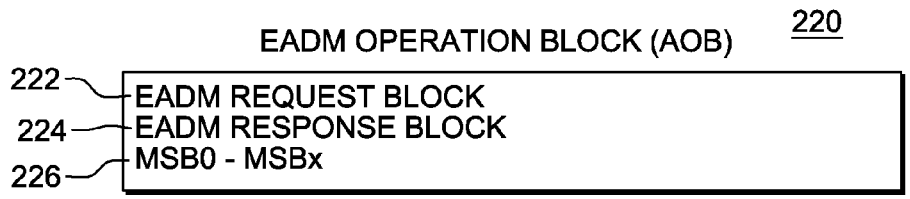
FIG. 2B depicts one embodiment of an Extended Asynchronous Data Mover operation block used in accordance with an aspect of the present invention.

In one example, as shown in FIG. 2B, an EADM AOB 220 includes three sections: an EADM request block (ARQB) 222; an EADM response block (ARSB) 224; and an MSB area 226 containing up to a defined number (e.g., 124) of MSBs. The ARQB may specify the use of more than the defined MSBs, however, when using MSB branching (that is, by using the branch to next MSB flag in the MSB).

Figure 2C:
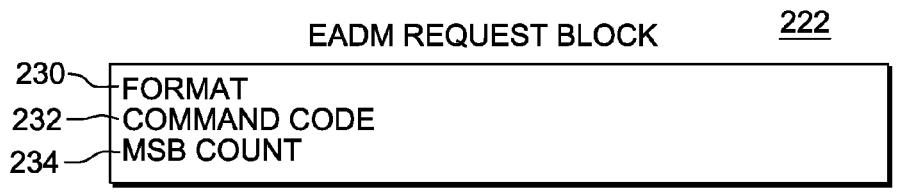
FIG. 2C depicts one embodiment of an Extended Asynchronous Data Mover request block used in accordance with an aspect of the present invention.

One embodiment of an EADM request block (ARQB) 222 is described with reference to FIG. 2C. In one example, ARQB 222 includes:

Format (FMT) 230: This field specifies the layout of ARQB. The value of this field is a defined value; otherwise, a program check condition is recognized by the channel subsystem and a command code error is indicated in the exception qualifier code field of the ARSB.

Command Code 232: This field is to specify the EADM move blocks command; otherwise, a program check condition is recognized by the channel subsystem and a command code error is indicated in the exception qualifier code field of the ARSB.

MSB Count 234: This field specifies a count of MSBs that compose the EADM request. The maximum count of MSBs that may be specified is model dependent. The value of this field is to be greater than zero and less than or equal to the model dependent maximum MSB count value; otherwise, a program check condition is recognized by the channel subsystem and an MSB count error is indicated in the exception qualifier code field of the ARSB.

In addition to the EADM request block, the EADM ORB also specifies an EADM response block (ARSB). The EADM response block is meaningful, in this embodiment, only when an exception condition is recognized. Specifically, an ARSB is meaningful only when alert status is present in the EADM subchannel status word (SCSW), the EADM extended status word (ESW) is meaningful, and the EADM response block stored (R) bit is one in the EADM extended report word (ERW), each of which is described below. When an ARSB is not meaningful, the contents of the ARSB in the AOB are unpredictable.

If a program stores into the ARSB while the associated subchannel is subchannel active, unpredictable results may occur.

When an ARSB is stored, the amount of data that has been transferred, if any, is unpredictable.

Figure 2D:
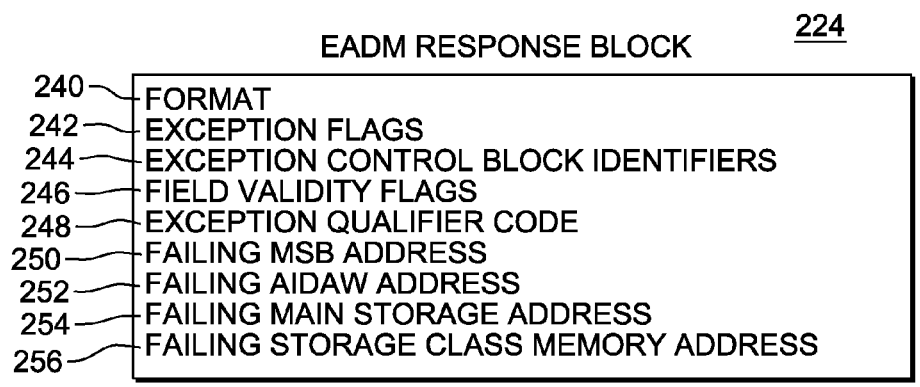
FIG. 2D depicts one embodiment of an Extended Asynchronous Data Mover response block used in accordance with an aspect of the present invention.
Figure 2E:
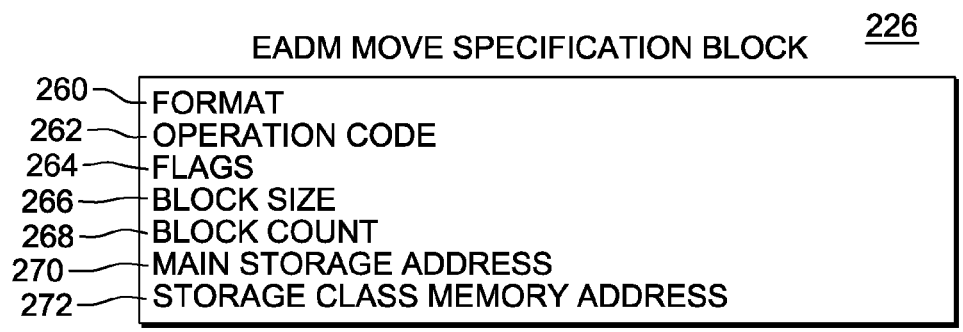
FIG. 2E depicts one embodiment of an Extended Asynchronous Data Mover move specification block used in accordance with an aspect of the present invention.

One embodiment of an EADM response block is described with reference to FIG. 2D. In one example, ARSB 224 includes:

Format (FMT) 240: This field specifies the layout of the ARSB. When an ARSB is stored, the value of this field is stored as a defined value.

Exception Flags (EF) 242: When an ARSB is stored, this field, when set, specifies the exception reason for which the ARSB is stored. Example exception reasons include:

Program check: A programming error is detected.

Protection check: A storage access is prevented by the protection mechanism. Protection applies to the fetching of the ARQB, MSB, AIDAWs, and data to be transferred to storage class memory, and to the storing of information in the ARSB and data transferred from storage class memory.

Channel data check: An uncorrected storage error has been detected in regard to data that is contained in main storage and is currently used in the performance of an EADM operation. The condition may be indicated when detected, even if the data is not used when prefetched. Channel data check is indicated when data or the associated key has an invalid checking block code (CBC) in main storage when that data is referenced by the channel subsystem.

Channel control check: Channel control check is caused by any machine malfunction affecting channel subsystem controls. The condition includes invalid CBC on an ARQB, an ARSB, an MSB, an AIDAW, or the respective associated key. The condition may be indicated when an invalid CBC is detected on a prefetched ARQB, MSB, AIDAW or the respective associated key, even if that ARQB, MSB, or AIDAW is not used.

Extended asynchronous data move facility check: An uncorrected error has been detected in regard to data that is contained in storage class memory and is currently used in the performance of an EADM operation.

Exception Control Block Identifiers (ECBI) 244: When an ARSB is stored, this field is a multiple bit mask whose bits, when set, specify any single or combination of the following components that are associated with the recognized exception designated by the EF field:

The control block or blocks.
The main storage data area.
The storage class memory.

The bits that can be set represent, for instance, an EADM move specification block, an EADM indirect data address, data in main storage, and/or data in storage class memory.

The bits in the ECBI field describe the components associated with a single exception condition. If no components can be identified for the exception condition, this field contains, for instance, zeros.

Field Validity Flag (FVF) 246: When an ARSB is stored, this field includes a multiple bit mask whose bits indicate the validity of certain fields in the ARSB. When a validity bit is set, the corresponding field has been stored and is usable for recovery purposes. The bits that can be set represent, for instance, failing MSB address field, failing AIDAW field, failing main storage address field, and/or failing storage class memory address field.

Exception Qualifier Code (EQC) 248: When an ARSB is stored, this field includes a code value that further describes the exception specified by the exception flags field. Code values may represent the following, as examples:

No additional description is provided. For this case, the exception control block identifiers (ECBI) field and those fields validated by the field validity flags field may identify the control blocks for which the exception is recognized.

Format Error: The format specified by the format field is reserved. For this case, the exception control block identifiers (ECBI) field and those fields validated by the field validity flags field may identify the control blocks for which the exception is recognized.

Command code error: The value specified in the command code field of the ARQB is not recognized.

MSB count error: The value specified in the MSB count field of the ARQB is zero or exceeds the model dependent maximum of MSBs that may be specified.

Flags error: Flag bits specified by the flags field are reserved. For this case, the exception control block identifiers (ECBI) field and those fields validated by the field validity flags field may identify the control blocks for which the exception is recognized.

Operation code error: A reserved operation code value is specified. If the field validity flags field indicates that the failing MSB address field is valid, the field contains the address of the MSB for which the exception is recognized.

Block size error: A reserved block size value is specified. If the field validity flags field indicates that the failing MSB address field is valid, the field contains the address of the MSB for which the exception is recognized.

Block count error: The value specified in the block count field of an MSB is zero or exceeds the model dependent maximum count of blocks that may be specified by an MSB. If the field validity flags field indicates that the failing MSB address field is valid, the field contains the address of the MSB for which the exception is recognized.

Main storage address specification error: A main storage address is specified on an incorrect boundary. Such an address could have been designated by an MSB or by an AIDAW. If the field validity flags field indicates that the failing MSB address field is valid, the field contains the address of the MSB for which the exception is recognized. If the field validity flags field indicates that the failing AIDAW address field is valid, the field contains the address of the AIDAW for which the exception is recognized. If the field validity flags field indicates that the failing main storage address field is valid, the field contains the main storage address for which the exception is recognized.

Storage class memory address specification error: A storage class memory address is specified on an incorrect boundary. Such an address is designated by an MSB. If the field validity flags indicates that the failing MSB address field is valid, the field contains the address of the MSB for which the exception is recognized. If the field validity flags field indicates that the failing AIDAW address field is valid, the field contains the address of the AIDAW for which the exception is recognized. If the field validity flags field indicates that the failing storage class memory address field is valid, the field contains the storage class memory address for which the exception is recognized.

Main storage address exception: The EADM facility attempted to use an address that is not available in the configuration or wrapped the maximum storage address. Such an address could have been designated by an MSB or resulted from incrementing main storage addresses during data transfer. If the field validity flags field indicates that the failing MSB address field is valid, the field contains the address of the MSB for which the exception is recognized. If the field validity flags field indicates that the failing AIDAW address field is valid, the field contains the address of the AIDAW for which the exception is recognized. If the field validity flags field indicates that the failing main storage address field is valid, the field contains the main storage address for which the exception is recognized.

Storage class memory address exception: The EADM facility attempted to use a storage class memory address that is unavailable in the configuration. Such an address could have been designated by an MSB or resulted from incrementing storage class memory addresses during data transfer. If the field validity flags field indicates that the failing MSB address field is valid, the field contains the address of the MSB for which the exception is recognized. If the field validity flags field indicates that the failing AIDAW address field is valid, the field contains the address of the AIDAW for which the exception is recognized. If the field validity flags field indicates that the failing storage class memory address field is valid, the field contains the storage class memory address for which the exception is recognized.

Main storage error: An uncorrected main storage error is detected. If the field validity flags field indicates that the failing MSB address field is valid, the field contains the address of the MSB for which the exception is recognized. If the field validity flags field indicates that the failing AIDAW address field is valid, the field contains the address of the AIDAW for which the exception is recognized. If the field validity flags field indicates that the failing main storage address field is valid, the field contains the main storage address for which the exception is recognized.

MSB list error: The AOB specifies an MSB list which crosses a 4 K byte boundary without specifying branch-to-next MSB (BNM) to cross the boundary or the MSB is the last MSB in the specified MSB list and BNM is specified by the MSB. If the field validity flags field indicates that the failing MSB address field is valid, the field contains the address of the MSB for which the exception is recognized.

MSB branch error: The AOB specifies an MSB list in which an MSB (branch-source MSB) specifies a branch-to-next MSB (BNM) and the MSB that is the branch target also specifies BNM. If the field validity flags field indicates that the failing MSB address field is valid, the field contains the address of the branch source MSB for which the exception is recognized.

AIDAW list error: An MSB specifies an EADM indirect data address word (AIDAW) list which crosses a 4 K byte boundary without specifying branch-to-next AIDAW (BNA) to cross the boundary. If the field validity flags field indicates that the failing MSB address field is valid, the field contains the address of the MSB for which the exception is recognized. If the field validity flags field indicates that the failing AIDAW address field is valid, the field contains the address of the AIDAW for which the exception is recognized.

AIDAW branch error: An MSB specifies an EADM indirect data address word (AIDAW) list in which an AIDAW (branch source AIDAW) specifies a branch-to-source AIDAW (BNA) and the AIDAW that is the branch target also specifies BNA. If the field validity flags field indicates that the failing MSB address field is valid, the field contains the address of the MSB for which the exception is recognized. If the field validity flags field indicates that the failing AIDAW address field is valid, the field contains the address of the branch-source AIDAW for which the exception is recognized.

Storage class memory temporary error: A recoverable storage class memory error is detected. If the field validity flag field indicates that the failing MSB address field is valid, the field contains the address of the MSB for which the exception is recognized. If the field validity flags field indicates that the failing AIDAW address field is valid, the field contains the address of the AIDAW for which the exception is recognized. If the field validity flags field indicates that the failing storage class memory address field is valid, the field contains the storage class memory address for which the exception is recognized.

Release operation not supported error: A release operation was specified for storage class memory for which the release operation is not supported. If the field validity flags field indicates that the failing MSB address field is valid, the field contains the address of the MSB for which the exception is recognized. If the field validity flags field indicates that the failing AIDAW address field is valid, the field contains the address of the AIDAW for which the exception is recognized. If the field validity flags field indicates that the failing storage class memory address field is valid, the field contains the storage class memory address for which the exception is recognized.

Released data read error: A read operation was specified for storage class memory for which the last successful operation was a release operation. If the field validity flags field indicates that the failing MSB address field is valid, the field contains the address of the MSB for which the exception is recognized. If the field validity flags field indicates that the failing AIDAW address field is valid, the field contains the address of the AIDAW for which the exception is recognized. If the field validity flags field indicates that the failing storage class memory address field is valid, the field contains the storage class memory address for which the exception is recognized.

Failing MSB Address 250: When a specified bit of the field validity flags field is set, this field indicates an address of the MSB for which an exception is recognized.

Failing AIDAW Address 252: When a specified bit of the field validity flags field is set, this field indicates an address of the AIDAW for which an exception is recognized.

Failing Main Storage Address 254: When a specified bit of the field validity flags field is set, this field indicates an address of the block of main storage for which an exception is recognized.

Failing Storage Class Memory Address 256: When a specified bit of the field validity flags field is set, this field includes the (e.g., 64 bit) SCM address of the block of storage class memory for which an exception is recognized.

In addition to the EADM request block and EADM response block, the EADM operation block (AOB) also specifies one or more EADM move specification blocks (MSBs). The AOB may contain up to, for instance, 124 MSBs. However, the program may specify more than 124 MSBs by designating a larger number of MSBs in the count field of the ARQB and by using the branch-to-next-MSB (BNM) flag to branch to a continuation of the MSB list. There may be multiple continuations of the MSB list, but, in one embodiment, none of these continuations may cross a 4 K-byte boundary without using BNM to cross that boundary. Continuations of the MSB list are not required to be contiguous. Each continuation of the MSB list, if designated to begin on a 4 K-byte boundary, may contain up to 128 MSBs. The total number of MSBs in an MSB list is specified by the MSB count field in the ARQB.

An EADM move specification block describes, for instance, the blocks of storage to be moved between main storage and storage class memory or an operation to be performed on a block of storage. One embodiment of MSB 226 is described with reference to FIG. 2E, and includes, for instance:

Format (FMT) 260: This field specifies the layout of the MSB. The value of this field is a defined value; otherwise, an MSB format error is indicated in the exception qualifier code field of the ARSB.

Operation Code (OC) 262: This field specifies the operation to be performed. In one example, when a specified bit of the flags field, described below, is a defined value, this field specifies the operation to be performed. Example operations include:

Clear storage class memory: When this code is designated, the storage class memory specified by the storage class memory address, block size, and block count field is cleared (e.g., set to zeros). The main storage address field has no meaning for this operation.

Read: When this code is designated, data is specified to be transferred from storage class memory to main storage. The block count, block size, main storage address and storage class memory address fields have meaning for this operation.

Write: When this code is designated, data is specified to be transferred from main storage to storage class memory. The block count, block size, main storage address, and storage class memory address fields have meaning for this operation.

Release: When this code is designated and the EADM Release Facility is installed, the storage class memory specified by the storage class memory address, block size, and block count fields is released. The main storage address field has no meaning for this operation. When the EADM Release Facility is not installed, this code is reserved.

If a reserved value is specified, a program check condition is recognized by the channel subsystem and an operation code error is indicated in the exception qualifier code field of the ARSB.

When the specified flag bit of the flag field is not the defined value, this field is reserved and not checked.

Flags 264: This field identifies one or more flags that may be set. Flag bits that are reserved are set to a defined value; otherwise a flags error is indicated in the exception qualifier code field of the ARSB. Example flags include:

Branch to next MSB (BNM): When set, this flag indicates that the MSB does not specify an EADM operation and is not used to transfer data. Instead, the main storage address field specifies the address of the next MSB to be used to specify an EADM operation.

When the BNM flag is set (e.g., one) and the main storage address field specifies an MSB in which the BNM flag is also set, a program check condition is recognized by the channel subsystem, the address of the branch source MSB is stored in the failing MSB address field of the ARSB, and an MSB branch error is indicated in the exception qualifier code field of the ARSB.

If an MSB ends at a 4 K-byte boundary, the AOB specifies additional MSBs, and the BNM flag is not set, a program check condition is recognized by the channel subsystem, the address of the MSB is stored in the failing MSB address field of the ARSB, and an MSB list error is indicated in the exception qualifier code field of the ARSB.

If an MSB is the last MSB in the specified MSB list and the BNM flag is set, a program check condition is recognized by the channel subsystem, the address of the MSB is stored in the failing MSB address field of the ARSB, and an MSB list error is indicated in the exception qualifier code field of the ARSB.

When the BNM flag is set, the remaining flags, the operation code field, the block size field, the block set count field, and the storage class memory address have no meaning.

Indirect addressing: When set, this flag indicates that the main storage address field designates an address of an EADM indirect data address word (AIDAW) or of the first AIDAW of a list of AIDAWs that designates the main storage location or locations, respectively, to be used for data transfer. When not set, this flag indicates that the main storage address field designates an address of the main storage location to be used for data transfer.

Block Size (BS) 266: This field specifies the size and boundary of the data blocks to be transferred for both main storage and storage class memory, or the size and boundary of a block of storage class memory to be operated on (e.g., cleared or released). Examples include:

4 K: When the code value is one defined value, the data blocks to be transferred are on a 4 K-byte boundary and are 4 K-byte in size.

1 M: When the code value is another defined value, the data blocks to be transferred are on a 1 M-byte boundary and are 1 M-byte in size.

If a reserved value is specified, a program check condition is recognized by the channel subsystem and a block size error is indicated in the exception qualifier code field of the ARSB.

When the BNM flag is set, this field is ignored.

Block Count 268: This field includes a count of blocks of data to be transferred or operated on (e.g., cleared or released). Based on the block size field, this is the count of either 4 K-byte or 1 M-byte blocks.

The value of this field is to be greater than zero and less than or equal to the model dependent maximum block count that can be specified by an MSB; otherwise, a program check condition is recognized by the channel subsystem and a block count error is indicated in the exception qualifier code field of the ARSB.

When the BNM flag is set, this field is reserved and not checked.

Main Storage Address 270: When the operation code field has meaning (e.g., the BNM flag is not set) and specifies either a read or a write operation, and the indirect addressing indicator in the flags field is not set, this field includes a main storage address to be used for data transfer and the following apply:

When the block-size field specifies 4 K-byte blocks, specified bits of this field contain a defined value (e.g., zero); otherwise, a program check condition is recognized by the channel subsystem and a main storage specification error is indicated in the exception qualifier code field of the ARSB.

When the block size field specifies 1 M-byte blocks, specified bits of this field contain a defined value (e.g., zeros); otherwise, a program check condition is recognized by the channel subsystem and a main storage specification error is indicated in the exception qualifier code field of the ARSB.

When the operation code field has meaning and specifies either a read or a write operation and the indirect addressing indicator in the flags field is set, the field includes a main storage address of an AIDAW or the first of a list of AIDAWs to be used for data transfer. For this case, certain bits of this field contain a defined value; otherwise, a program check condition is recognized by the channel subsystem and a main storage specification error is indicated in the exception qualifier code field of the ARSB.

When the BNM flag is set, the operation code does not have meaning and the MSB does not specify an EADM operation. Instead, this field includes a main storage address of the next MSB that specifies an EADM operation. For this case, specified bits of this field contain a defined value; otherwise, a program check condition is recognized by the channel subsystem and a main storage specification error is indicated in the exception qualifier code field of the ARSB.

Storage Class Memory Address 272: When the operation code field has meaning, this field includes the (e.g., 64 bit) storage class memory address to be used for the data transfer or to be operated on (e.g., clear, release) and the following apply:

When the block size field specifies 4 K-byte blocks, specified bits of this field contain a defined value (e.g., zeros); otherwise, a program check condition is recognized by the channel subsystem and a storage class memory specification error is indicated in the exception qualifier code field of the ARSB.

When the block size field specifies 1 M-byte blocks, specified bits of this field contain a defined value; otherwise, a program check condition is recognized by the channel subsystem and a storage class memory specification error is indicated in the exception qualifier code field of the ARSB.

When the BNM flag is set, this field is reserved and not checked.

As indicated above, an EADM indirect data address word may be specified. The EADM indirect data address word (AIDAW) allows the program to specify the transfer of blocks of data between storage class memory and non-contiguous blocks of main storage. An AIDAW or list of AIDAWs is designated by an MSB when the indirect addressing flag in the MSB is set.

The amount of data transferred by a single AIDAW is specified by the block size field in the MSB. The number of AIDAWs in an AIDAW list is the sum of the number specified by the block count field in the MSB plus the number of AIDAWs that specify branch-to-next-AIDAW. Data transfers may be processed in orders that are different from that specified in an AIDAW list. Furthermore, data transfers specified by multiple AIDAWs in an AIDAW list may be processed concurrently.

An AIDAW is allocated on, for instance, a quadword boundary. A list of AIDAWs may be any length, but in one example, are not to cross a 4 K-byte boundary unless a branch to next AIDAW (BNA) is specified to cross the boundary. There is no requirement that the AIDAW that is the target of a branch be contiguous with the AIDAW specifying BNA. However, the program should create an AIDAW list in as few 4 K-byte blocks as possible; otherwise, performance degradation may occur.

Figure 2F:
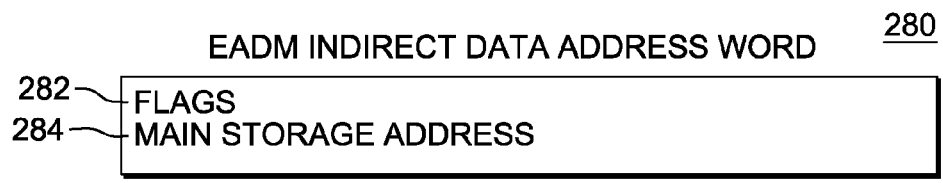
FIG. 2F depicts one embodiment of an Extended Asynchronous Data Mover indirect data address word used in accordance with an aspect of the present invention.

Referring to FIG. 2F, in one example, an EADM Indirect Data Address Word 280 includes:

Flags 282: An example flag includes:

Branch to next AIDAW (BNA): When set, this flag indicates that the main storage address field does not specify a main storage address to be used to transfer data. Instead, the main storage address field specifies the address of the next AIDAW to be used to transfer data.

When the BNA flag is set and the main storage address field specifies an AIDAW in which the BNA flag is also set, the address of the MSB is stored in the failing MSB address field of the ARSB, the address of the branch-source AIDAW is stored in the failing main storage address field of the ARSB, and an AIDAW branch error is indicated in the exception qualifier code field in the ARSB.

If an AIDAW ends at a 4 K-byte boundary, the MSB specifies additional AIDAWs, and the BNA flag is not set, the address of the MSB is stored in the failing MSB address field of the ARSB, the address of the AIDAW is stored in the failing main storage address field of the ARSB, and an AIDAW list error is indicated in the exception qualifier code field in the ARSB.

Main Storage Address 284: When the BNA field is not set, this field includes an address in main storage to be used for data transfer and the following apply:

When the block size field in the MSB specifies 4 K-byte blocks, specified bits of this field contain a defined value (e.g., zero); otherwise, a program check condition is recognized by the channel subsystem and a main storage specification error is indicated in the exception qualifier code field of the ARSB.

When the block size field in the MSB specifies 1 M-byte blocks, specified bits of this field contain a defined value (e.g., zeros); otherwise, a program check condition is recognized by the channel subsystem and a main storage specification error is indicated in the exception qualifier code field of the ARSB.

When the BNA flag is set, this field includes a main storage address of the next AIDAW to be used for data transfer.

As described above, EADM operations are specified by a Start Subchannel instruction. That is, the program initiates EADM operations by issuing a Start Subchannel instruction that designates an ADM-type subchannel and an EADM ORB. The execution of the instruction passes the contents of the EADM ORB to the designated subchannel. The EADM ORB includes the specification of the subchannel key (used for protection) and the address of the AOB to be used.

Figure 3A:
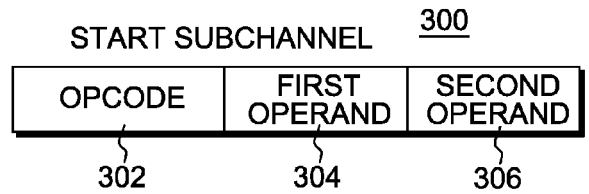
FIG. 3A depicts one embodiment of a Start Subchannel instruction used in accordance with an aspect of the present invention.

In one example, as depicted in FIG. 3A, a Start Subchannel instruction 300 includes an operation code 302 specifying the Start Subchannel function, a first operand 304, which is an implied operand located in, for instance, general register 1, which includes the subsystem identifier designating the ADM-type subchannel that is to be started; and a second operand 306, which is the logical address of the EADM ORB. The EADM ORB specifies the parameters used in controlling the start function. The contents of the EADM ORB are placed at the designated subchannel during the execution of Start Subchannel, prior to setting the condition code. If the execution of Start Subchannel results in the setting of a condition code other than a code indicating success, the contents of the EADM ORB are not placed at the designated subchannel.

Subsequent to the execution of Start Subchannel for an ADM-type subchannel, the channel subsystem asynchronously performs the start function to initiate EADM operations with the EADM facility. The start function includes, for instance, the following:
1. Fetching the ARQB from the AOB.
2. Executing the EADM operations as specified by the ARQB and the MSBs it designates.
3. Conditionally storing completion information in the ARSB in the AOB.
4. Causing the ADM-type subchannel to be made status pending, indicating completion of the start function.

Figure 3B:
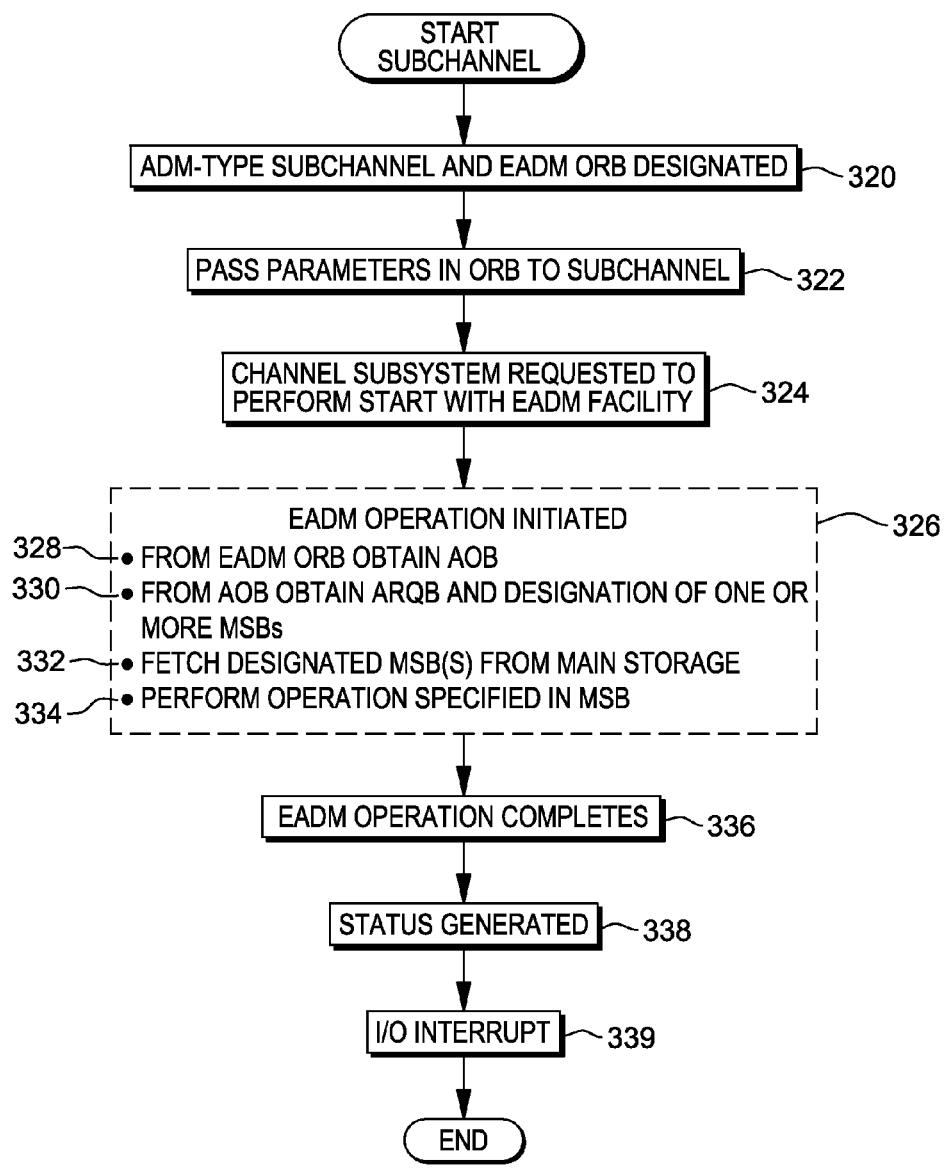
FIG. 3B depicts one embodiment of the logic associated with the Start Subchannel instruction, in accordance with an aspect of the present invention.

In one embodiment, referring to FIG. 3B, when the Start Subchannel instruction is executed and the SID designates an ADM-type subchannel and the second operand designates an EADM ORB, an EADM operation is specified, STEP 320. Parameters in the EADM ORB are passed to the designated subchannel, STEP 322, and the channel subsystem is requested to perform a start function with the EADM Facility, STEP 324. The channel subsystem asynchronously performs the start function by using information at the subchannel, including the information passed during the execution of the Start Subchannel instruction, to initiate EADM operations, STEP 326.

Execution of an EADM operation (e.g., the first operation) includes using information from the EADM ORB to obtain the AOB, STEP 328, and information is used in the AOB to obtain the EADM request block (ARQB) and a designation of one or more EADM move specification blocks (MSBs), STEP 330. The one or more designated MSBs are then fetched from main storage, STEP 332, and information specified in the MSBs are used to control the requested EADM operation. The first operation is considered to be started when the channel subsystem attempts to initiate data transfer or attempts a clear or release operation.

The channel subsystem performs the operation(s) requested in the MSB(s), STEP 334. This processing is asynchronous to execution of the start command.

When EADM operations initiated by Start Subchannel end, STEP 336, the channel subsystem generates status conditions, STEP 338. The generation of these conditions is brought to the attention of the program by means of an I/O interruption, STEP 339. The program may also query these conditions by the execution of a Test Pending Interruption instruction.

The status conditions generated are presented to the program in the form of an EADM subchannel status word (SCSW). The EADM SCSW is stored as part of the EADM interruption response block (IRB) by the execution of the Test Subchannel instruction.

When the EADM operations specified in the EADM operation block (AOB) are ended, the channel subsystem generates primary and secondary interruption status. EADM operations can be terminated by Clear Subchannel or an abnormal condition recognized while performing the start function.

The processing of an MSB by the channel subsystem, for a move operation, controls the flow of a unit of information to or from main storage. To change the direction of data movement during MSB processing, a new MSB is needed. The ARQB designates the count of MSBs that comprise the request.

Each EADM operation is represented by one MSB. An MSB may specify any of the following:
The transfer of blocks of data from main storage to storage class memory.
The transfer of blocks of data from storage class memory to main storage.
The clearing of blocks of storage class memory.
The releasing of blocks of storage class memory, when the EADM Release Facility is installed.

If the blocks of storage to be transferred for a move operation are not contiguous in main storage, a new MSB may be used or the MSB may use indirect addressing by specifying a list of EADM indirect data address words (AIDAWs) to designate the noncontiguous blocks. Since an MSB can specify the transfer of data in only one direction, a new MSB is to be used when there is a change in the direction of data transfer.

The following are characteristics of EADM data transfers:
Data transfers may be processed out of order with respect to the order of a specified MSB list.
Data transfers specified by multiple MSBs in an MSB list may be processed concurrently.
Data transfers may be processed out of order with respect to the order of a specified AIDAW list.
Data transfers specified in multiple AIDAWs in an AIDAW list may be processed concurrently.
Accesses to main storage and to storage class memory are not necessarily single-access references and are not necessarily performed in a left-to-right direction, as observed by the program and other CPUs.
If two or more EADM operations are currently active and address the same SCM locations, main storage location, or both, the operations may be performed concurrently and content from different operations may be interleaved; however:
For input operations, the data stored by the EADM Facility into each block of main storage that is a size equal to the SCM block concurrency size consists of data transferred from storage class memory by only one of the concurrent EADM operations.

For output operations, each block of storage class memory that is on a boundary and is a size equal to the SCM block concurrency size contains the data specified by only one of the concurrent EADM operations. The above is true regardless of whether the EADM operations are specified by a single AOB and are being processed by the same instance of the start function or the EADM operations are specified by different AOBs and are being processed by different instances of the start function.

When EADM operations are active for a subchannel, it is unpredictable whether changes made by the program to the ARQB, MSBs, AIDAWs, and transfer data associated with the active operation are observed by the EADM Facility.

When all of the blocks designated by all of the MSBs specified by the AOB have been transferred or cleared or released, the subchannel generates status, which is stored at the subchannel, and requests an I/O interruption for the ADM-type subchannel.

The conclusion of an EADM operation is normally indicated by the combined status conditions of channel end and device end. This status combination represents the combination of primary and secondary status indicating that the subchannel is available for another start function after the status is cleared.

As described above, an MSB may specify a data transfer operation, a clear operation, or a release operation, each of which is described below.

When a move operation is requested, one or more blocks of data are moved between main storage and storage class memory. For instance, for a read operation, SCM data is obtained from the SSDs that provide the content designated by the specified SCM address, and then that content is stored to main memory. The process is reversed for a write operation. The adapter(s) controlling the SSDs perform the storing. In further detail, to perform a move operation, the system firmware first translates a given SCM address into an adapter address (e.g., logical volume address, in which a logical volume includes one or more SSDs). For instance, a translation table is used that correlates the SCM address to an adapter address. System firmware then submits one or more corresponding adapter move commands (e.g., read or write) to one or more of the I/O adapters. An adapter move command contains a main storage address, an adapter address, and a transfer size. The adapter then uses another translation table to locate one or more physical SSD addresses that correspond to the adapter address. The I/O adapter effects the move operation by either fetching data from main storage and storing it on the SSDs, or fetching data from the SSDs and storing it in main memory. Additional details are further provided in a co-filed patent application entitled "Firmware Management of Storage Class Memory", POU920110090US1, which is hereby incorporated herein by reference in its entirety.

When a clear operation is performed, the designated increments of storage class memory are cleared by setting the contents to zeros.

Further, when a release operation is performed, one or more standard TRIM commands may be submitted to the SSDs containing the corresponding SCM addresses. The TRIM command allows a program to give hints about block usage, allowing better garbage collection by the SSDs. The TRIM command allows an operating system to inform an SSD of which blocks of storage are no longer considered in use and can be wiped.

An EADM operation may be terminated prematurely by a Clear Subchannel instruction. Execution of the Clear Subchannel instruction terminates execution of the AOB at the subchannel, clears the subchannel of indications of the AOB in execution, and asynchronously performs the clear function. When the clear function is performed, prior to the subchannel becoming status pending, data transfer is terminated and the amount of data transferred is unpredictable. Execution of the clear function does not result in the generation of status, but does cause the channel subsystem to make an I/O interruption pending.

Figure 3C:
FIG. 3C depicts one embodiment of a Clear Subchannel instruction used in accordance with an aspect of the present invention.

In one embodiment, referring to FIG. 3C, a Clear Subchannel instruction 350 includes an operation code 352 designating the Clear Subchannel function. The subchannel to be cleared is designated by a subsystem identification word in, for instance, general register 1.

The clear function for an ADM-type subchannel includes:
1. Ensuring that the current data transfer is terminated.
2. Modifying fields at the subchannel and conditionally the ARSB. For instance, the subchannel status word is modified to indicate the clear function in the Function Control field and in the Activity Control field. The ARSB may be modified to reflect any detected errors.
3. Causing the subchannel to be made status pending indicating completion of the clear function.

Other instructions may also be issued that can specify an ADM-type subchannel, including Test Subchannel, Modify Subchannel and Store Subchannel, each of which is described below.

Figure 3D:
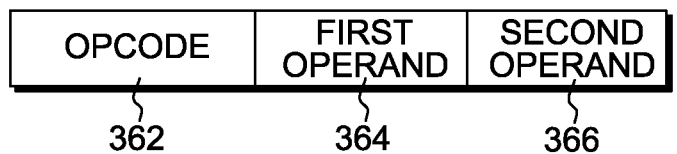
FIG. 3D depicts one embodiment of a Test Subchannel instruction used in accordance with an aspect of the present invention.

Referring to FIG. 3D, in one example, a Test Subchannel instruction 360 includes, for instance, an operation code 362 specifying the test subchannel function; a first operand 364, which is an implied operand located in, for instance, general register 1 that contains the subsystem identification word designating the subchannel that is to be tested; and a second operand 366 which is the logical address of the Information Response Block (IRB) at which information is stored.

When Test Subchannel is executed specifying an ADM-type subchannel, the subchannel is status pending, and information is stored in the designated EADM IRB (Interruption Response Block), a specified condition code is set. When the subchannel is not status pending and status information is stored in the designated EADM IRB, a defined condition code is set. When the subchannel is not provided or not enabled, no action is taken.

In one example, the EADM IRB includes a Subchannel Status Word (SSW) and an Extended Status Word (ESW), as well as an Extended Control Word that may provide additional model dependent information describing conditions that may exist in the facility. Each of these words is described further below after discussion of the various instructions that can specify an ADM-type subchannel.

Figure 3E:
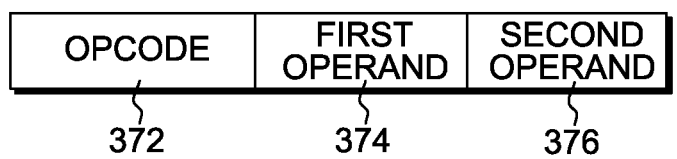
FIG. 3E depicts one embodiment of a Modify Subchannel instruction used in accordance with an aspect of the present invention.

Referring to FIG. 3E, in one embodiment, a Modify Subchannel instruction 370 includes an operation code 372 specifying the Modify Subchannel function; a first operand 374, which is an implied operand located in, for instance, general register 1, which includes the subsystem identification word designating the subchannel to be modified; and a second operand 376, which is the logical address of a subchannel information block (SCHIB) associated with the subchannel.

When Modify Subchannel is executed specifying an ADM-type subchannel, and information from the specified Subchannel Information Block (SCHIB) is placed in the subchannel, a specific condition code is set. When the subchannel is status pending, no action is taken and a defined condition code is set. When the subchannel is busy for a start or clear function, no action is taken.

Figure 3F:
FIG. 3F depicts one embodiment of a Store Subchannel instruction used in accordance with an aspect of the present invention.

Referring to FIG. 3F, one example of a Store Subchannel instruction is described. In one example, a Store Subchannel instruction 380 includes an operation code 382 identifying the Store Subchannel function; a first operand 384, which is an implied operand located in, for instance, general register 1 that includes a subsystem identification word designating the subchannel for which the information is being stored; and a second operand 386 which is the logical address of the SCHIB.

When Store Subchannel is issued specifying an ADM-type subchannel, and a SCHIB is stored, a specified condition code is set. When the designated subchannel is not provided in the channel subsystem, no action is taken.

Figure 4A:
FIG. 4A depicts one embodiment of an Extended Asynchronous Data Mover subchannel information block used in accordance with an aspect of the present invention.

One example of a subchannel information block for an ADM-type subchannel EADM SCHIB) is described with reference to FIG. 4A. In one example, an (EADM SCHIB 400 includes a model dependent area 401, which includes model dependent information. Further, SCHIB 400 includes a path management control word (PMCW) 402, and a subchannel status word (SCSW) 404, each of which is described below.

Figure 4B:
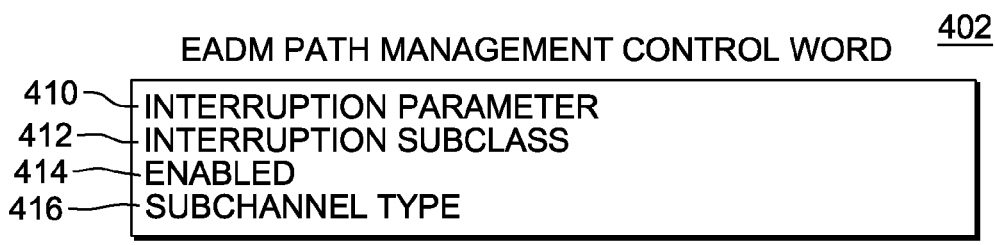
FIG. 4B depicts one embodiment of an Extended Asynchronous Data Mover path management control word used in accordance with an aspect of the present invention.

In one example, EADM PMCW 402 includes, for instance, the following fields as shown in FIG. 4B:

Interruption Parameter 410: This field includes the interruption parameter that is stored in the I/O interruption code. The interruption parameter can be set to any value by Start Subchannel and Modify Subchannel. The initial value of the interruption parameter field in the subchannel is zero.

Interruption Subclass (ISC) 412: This field includes a plurality of bits that are an unsigned binary integer, in a specified range, that corresponds to the bit position of the I/O interruption subclass mask bit in a specified control register of each CPU in the configuration. The setting of the mask bit in the control register of a CPU controls the recognition of interruption requests relating to the subchannel by that CPU. The ISC can be set to a value by Modify Subchannel. The initial value of the ISC field in the subchannel is, for instance, zero.

Enabled (E) 414: This field, when set, indicates that the subchannel is enabled for all EADM functions.

Subchannel Type (ST) 416: This field designates the subchannel type. Depending on the model and the configuration, one or more of the following subchannel types may be provided: I/O subchannel or ADM subchannel. The value of this field is determined when the subchannel is configured and cannot be changed by Modify Subchannel.

When the Modify Subchannel instruction is executed and designates an ADM-type subchannel, ST is to indicate ADM subchannel; otherwise, an operand exception is recognized.

Figure 4C:
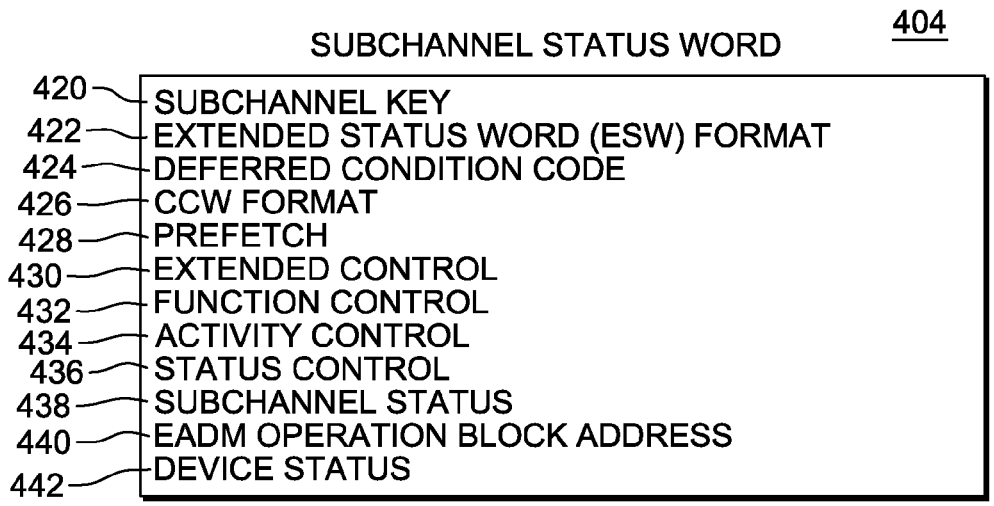
FIG. 4C depicts one embodiment of a subchannel status word used in accordance with an aspect of the present invention.

Returning to FIG. 4A, the subchannel information block also includes subchannel status word 404. The EADM subchannel status word (SCSW) provides indications to the program that describe the status of an ADM-type subchannel and associated EADM operations. In one example, as shown in FIG. 4C, subchannel status word 404 includes:

Subchannel Key (Key) 420: When the EADM start function indicator in the function control field (described below) is set, this field includes the storage access key used by the channel subsystem. These bits are identical with the key specified in the EADM ORB when Start Subchannel was executed.

Extended Status Word Format (L) 422: When the status pending indicator of the status controls field (described below) is set, this field, when set, indicates that a format-0 ESW has been stored. A format-0 ESW is stored when an interruption condition containing any of the following indications is cleared by Test Subchannel:

Program check
Protection check
Channel data check
Channel control check
Extended asynchronous data move facility (EADMF) check Deferred Condition Code (CC) 424: When the EADM start function indicator is set and the status pending indicator is also set, this field indicates the general reason that the subchannel was status pending when Test Subchannel or Store Subchannel was executed. The deferred condition code is meaningful when the subchannel is status pending with any combination of status and only when the start function indicator of the function control field in the SCSW is set.

The deferred condition code, if set, is used to indicate whether conditions have been encountered that preclude the subchannel from becoming subchannel active while the subchannel is start pending.

Example deferred condition codes include:
A normal I/O interruption has been presented.
Status is present in the EADM SCSW that was generated by the channel subsystem for conditions that preclude the EADM start function from being successfully initiated. That is, the subchannel did not transition to the subchannel active state.

CCW Format (F) 426: When the EADM start function indicator is set, this field is stored as a defined value.

Prefetch (P) 428: When the EADM start function indicator is set, this field is stored as a defined value.

Extended Control (E) 430: This field when set indicates that model dependent information is stored in the EADM extended control word (ECW).

Function Control (FC) 432: The function control field indicates the EADM functions that are indicated at the subchannel. Example functions include:

EADM start function: When set, indicates that an EADM start function has been requested and is either pending or in progress at the ADM-type subchannel. The EADM start function is indicated at the subchannel when a successful condition code is set for Start Subchannel. The EADM start function is cleared at the subchannel when Test Subchannel is executed and the subchannel is status pending. The EADM start function is also cleared at the subchannel during execution of Clear Subchannel.

EADM clear function: When set, indicates that an EADM clear function has been requested and is either pending or in progress at the ADM-type subchannel. The EADM clear function is indicated at the subchannel when a successful condition code is set for Clear Subchannel. The EADM clear function indication is cleared at the subchannel when Test Subchannel is executed and the subchannel is status pending.

Activity Control (AC) 434: The activity control field indicates the current progress of the EADM function previously accepted at the subchannel.

All conditions that are represented by bits in the activity control field are reset at the ADM-type subchannel when Test Subchannel is executed and the subchannel is status pending.

Example activities include:
Start pending: When set, indicates that the subchannel is start pending. The channel subsystem may or may not be in the process of performing the EADM start function. The subchannel becomes start pending when a successful condition code is set for Start Subchannel.

The subchannel remains start pending when performing the EADM start function and the channel subsystem determines conditions exist that prevent the fetching of the ARQB.

The subchannel is no longer start pending when any of the following occurs:
  The channel subsystem attempts to initiate the first data transfer specified by the AOB.
  Clear Subchannel is executed.
  Test Subchannel clears a status condition at the subchannel.

Clear pending: When set, the subchannel is clear pending. The channel subsystem may or may not be in the process of performing the EADM clear function. The subchannel becomes clear pending when a specified condition code is set for Clear Subchannel.

The subchannel is no longer clear pending when either of the following occurs:
  The EADM clear function is performed.
  Test Subchannel clears the status pending condition alone.

Subchannel active: When set, indicates that the ADM-type subchannel is subchannel active. The ADM-type subchannel is said to be subchannel active when the channel subsystem attempts to initiate the first data transfer specified by the AOB or perform a first operation (whichever happens first).

The subchannel is no longer subchannel active when either of the following occurs:
  The subchannel becomes status pending.
  Clear Subchannel is executed.

Status Control (SC) 436: The status control field provides the program with summary level indication of the interruption condition described by information in the subchannel status and device status fields. More than one status control indicator may be set as a result of conditions at the subchannel.

Example status controls include:
  Alert status: When set, indicates that an alert interruption condition exists. An alert interruption condition is recognized when alert status is present at the subchannel. Alert status is generated by the channel subsystem under any of the following conditions:
    The ADM-type subchannel is start pending and the status condition precludes initiation of the first data transfer.
    The subchannel is subchannel active and an abnormal condition, that is being reported as subchannel status, has terminated EADM operations.
  When Test Subchannel or Clear Subchannel is executed, the alert status is cleared at the subchannel.
  Primary status: When set, indicates a primary interruption condition exists. A primary interruption condition is recognized when primary status is present at the subchannel. A primary interruption condition is a solicited interruption condition that indicates, when accompanied by the secondary interruption condition, completion of the EADM start function at the subchannel.
  When Test Subchannel or Clear Subchannel is executed, the primary interruption condition is cleared at the subchannel.
  Secondary status: When set, indicates a secondary interruption condition exists. A secondary interruption condition is recognized when secondary status is present at the subchannel. A secondary interruption condition is a solicited interruption condition that indicates, when accompanied by the primary interruption condition, completion of the EADM start function at the subchannel.
  When Test Subchannel or Clear Subchannel is executed, the secondary interruption condition is cleared at the subchannel.
  Status pending: When set, indicates that the subchannel is status pending and that information describing the cause of the interruption condition is available. When Test Subchannel is executed, storing an EADM SCSW with the status pending bit set, all EADM SCSW indications are cleared at the subchannel placing the subchannel in the idle state. The status pending condition is also cleared at the subchannel during the execution of Clear Subchannel.
  When status pending is set, all accesses to main storage and to storage class memory for the subchannel ARSB have terminated.

Subchannel Status 438: ADM-type subchannel status conditions are detected and stored in the subchannel status field by the channel subsystem. The subchannel status field is meaningful when the subchannel is status pending. Except for conditions caused by equipment malfunctions, subchannel status can occur only when the channel subsystem is involved with processing an EADM function.

Examples of status conditions include:
  Program check: Program check occurs when programming errors are detected by the channel subsystem.
  Protection check: Protection check occurs when the channel subsystem attempts a storage access that is prohibited by the protection mechanism. Protection applies to the fetching of the ARQB, MSBs, AIDAWs, and data to be transferred to storage class memory, and to the storing of information in the ARSB and data transferred from storage class memory.
  Channel data check: Channel data check indicates that an uncorrected storage error was detected in regard to the fetching of data from main storage or the storing of data into main storage.
  Channel control check: Channel control check indicates that an uncorrected storage error was detected in regard to the fetching or storing of the AOB, MSBs, or AIDAWs, or that a machine malfunction was encountered by the channel subsystem and the malfunction affected EADM operations.
  Extended asynchronous Data Move (EADM) Facility check: EADM Facility check indicates that an error was detected by the EADM Facility in regard to the transfer of data to or from storage class memory or in regards to performing an operation on the storage class memory.

When a program check, protection check, channel data check, channel control check, or EADM Facility check condition is recognized by the channel subsystem, EADM operations are terminated and the channel is made status pending with primary, secondary, and alert status.

EADM Operation Block Address 440: This field includes the EADM Operation Block Address.

Device Status 442: This includes device end or channel end.

When ESW format 422 of the subchannel status word is set and the subchannel is status pending, an EADM subchannel extended status word (EADM ESW) is provided that specifies additional information about the ADM-type subchannel.

Figure 4D:
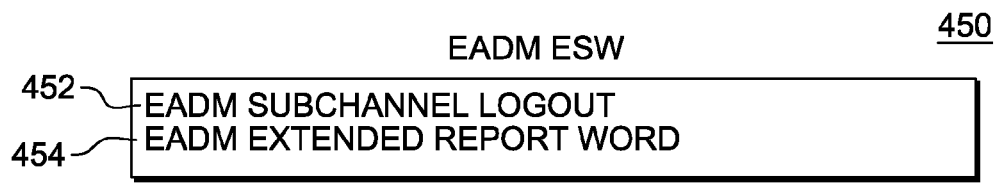
FIG. 4D depicts one embodiment of an Extended Asynchronous Data Mover extended status word used in accordance with an aspect of the present invention.

In one example, referring to FIG. 4D, an EADM subchannel extended status word 450 includes:

EADM Subchannel Logout 452: The EADM subchannel logout includes, in one example:
Extended Status Flags (ESF): A field whose bits, when one, specify that an error has been detected by the channel subsystem.
Examples of extended status flags include:
Key check: When set, indicates that the channel subsystem has detected an invalid checking block code (CBC) on the associated storage key when referencing data in the EADM operation block (AOB), in an EADM move specification block (MSB), or in an EADM indirect data address word (AIDAW).
AOB address validity: When set, indicates that the address stored in the AOB address field of the SCSW is usable for recovery purposes.
EADM Extended Report Word 454 that includes, for instance:
An EADM Operations Block Error (B) indicator that when set, specifies that the exception status stored in the EADM SCSW is associated with the specified EADM operation block (AOB); and an EADM Response Block Stored (R) indicator that when set indicates the EADM response block (ARSB) is stored.

When the extended control indicator of the SCSW and the extended status word format indicator of the SCSW are set, the EADM extended control word provides additional information of a model dependent nature that describes conditions that may exist at the EADM facility.

Additionally, the following channel report words (CRWs) may be reported for ADM-type subchannels: subchannel installed parameters initialized; subchannel installed parameters restored; subchannels available; channel event information pending.

Unsolicited events and malfunctions that occur in the EADM Facility may be reported by the channel event information pending CRW.

Described in detail above is an Extended Asynchronous Data Mover Facility used to move data blocks between main storage and storage class memory and to perform other operations on the storage class memory. In one embodiment, information about the EADM Facility and storage class memory is obtained using an EADM command. In particular, since storage class memory is not directly accessible, a capability is provided to determine whether storage class memory is allocated, and if so, to obtain information regarding the configuration. In particular, in one example, a capability is provided to communicate to a control program (e.g., operating system) whether or not any storage class memory has been allocated, and if so, how much and at what locations. The capability for determining available storage class memory is referred to herein as discovery and one example of a discovery function is provided by a Store Storage Class Memory (SCM) Information (SSI) command.

The Store Storage Class Memory Information (SSI) command is used to obtain information about the storage class memory and the Extended Asynchronous Data Mover Facility. The SSI command returns the following information obtained from, for instance, the channel subsystem. This information is described in further detail below:

1. Characteristics of the EADM Facility, including:
Maximum count of Move Specification Blocks (MSBs) per AOB.
Maximum block count per MSB.

2. Characteristics of storage class memory, including:
SCM increment size.
List of SCM address increments within the SCM address space.
Model dependent maximum SCM address.

Execution of the Store SCM Information command, which is synchronous, does not change any information contained in the channel subsystem.

Figure 5A:
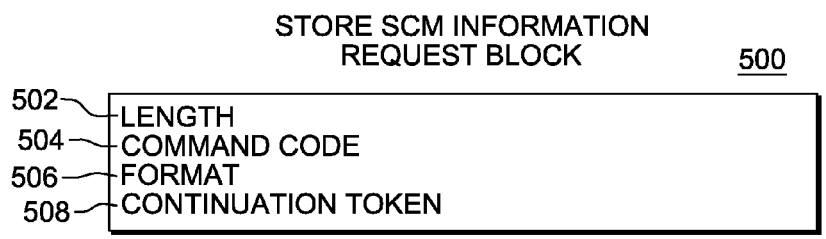
FIG. 5A depicts one embodiment of a Store Storage Class Memory Information request block used in accordance with an aspect of the present invention.

Further details regarding the SSI command are described with reference to FIGS. 5A-5D. Referring initially to FIG. 5A, in one embodiment, a command request block 500 for the Store SCM Information command includes, for instance:

Length 502: A value specifying a length of the command request block.
Command Code 504: A value that specifies the command code for the Store SCM Information command.
Format (FMT) 506: A value that specifies the format of the command request block.
Continuation Token 508: A value that may request a continuation point at which to resume from a prior response that was not complete. If the value of the continuation token is zero, a fresh start is made. If the value of the continuation token is nonzero and not recognized, a fresh start is made.

Figure 5B:
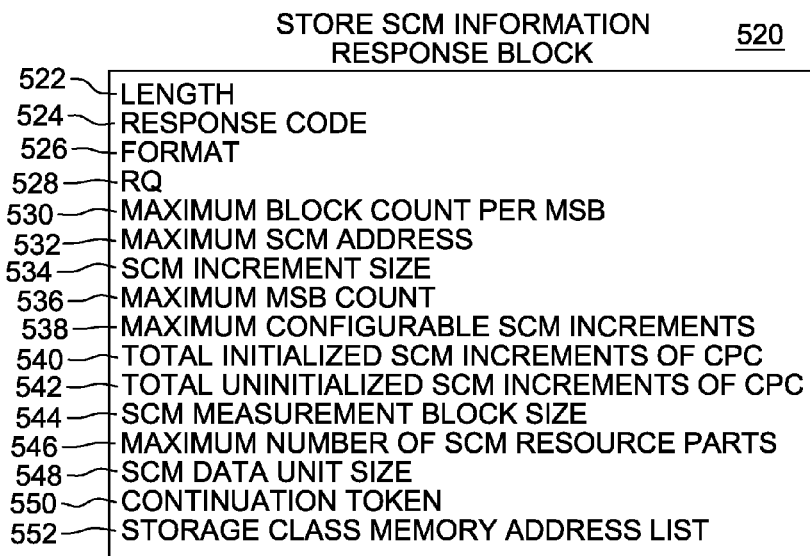
FIG. 5B depicts one embodiment of a Store Storage Class Memory Information response block used in accordance with an aspect of the present invention.

One embodiment of a response block 520 of the SSI command is described with reference to FIG. 5B, and includes, for instance:

Length 522: A value that indicates the length in bytes of the command response block.
Response Code 524: A value that describes the results of an attempt to execute the SSI command. The response code value dictates the length of the response block. For example, if a selected response code is stored, the length specifies 96+N×16 bytes, where N is the number of storage class memory address list entries, described below. In one example, N is in the range $1 \leq N \leq 248$.
Format (FMT) 526: A value that indicates the format of the command response block. The value of the field is, for instance, zero.
RQ 528: A response qualifier value, as defined below:
No response qualification exists.
The specified continuation token is not recognized and is treated as if zero had been specified.
Maximum Block Count per MSB (MBC) 530: A value that indicates the maximum value that may be used in the block count field of a move specification block (MSB).
Maximum SCM Address (MSA) 532: A value that indicates the model dependent maximum SCM address. It is the SCM address of the last byte in the highest addressable SCM increment.
SCM Increment Size (IS) 534: A value that represents the size of each SCM increment in the SCM address list and is, for instance, a power-of-two.
Maximum MSB Count (MMC) 536: A value that indicates the maximum count of move specification blocks (MSB) that may be specified in an EADM-operation block (AOB).
Maximum Configurable SCM Increments (MCI) 538: A value that is the maximum number of SCM increments that may be configured to the requesting configuration. In one embodiment, MCI does not exceed $2^{(64-18)}$. For example, for a 16G-byte SCM increment size, $MCI \leq 2^{(64-34)}$, since all the 16G-byte SCM increments are to be addressable within the addressing constraint of a 64-bit address. Furthermore, $((MCI+1) \times IS)-1$ does not exceed the model-dependent maximum SCM address.
The number of configured SCM increments (NCI) reduces the total size (TS) that may be specified when a successful Configure Storage Class Memory command, described below, is executed, such that TS≤(MCI-NCI). However, based upon the entire capacity of the system and allocations already made to other configurations, the number of SCM increments in the initialized state may or may not be able to completely satisfy a request to otherwise validly configure up to the MCI limit of the requesting configuration.

Total Initialized SCM Increments of CPC 540: A value that represents the number of SCM increments in the initialized state for the system (e.g., for a central processing complex (CPC)). If the system is logically partitioned, this is the number of increments available in total for allocation to/by the partitions.

Total Uninitialized SCM Increments of CPC 542: A value that represents the number of SCM increments in the uninitialized state for the system (e.g., for the CPC).

SCM Measurement Block Size 544: A value that is the block size (BS) in bytes of an SCM measurement block. In one example, it is a power of 2, and the maximum SCM measurement block size is, for instance, 4096 bytes.

Maximum Number of SCM Resource Parts 546: A value that is the maximum number on the CPC of SCM resource parts (RP) (e.g., I/O adapters). Each SCM increment is associated with an SCM resource part. Each SCM resource (e.g., one or more I/O adapters and one or more SSDs) includes one or more parts. The maximum number of SCM resource parts is, for instance, 509.

In one example, the term "resource part" is defined for use in obtaining measurement information relating to the storage class memory. Each SCM increment can be distributed across multiple adapters and each adapter has some utilization/measurement data to impart. So, each measurement block returned is identified by a tuple consisting of the increment identifier plus the resource identifier.

SCM Data Unit Size 548: A model dependent value that indicates the number of bytes that are included in an SCM data unit. In one example, the data unit is defined for use in obtaining measurement information relating to the storage class memory. The count that is reported is the count of data units, rather than bytes.

Continuation Token 550: A model dependent value by which a subsequent issue of the SSI command may continue at the continuation point represented by the token. The contents of a continuation token are model dependent.

Storage Class Memory Address List 552: An origin of the SCM address list. When the response code stored is a predefined value, a plurality of SCM address list entries (SALE) are stored (e.g., (Length—96)/16 SALEs are stored).

In one example, the number of SALEs stored depends on the number of SCM increments in the requester's configuration, the status of each when the command is executed, and the channel subsystem model. Zero or more SALEs are stored and the actual number stored is determined, in one example, by subtracting 96 from the size of the response block (Length), and then dividing that result by 16.

Each SCM address list entry (SALE) represents one SCM increment which occupies a range of SCM addresses. The starting SCM address of the SCM increment represented by the SALE is contained in the SALE and is the SCM address of the first byte of the corresponding SCM increment. The ending address is calculated, in one example, by adding the SCM increment size, in bytes, to the starting SCM address and then subtracting one. This is the SCM address of the last byte of the SCM increment. The storage class memory represented by a SALE is a contiguous set of SCM byte locations, which begins on a natural $2^{IS}$ byte boundary, in one embodiment.

A SALE is stored when the corresponding SCM increment is in the configured stated and space is available in the response block for the SALE. If space in the SCM address list of the response block is exhausted, a value is stored in the continuation token and execution completes with a specific response code.

Two or more SALEs are stored in ascending order of their SCM addresses.

Figure 5C:
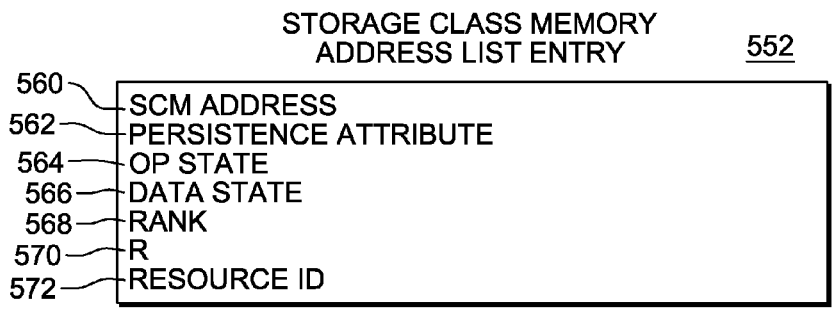
FIG. 5C depicts one embodiment of a storage class memory address list entry used in accordance with an aspect of the present invention.
Figure 5D:
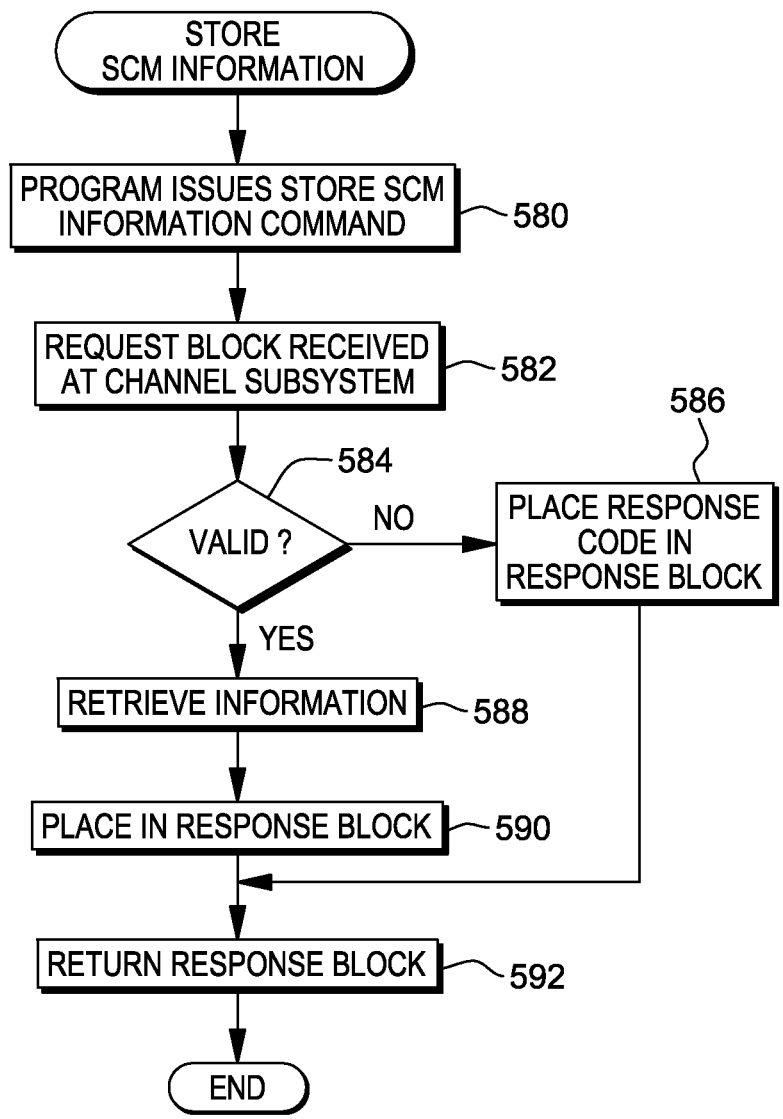
FIG. 5D depicts one embodiment of the logic associated with the Store Storage Class Memory Information command, in accordance with an aspect of the present invention.

One embodiment of a SALE is described with reference to FIG. 5C. In one example, a SALE 552 includes, for instance:

SCM Address (SA) 560: A value that is the starting SCM address of byte 0 of the corresponding SCM increment in the SCM address space, aligned on the natural boundary determined by the SCM increment size ($2^{IS}$ bytes).

Persistence Attribute (P) 562: A value that indicates the current persistence rule applicable to the SCM increment. Any location within the SCM increment inherits the persistence rule. The possible persistence rules includes:

Rule 1—Retain data when power is off.

Rule 2—Retain data until power on reset or IML.

Op State 564: A value that indicates the operation state of the storage class memory increment represented by the SALE. The operation state is valid only when the associated SCM increment is in the configured state.

Examples of operation state include:

Operational (Op): The storage class memory represented by the SALE is available for all I/O operations. The operational state is entered upon a successful configuring and may be re-entered upon exit from the temporary or permanent error state.

Temporary error (TE): The storage class memory represented by the SALE is not available for any I/O operations. The data state is invalid but the data content at the transition from operational to temporary error is preserved. The temporary error state is entered from the operational state when access to the SCM increment does not exist.

Permanent error (PE): The storage class memory represented by the SALE is not available for any I/O operations. The data state is invalid and the data is lost. The permanent error state is entered from the temporary error state or operational state when an uncorrectable error condition is recognized.

When an operation completes with an indication of permanent error set in the exception qualifier code of the EADM response block, at least that corresponding SCM increment has entered the permanent error state. However, more than the one SCM increment may have entered the permanent error state.

When an SCM increment is not in the operational state, an I/O operation that references a location in the increment recognizes an extended asynchronous data move facility check with either a temporary or a permanent error set in the exception qualifier code of the EADM response block.

Data State 566: A value that indicates the data state of the contents of the storage class memory increment represented by the SALE. The data state is valid when the associated SCM increment is in the configured and operational states.

Example data states include:
- Zeroed—The contents of the SCM increment is all zeros.
- Valid—The contents of the SCM increment is the accumulation of all successful write type operations. Locations in the increment not yet written remain either zeroed or unpredictable.
- Unpredictable—The contents of the SCM increment prior to any write type I/O operation are not known. After one or more write type operations have been performed, data content of other, unwritten locations remains unpredictable even though the locations successfully written result in the data state of the SCM increment becoming valid.

A transition from either zeroed or unpredictable states to valid state occurs with the first successful write. Due to any difference between size of data written and size of the target SCM increment, the change to valid does not describe the actual condition of any data location not yet written. Such a location, not having been accessed for a write, is effectively still described as zeroed or unpredictable.

Rank 568: A value that indicates the conceptual quality of the storage class memory increment represented by the SALE. Rank is valid only when the associated SCM increment is in the configured and operational states. A value of zero means that no rank exists. A nonzero value in a specified range means that a rank exists. In this example, a rank value of one is the highest or best rank. A rank value of fifteen is the lowest or worst rank. All else equal, an SCM with a higher rank is to be preferred over an SCM with a lower rank.

R 570: This field indicates that the SCM increment recognizes a release operation. The following behaviors are related:
1. A released block is first to be written before being read, otherwise an error on a read operation is recognized if a read precedes a write. For such an error, the SCM increment remains in the operational state.
2. Upon initial configuration, the data state is zeroed.
3. The program may do a special operation, called a release, which places a specified block into the released condition.

Resource ID 572: A nonzero value is a resource identifier (RID) of the resource that provides the SCM increment represented by the SALE. When the RID is zero, no resource ID is indicated. In one particular example, the RID represents as many adapters and SSDs that provide storage for the SCM increment. As certain RAID algorithms may be applied, or striping for improving performance by allowing concurrent I/O operations across multiple adapter/SSDs, the RID may represent a compound entity.

Further details regarding the configuration states of the storage class memory, and the operation and data states of the storage class memory address list are described below.

Figure 6A:
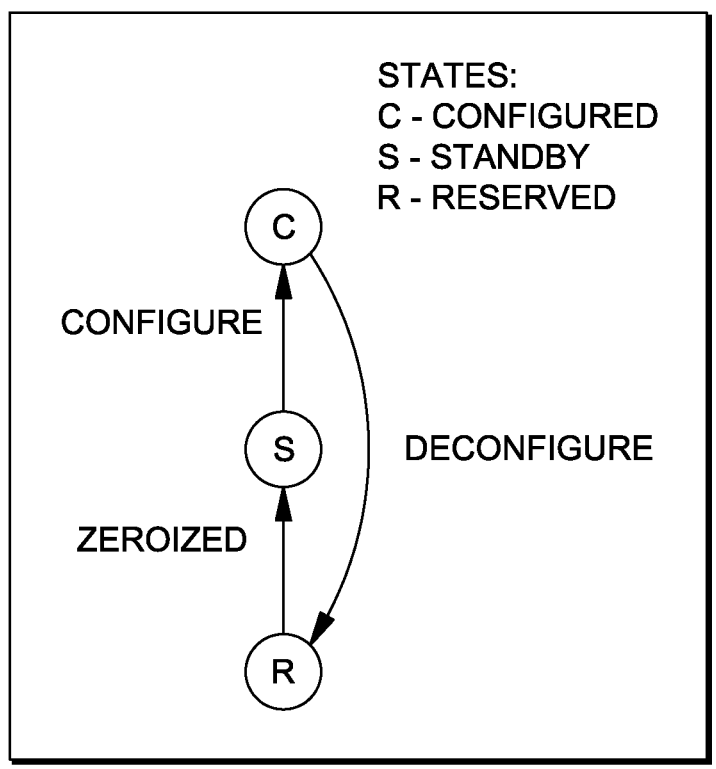
FIG. 6A depicts one example of a state diagram representing various states of storage class memory, in accordance with an aspect of the present invention.

Initially, referring to FIG. 6A, the configuration states and the events/actions that result in transitions within these states are described. As shown, the SCM states are configured, standby and reserved. An SCM can be placed in standby from reserved, and then from standby to configured. From configured, the SCM can be deconfigured and enter a state of reserved.

Figure 6B:
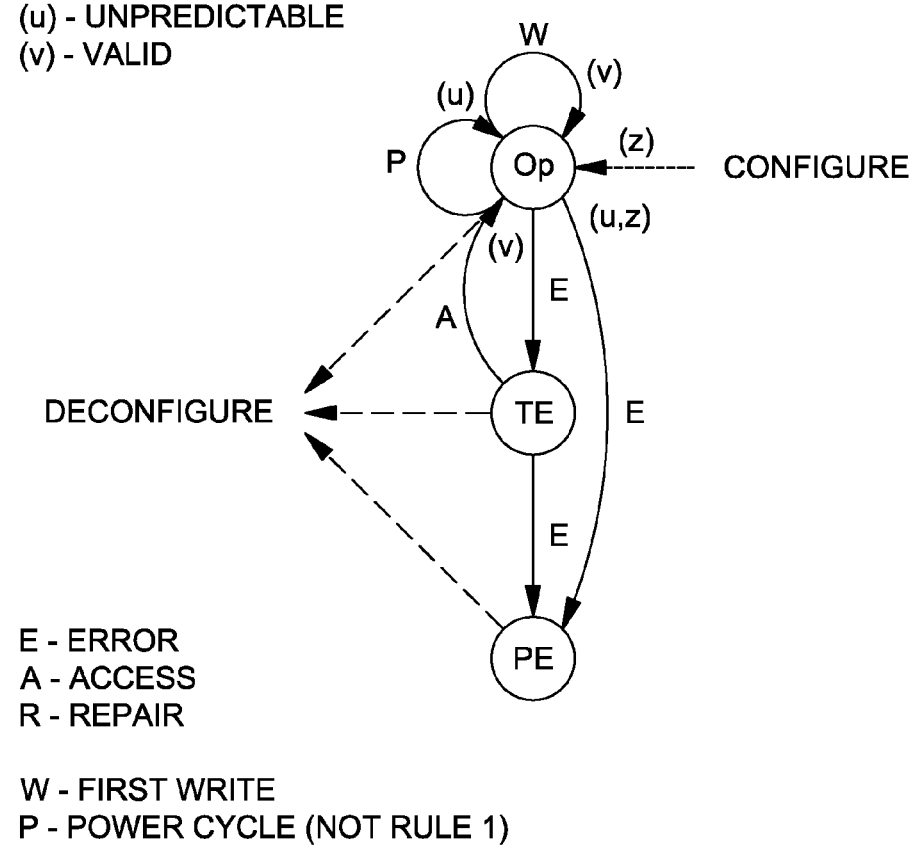
FIG. 6B depicts one embodiment of a state diagram showing operation states and data states, in accordance with an aspect of the present invention.

Referring to FIG. 6B, operation states and the events that result in transitions within these states are shown. An SCM increment is to be in the standby state to be configured and is in the operational state upon successful completion of a configure action. A first write to an SCM increment in the zeroed state moves it to the valid state. An intervening power off and then power on of an SCM increment that is not indicated as having a rule 1 persistence moves the SCM increment to the unpredictable state.

An error (E) may cause transition to the temporary error (TE) state or the permanent error state (PE), depending on the model dependent specifics of the error. Acquisition (A) of connectivity may cause transition from the temporary error state to the operational (Op) state. A deconfigure of an SCM increment can occur regardless of its operation state.

FIG. 6B also illustrates the data states when in the operational state, according to how the operational state was entered. The data state is valid and applies to the corresponding SCM increment when it is configured and in the operational state. The valid data states are zeroed, unpredictable, and valid. The following are the possible data states at the various entries to the operational state:
- From standby—zeroed (z)
- From temporary error—valid (v)
- From permanent-error—unpredictable (u) or zeroed (z)
- From operational—valid (v)—first write
- From operational—unpredictable (u)—power cycled and persistence is not rule 1.

When not in the operational state, the data state is invalid.

When first configured and prior to the first write, the data of an SCM increment is in the zeroed state, meaning that its contents are all zeros.

While the data content of an SCM increment is not changed when moving to or in the temporary error state, the increment is not accessible. Thus, saying that the data is valid might be descriptive, but not overly meaningful due to lack of program accessibility. Therefore, the data state is invalid in this scenario. Also, based on the error that causes the transition from operational to temporary error, if data integrity is affected, the permanent error state is entered, the data state remains invalid, and the data is lost. If a concurrent repair can move an SCM increment in the permanent error state to the operational state without being both deconfigured and then configured again, the original data is still lost, and it is model dependent whether the data state is either unpredictable or zeroed.

The persistence of an SCM increment and its RAS (reliability, accessibility and serviceability) characteristics can also determine a change from valid to unpredictable data state. If persistence is exceeded, it is expected that the data state transitions from valid to unpredictable.

A transition from either zeroed or unpredictable data states to the valid data state occurs with the first successful write. Due to any difference between size of data written and size of the target SCM increment, the change to valid does not describe the actual condition of any data location not yet written. Such a location, previous to a first write access, is effectively still described as zeroed or unpredictable.

After an SCM increment is configured, an unsolicited notification is made pending when any one or more events occur that are observable in the response of the Store SCM Information command. Examples are:
1. Operation state changes from operational to temporary error or permanent error, but not reported in a failed operation.
2. Operation state changes from temporary error to operational.
3. Operation state changes from temporary error to permanent error.
4. Rank change.

Examples where unsolicited notifications are not made pending include the following:

1. Data state changes from zeroed or unpredictable to valid.
2. A Configure Storage Class Memory command completes.
3. A Deconfigure Storage Class Memory command completes.

When a notification is pending, the program observes the notification and may issue the Store SCM Information command to obtain the information. The Store SCM Information command may also be issued at other times in which the program would like information about the SCM and/or SALE.

In one example, a notification includes a machine check interruption being issued to the program, with a corresponding CRW indicating an event report. The program issues the CHSC Store Event Information command and obtains a response block with a content code signaling a storage class memory change notification.

In one embodiment, the Store SCM Information (SSI) command is a channel subsystem command issued by the program (e.g., operating system) to obtain information about the storage class memory and/or an SCM address list entry. In one example, the program issues a Channel Subsystem Call instruction and the SSI command is indicated in a command block of the instruction, which is sent to the channel subsystem. The command is performed at the channel subsystem and a response is returned in a response block, which is the remaining portion of the 4 K-byte control block (i.e., the requested information is stored in the main storage area designated for the response block). Further details regarding operation of the command are described with reference to FIG. 5D.

Initially, the program generates the request block indicated above to request the Store SCM Information command, STEP 580. The request block is obtained by the channel subsystem, STEP 582, and one or more validity checks are made as to the validity of the request block (e.g., valid length field, valid command request block format, command installed, etc.). If the request is not valid, INQUIRY 584, then a response code indicating the problem is placed in the response block, STEP 586, and the response block is returned, STEP 592.

However, if the request is valid, INQUIRY 584, then the channel subsystem obtains the information from the machine (e.g., processors, etc.), STEP 588, and fills in the response block, STEP 590. The response block is returned, STEP 592. For instance, the information is contained in non-volatile storage of the machine and is loaded by firmware into main storage only accessible by firmware during system initialization. The channel subsystem (i.e., firmware in this case) obtains the information by reading it from main storage only accessible by firmware, and populates the response block.

Responsive to receiving the information about the storage class memory or otherwise, a decision may be made to change the configuration of the storage class memory. This decision may be made manually or automatically by the program or other entity. The configuration may be changed by adding increments or deleting increments, as described below.

In one example, to configure the storage class memory, a Configure Storage Class Memory command is used. This command requests an amount of storage class memory to be configured from the available pool of the system. The amount is specified as a size, encoded as a count of SCM increments.

Unless stated otherwise, the number of SCM increments used to satisfy the request is in the initialized state. If the number of SCM increments requested would cause the maximum configurable SCM increments limit to be exceeded, a specific response code is provided.

The contents of each increment are zeros with valid CBC. The applicable persistence rule associated with each configured SCM increment is set by, for instance, manual controls.

Figure 7A:
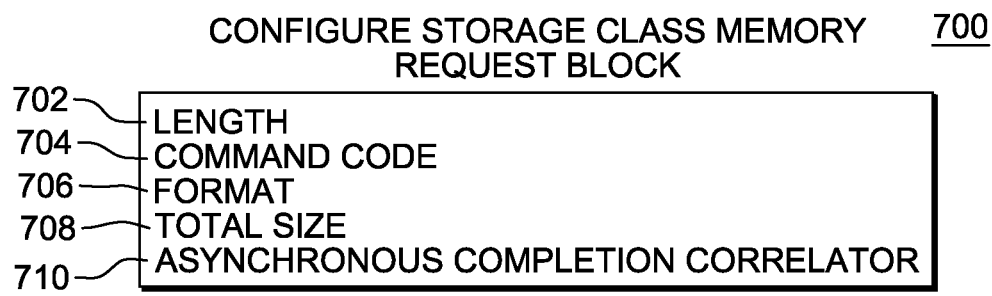
FIG. 7A depicts one embodiment of a Configure Storage Class Memory request block used in accordance with an aspect of the present invention.

One embodiment of a command request block for the Configure Storage Class Memory command is depicted in FIG. 7A. In one example, a Configure Storage Class Memory request block 700 includes:

Length 702: A value that specifies a length of the command request block length.

Command Code 704: A value that specifies the command code for the Configure Storage Class Memory command.

Format (FMT) 706: A value that specifies the format of the command request block.

Total Size (TS) 708: A value that specifies the size of storage class memory requested, encoded as a count of SCM increments. The count of SCM increments already configured plus TS is not to exceed the maximum configurable SCM increments (MCI) limit. If the number of SCM increments in the initialized state is less than the specified total size, a specific response code is provided.

Asynchronous Completion Correlator (ACC) 710: A value that is returned in the asynchronous completion notification field of a notification response described below. The correlator serves to resume the original thread that initiated the request.

Figure 7B:
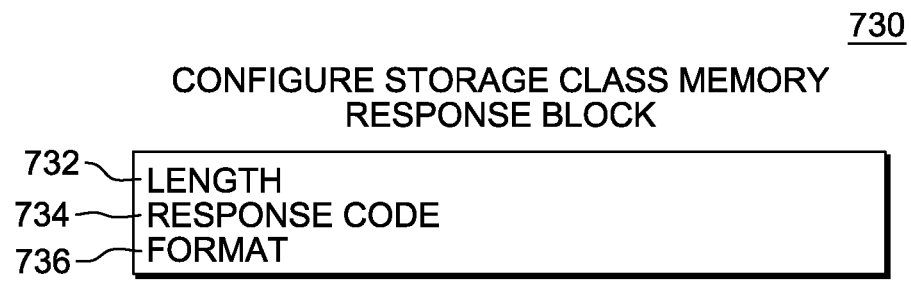
FIG. 7B depicts one embodiment of a Configure Storage Class Memory response block used in accordance with an aspect of the present invention.

One embodiment of a command response block for the Configure Storage Class Memory command is depicted in FIG. 7B. In one embodiment, a command response block 730 includes:

Length 732: A value that indicates a length the command response block.

Response Code 734: A value that describes the results of the attempt to execute the Configure Storage Class Memory command.

If a defined response code is stored in the response code field, an asynchronous process is initiated to finish processing of the command. If a response code other than the defined code is stored in the response code field, no SCM increment is configured, no asynchronous process is initiated, and no subsequent notification is made. Completion of the asynchronous process is indicated in the notification response.

Format (FMT) 736: A value that indicates the format of the command response block.

Figure 7C:
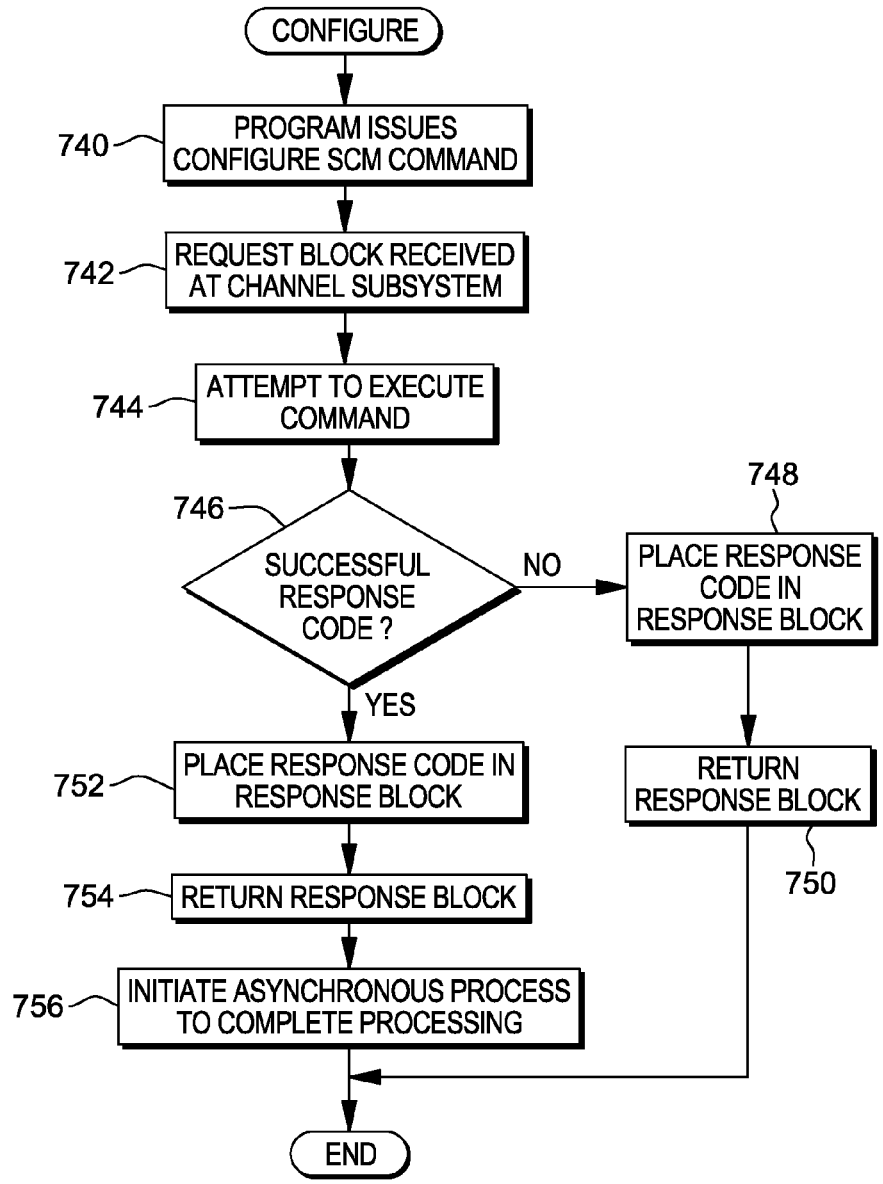
FIGS. 7C-7D depict one embodiment of the logic associated with a Configure Storage Class Memory command used in accordance with an aspect of the present invention.

The Configure Storage Class Memory command is issued by the program to request an amount of storage class memory to be configured into the SCM address space. One embodiment of the logic used to configure the SCM is described with reference to FIG. 7C.

Initially, the program issues a Channel Subsystem Call instruction that includes a Configure SCM command, STEP 740. The request block of the Configure SCM command is obtained by the channel subsystem, STEP 742, and the channel subsystem attempts to execute the command, STEP 744. If the attempt to execute the command produces a response code that does not indicate success, INQUIRY 746, then the response code is placed in the response block of the Configure SCM command, STEP 748, and the response block is returned, STEP 750.

If a successful response code is indicated, INQUIRY 746, then the response code is placed in the response block, STEP 752, and the response block is returned, STEP 754. In this example, a successful response code indicates that the length field of the request block is valid; the command is available in the system; the command request block has a valid format; the channel subsystem is able to perform the command (i.e., not busy); the total size requested does not exceed the maximum configurable SCM increments limit of the requested configuration; and the total size requested does not exceed the number of SCM increments in the initialized state.

Figure 7D:
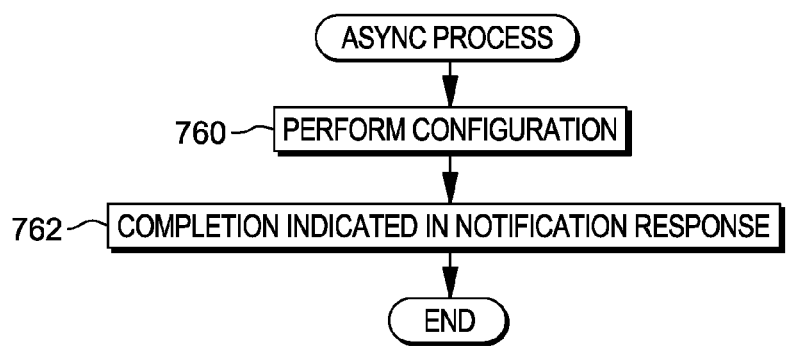

Additionally, an asynchronous process to complete the configuration is initiated, STEP 756. Further details regarding this processing is described with reference to FIG. 7D.

In one embodiment, the asynchronous processing performs the configuration to allocate the one or more increments, STEP 760. For instance, for each configured SCM increment, internal controls are changed to allow the newly-configured increment to be accessible to I/O move requests to that partition. In particular, responsive to the channel subsystem receiving the CHSC Configure command, the firmware of the channel subsystem examines internal tables to confirm there are enough increments to satisfy the request and to ensure the request does not exceed the maximum configurable SCM increments for the configuration. If the request is valid, firmware updates one or more tables to allocate the increment(s) to the configuration and place the increment(s) in the operational state for the configuration. The increments are then accessible to I/O move requests (described above) from the configuration. Completion of the asynchronous process is indicated in a notification response, STEP 762.

Figure 8A:
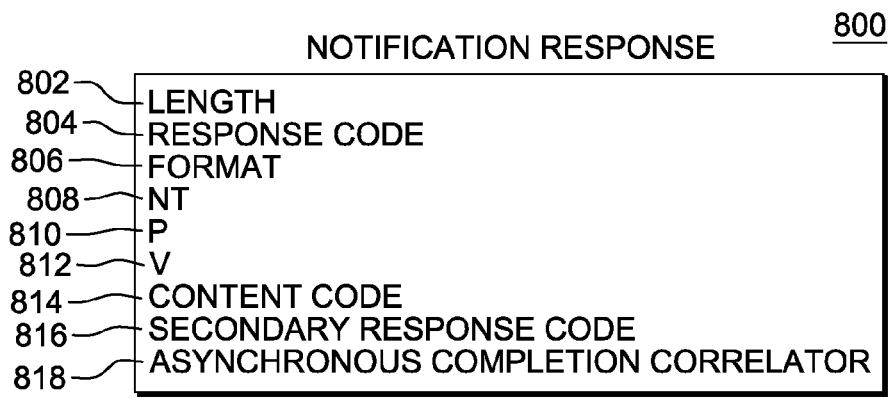
FIG. 8A depicts one example of a notification response block used in accordance with an aspect of the present invention.

Notification response data for the Configure Storage Class Memory command is returned in a response block of a Store Event Information (SEI) command. One embodiment of the format of the notification response block used for the Configure Storage Class Memory command is described with reference to FIG. 8A.

In one embodiment, a notification response block 800 of the Configure Storage Class Memory command includes:
- Length 802: A value that indicates the length of the command response block.
- Response Code 804: A value that describes the results of the attempt to execute the Store Event Information CHSC command.
- Format (FMT) 806: A value that indicates the format of the command response block.
- Notification Type 808: A value that indicates that this is an EADM related notification.
- P 810: When set, specifies that the channel subsystem has pending event information in addition to the information provided in response to this CHSC command.
- V 812: When set, specifies that the channel subsystem has recognized an overflow condition and event information has been lost.
- Content Code 814: A value that indicates that this is a response to the conclusion of execution of the asynchronous process initiated by the Configure Storage Class Memory command request.
- Secondary Response Code 816: A value that further describes the results of the attempt to execute the Configure SCM command.
- When the secondary response code is a specified value, the complete amount of storage class memory, as originally requested, has been configured. Otherwise, response codes may be provided that indicate, for instance, invalid length field, Configure SCM command not installed, Configure SCM command block has an invalid format, total requested size would exceed MCI limit, total size requested exceeds the number of SCM increments in initialized state, channel subsystem busy.
- Asynchronous Completion Correlator (ACC) 818: A value that is originally specified in the corresponding command request block.

Figure 8B:
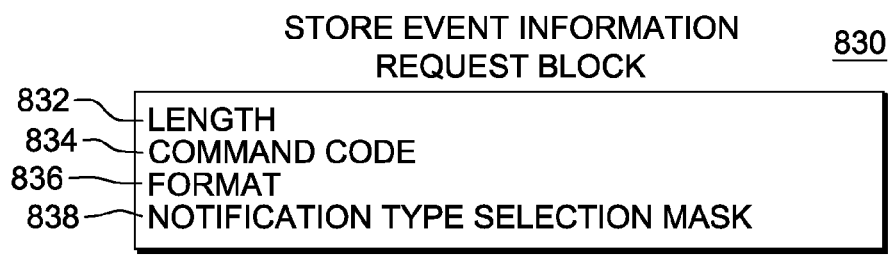
FIG. 8B depicts one embodiment of a Store Event Information request block used in accordance with an aspect of the present invention.
Figure 8C:
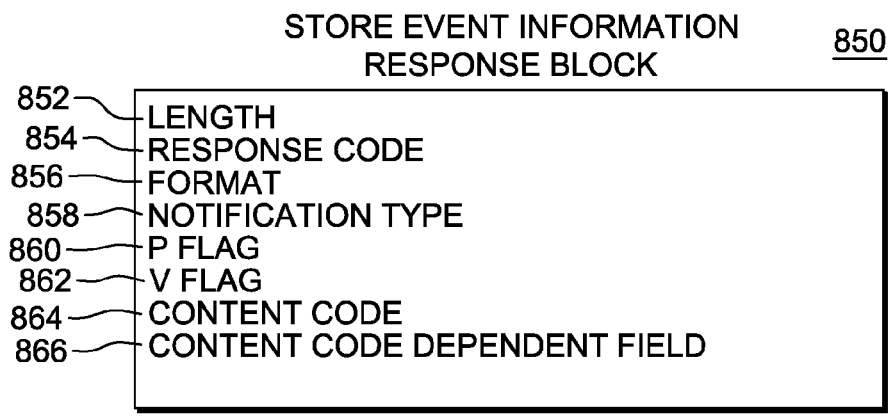
FIG. 8C depicts one embodiment of a Store Event Information response block used in accordance with an aspect of the present invention.

One embodiment of the Store Event Information command used to return the notification response block for the Configure Storage Class Memory command is described with reference to FIGS. 8B-8C.

The Store Event Information command is used to store event information that has been made pending by the channel subsystem. Normally, this command is executed as a result of the program having received an event information pending channel report.

The execution of the Store Event Information command may change information contained in the channel subsystem. The Store Event Information command is executed synchronously.

One embodiment of a command request block for the Store Event Information command is described with reference to FIG. 8B. In one example, a request block 830 includes:
- Length 832: This field specifies a length of the command request block.
- Command Code 834: This field specifies the Store Event Information command.
- Format (FMT) 836: A value that specifies the format of the command request block.
- Notification Type Selection Mask (NTSM) 838: A mask where each bit position corresponds to a logical processor selector (LPS) value of the same numeric value. In one example, bit 0 is ignored and assumed to be one. When a bit position in a specified range starting at 1 is zero, a notification type corresponding to that bit position is not stored in the response block, and is discarded if recognized as pending. When such a bit is one, a notification type corresponding to the bit position may be stored in the response block.

In one embodiment, referring to FIG. 8C, a response block 850 for the Store Event Information command is described below:
- Length 852: A value that specifies the initial length of the command response block. The completion length depends on the response code that is stored as a result of the attempt to execute the Store Event Information command.
- If a response code other than a code indicating success is stored in the response code field, no information is stored in the response data area.
- If a response code indicating success is stored in the response code field, event information is stored in the response data area.
- Response Code 854: A value that describes the results of the attempt to execute the store event information command.
- For the Store Event Information command, the response data area contains a fixed length portion and a variable length portion.
- For a specified format response, when NT is nonzero, the format depends upon the particular notification type, and the format of the content code dependent field depends upon the particular notification type and the content code (CC) field, taken together.
- Format (FMT) 856: A value that specifies the format of the command response block.
- Notification Type (NT) 858: A value that indicates the notification type (NT). A specific value is provided for the Configure SCM command.
- P Flag 860: When set, specifies that the channel subsystem has pending event information in addition to the information provided in response to this CHSC command. The program can obtain the additional information by executing the Store Event Information command again.

When not set, this flag specifies that the channel subsystem has no additional pending event information.

V Flag 862: When set, specifies that the channel subsystem has recognized an overflow condition and event information has been lost. The overflow condition was recognized while the event information not contained in the response data area was the most recently pending information. The overflow does not affect the information contained in the response data area.

Content Code (CC) 864: A value that describes the type of information that is contained in the response data area. In one example, the value indicates a storage class memory change notification in which one or more SCM increments have changed state or status.

Content Code Dependent Field 866: This field may include additional information regarding the event.

Successful notification of a configuration change may prompt the program to issue the Store SCM Information command to obtain details regarding the configuration.

In addition to increasing storage class memory, the storage class memory may be decreased. A Deconfigure Storage Class Memory command requests an amount of storage class memory to be removed from the SCM address space of the requesting configuration. An SCM increment to be deconfigured is to be in the configured state.

The SCM increments to be deconfigured are specified in an SCM increment request list, described herein. One or more contiguous SCM increments may be specified in an SCM increment request list entry (SIRLE). A separate SIRLE may be specified for each list of increments (a.k.a., an extent) that is not contiguous with any other list of increments.

Regardless of persistence rules, a successful deconfigure of an SCM increment places the increment into the uninitialized state. When zeroing is complete, an SCM increment transitions from the unitialized state to the initialized state.

Figure 9A:
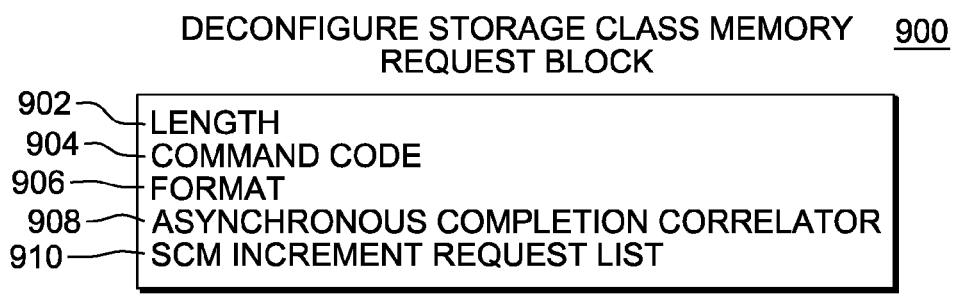
FIG. 9A depicts one embodiment of a Deconfigure Storage Class Memory request block used in accordance with an aspect of the present invention.

One embodiment of a command request block for the Deconfigure Storage Class Memory command is depicted in FIG. 9A. A command request block 900 for the Deconfigure Storage Class Memory command includes, for instance:

Length 902: A value that specifies a length of the command request block. In one example, the length is 32+(N×16) bytes, where N is the count of SCM increment request list entries (SIRLEs). A valid length in this example is evenly divisible by 16 and is in the range (32+1×16) ≤L1≤(32+253×16).

Command Code 904: A value that specifies the command code for the Deconfigure Storage Class Memory command.

Format (FMT) 906: A value that specifies the format of the command request block.

Asynchronous Completion Correlator (ACC) 908: A value that is returned in the asynchronous completion notification, described above.

SCM Increment Request List 910: This field includes an SCM increment request list (SIRL). An SCM increment request list includes one or more entries (SIRLEs). The length of the SIRL is determined from the value of the length field.

An SCM increment request list entry (SIRLE) specifies the size and the location of a specified extent of storage class memory (e.g., a list of increments). An extent or SCM extent is the specified size of storage class memory.

Figure 9B:
FIG. 9B depicts one embodiment of a storage class memory increment request list entry used in accordance with an aspect of the present invention.

Referring to FIG. 9B, in one example, a SIRLE 920 includes:

Total size (TS) 922: A value that specifies the size of storage class memory to be deconfigured, encoded as a count of SCM increments.

Starting SCM address (SA) 924: A value that is an SCM address and is the location in the SCM address space from which to remove the first or only SCM increment deconfigured by the SIRLE. Least significant bit positions that would constitute an offset within the first SCM increment are ignored and assumed to be zeros, in this example.

When total size is greater than one, each additional SCM increment beyond the first increment is located at an SCM address that is evenly divisible by the SCM increment size, that contains a configured SCM increment, and whose location is contiguous with the last byte of the prior SCM increment. In other words, in the next, consecutive location.

If the space described by the starting address and the total size, taken together, is not completely full of configured SCM increments a specified response code is provided, no SCM increment is deconfigured, no asynchronous process is initiated, and no subsequent notification occurs.

Upon successful completion, each deconfigured SCM increment has entered the reserved state and is then zeroized before being placed into the standby state.

Figure 9C:
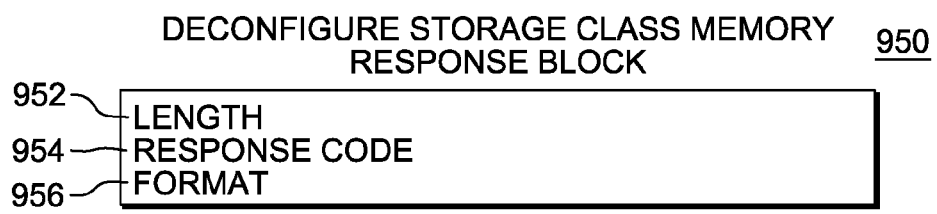
FIG. 9C depicts one embodiment of a Deconfigure Storage Class Memory response block used in accordance with an aspect of the present invention.

A command response block for the Deconfigure Storage Class Memory command is depicted in FIG. 9C. In one embodiment, a command response block 950 includes:

Length 952: A value that indicates the length of the command response block.

Response Code 954: A value that describes the results of the attempt to execute the Deconfigure Storage Class Memory command.

If a response code of a specified value is stored in the response code field, an asynchronous process is initiated to finish processing of the command. If a response code other than the specified value is stored in the response code field, no SCM increment is deconfigured, no asynchronous process is initiated, and no subsequent notification is made. Completion of the asynchronous process is indicated in the notification response.

Before the synchronous part of the Deconfigure Storage Class Memory command completes with a specified response code, all entries in the SCM increment request list are examined to ensure that all specified SCM increments are in the configured state.

Format (FMT) 956: A value that indicates the format of the command response block.

Figure 9D:
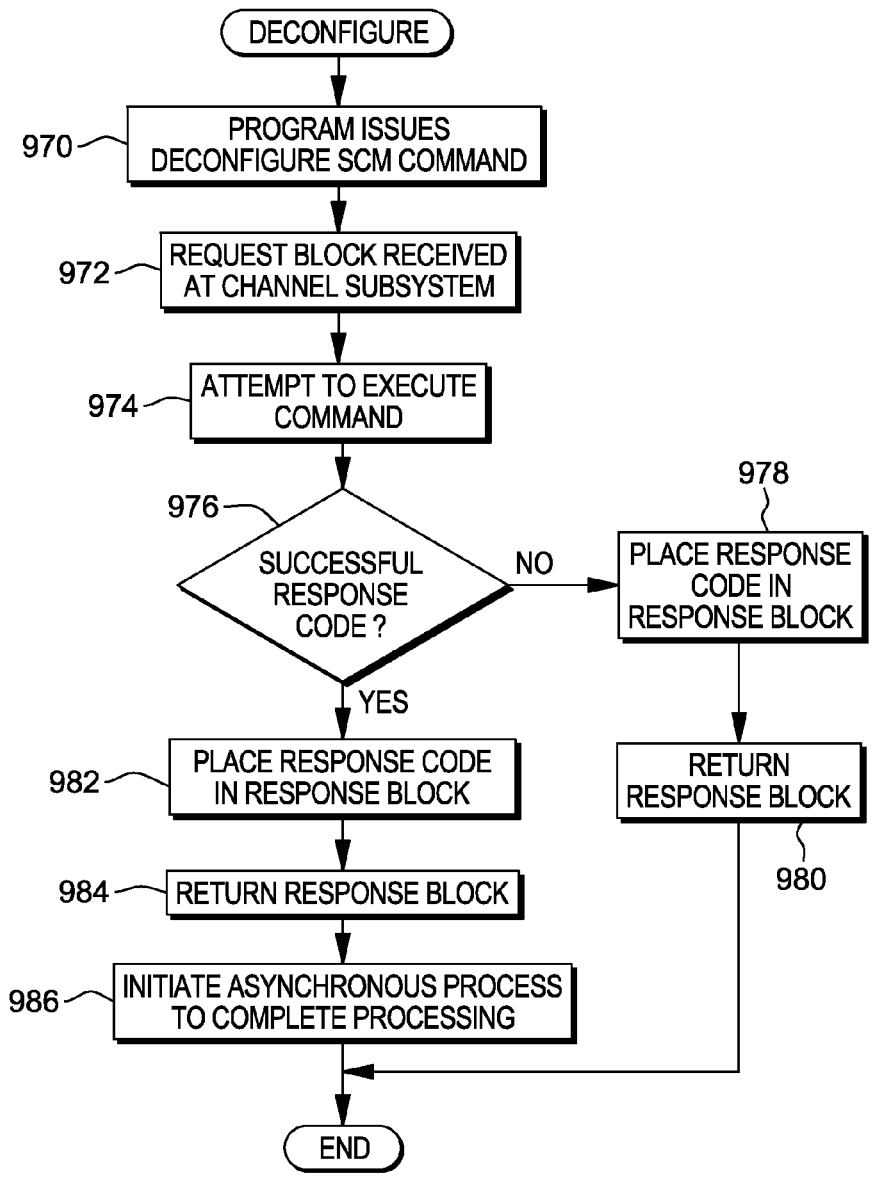
FIGS. 9D-9E depict one embodiment of the logic associated with a Deconfigure Storage Class Memory command used in accordance with an aspect of the present invention.
Figure 9E:
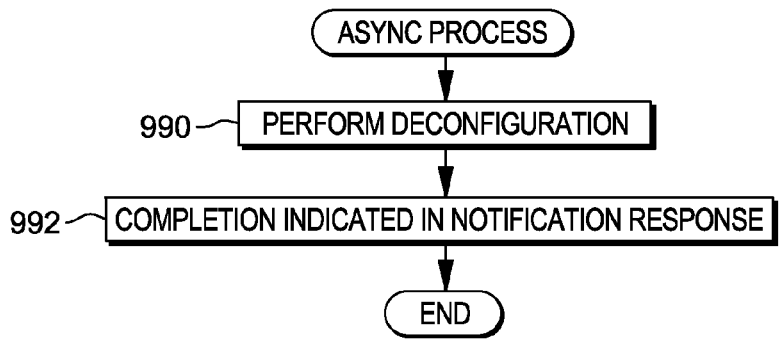

One embodiment of the logic associated with the Deconfigure SCM command is described with reference to FIGS. 9D-9E.

Initially, the program issues a Channel Subsystem Call instruction that includes a Deconfigure SCM command, STEP 970. The request block of the Deconfigure SCM command is obtained by the channel subsystem, STEP 972, and the channel subsystem attempts to execute the command, STEP 974. If the attempt to execute the command produces a response code that does not indicate success, INQUIRY 976, then the response code is placed in the response block of the Deconfigure SCM command, STEP 978, and the response block is returned, STEP 980.

If a successful response code is indicated, INQUIRY 976, then the response code is placed in the response block, STEP 982, and the response block is returned, STEP 984. In this example, a successful response code indicates that the length field of the request block is valid; the command is available in the system; the command request block has a valid format; the channel subsystem is able to perform the command (i.e., not busy); and the SCM increments were originally in the configured state.

Additionally, an asynchronous process to complete the deconfiguration is initiated, STEP 986. Further details regarding this processing is described with reference to FIG. 9E.

In one embodiment, the asynchronous processing performs the deconfiguration, STEP 990. For instance, the one or more increments are deallocated. An SCM increment is moved from the configured state to the reserved state. Upon entry of the reserved state, a zeroing process ensues, and when complete, the SCM increment transitions to the standby state. Completion of the asynchronous process is indicated in a notification response, STEP 992.

The notification response data for the Deconfigure Storage Class Memory command is returned in the response block of the Store Event Information (SEI) CHSC command. One example of this response block is described with reference to FIG. 8A. However, the content code in this example indicates that this is a response to the conclusion of execution of the asynchronous process initiated by the Deconfigure Storage Class Memory command request. Similarly, the secondary response code further describes the results of the attempt to execute the Deconfigure Storage Class Memory command.

In a further embodiment, allocation and deallocation of storage increments may be requested via a panel presented to a user. For instance, a service element is used to provide a graphical interface through which a user may specify parameters to the system. For storage class memory, a panel called the storage class memory allocation panel allows the user to perform the following operations:

1. Specify the maximum configurable increments (MCI) for a given configuration;
2. Allocate increments to a configuration;
3. Deallocate increments from a configuration.

The panel also allows viewing of configuration increment allocations and MCI, and the number of increments in the available, unavailable, and unitialized pools. When, due to an action at the SE, an increments allocation changes or when the size of the one of the pools changes, a notification is sent to the configurations.

Described in detail above is a facility to manage storage class memory. It provides an abstraction to allow the program to access the memory without specific knowledge of the memory. In accordance with one or more aspects of the present invention, a capability is provided to move data between main storage and SCM; to clear or release SCM; to configure or deconfigure SCM; and to discovery the configuration of SCM. Other capabilities are also provided.

In one embodiment, storage class memory is presented as a flat memory space to user-level programs, independent of its physical implementation across multiple devices and I/O adapters.

Details regarding channel subsystems and/or an ADM facility are described in U.S. Pat. No. 5,377,337, entitled "Method and Means for Enabling Virtual Addressing Control By Software Users Over A Hardware Page Transfer Control Entity," Antognini et al., issued Dec. 27, 1994; U.S. Serial No. 5,442,802, entitled "Asynchronous Co-Processor Data Mover Method and Means," Brent et al., issued Aug. 15, 1995; and U.S. Pat. No. 5,526,484, entitled "Method and System for Pipelining the Processing of Channel Command Words," issued Jun. 11, 1996, each of which is hereby incorporated herein by reference in its entirety.

Additionally, further information relating to a channel subsystem and instructions associated therewith (for a particular implementation of the z/Architecture®) is provided below:

Input/Output (I/O)

The terms "input" and "output" are used to describe the transfer of data between I/O devices and main storage. An operation involving this kind of transfer is referred to as an I/O operation. The facilities used to control I/O operations are collectively called the channel subsystem. (I/O devices and their control units attach to the channel subsystem.)

The Channel Subsystem

The channel subsystem directs the flow of information between I/O devices and main storage. It relieves CPUs of the task of communicating directly with I/O devices and permits data processing to proceed concurrently with I/O processing. The channel subsystem uses one or more channel paths as the communication link in managing the flow of information to or from I/O devices. As part of I/O processing, the channel subsystem also performs a path-management operation by testing for channel-path availability, chooses an available channel path, and initiates the performance of the I/O operation by the device.

Within the channel subsystem are subchannels. One subchannel is provided for and dedicated to each I/O device accessible to the program through the channel subsystem.

The multiple-subchannel-set facility is an optional facility. When it is installed, subchannels are partitioned into multiple subchannel sets, and each subchannel set may provide one dedicated subchannel to an I/O device. Depending on the model and the interface used, some I/O devices may only be allowed to be accessed via certain subchannel sets.

Each subchannel provides information concerning the associated I/O device and its attachment to the channel subsystem. The subchannel also provides information concerning I/O operations and other functions involving the associated I/O device. The subchannel is the means by which the channel subsystem provides information about associated I/O devices to CPUs, which obtain this information by executing I/O instructions. The actual number of subchannels provided depends on the model and the configuration; the maximum addressability is 0-65,535 in each subchannel set.

I/O devices are attached through control units to the channel subsystem by means of channel paths. Control units may be attached to the channel subsystem by more than one channel path, and an I/O device may be attached to more than one control unit. In all, an individual I/O device may be accessible to the channel subsystem by as many as eight different channel paths via a subchannel, depending on the model and the configuration. The total number of channel paths provided by a channel subsystem depends on the model and the configuration; the maximum addressability is 0-255.

The performance of a channel subsystem depends on its use and on the system model in which it is implemented. Channel paths are provided with different data-transfer capabilities, and an I/O device designed to transfer data only at a specific rate (a magnetic-tape unit or a disk storage, for example) can operate only on a channel path that can accommodate at least this data rate.

The channel subsystem contains common facilities for the control of I/O operations. When these facilities are provided in the form of separate, autonomous equipment designed specifically to control I/O devices, I/O operations are completely overlapped with the activity in CPUs. The only main-storage cycles required by the channel subsystem during I/O operations are those needed to transfer data and control information to or from the final locations in main storage, along with those cycles that may be required for the channel subsystem to access the subchannels when they are implemented as part of nonaddressable main storage. These cycles do not delay CPU programs, except when both the CPU and the channel subsystem concurrently attempt to reference the same main-storage area.

Subchannel Sets

When the multiple-subchannel-set facility is installed, subchannels are partitioned into multiple subchannel sets. There may be up to four subchannel sets, each identified by a subchannel-set identifier (SSID). When the multiple-subchannel-set facility is not installed, there is only one subchannel set with an SSID of zero. When the multiple-subchannel-set facility is not enabled, only subchannel set zero is visible to the program.

Subchannels

A subchannel provides the logical appearance of a device to the program and contains the information required for sustaining a single I/O operation. The subchannel consists of internal storage that contains information in the form of a channel-program designation, channel-path identifier, device number, count, status indications, and I/O-interruption-subclass code, as well as information on path availability and functions pending or being performed. I/O operations are initiated with a device by the execution of I/O instructions that designate the subchannel associated with the device.

Each device is accessible by means of one subchannel in each channel subsystem to which it is assigned during configuration at installation time. The device may be a physically identifiable unit or may be housed internal to a control unit. For example, in certain disk-storage devices, each actuator used in retrieving data is considered to be a device. In all cases, a device, from the point of view of the channel subsystem, is an entity that is uniquely associated with one subchannel and that responds to selection by the channel subsystem by using the communication protocols defined for the type of channel path by which it is accessible.

On some models, subchannels are provided in blocks. On these models, more subchannels may be provided than there are attached devices. Subchannels that are provided but do not have devices assigned to them are not used by the channel subsystem to perform any function and are indicated by storing the associated device-number-valid bit as zero in the subchannel-information block of the subchannel.

The number of subchannels provided by the channel subsystem is independent of the number of channel paths to the associated devices. For example, a device accessible through alternate channel paths still is represented by a single subchannel. Each subchannel is addressed by using a 16-bit binary subchannel number and a two-bit SSID when the subchannel-set facility is installed.

After I/O processing at the subchannel has been requested by the execution of START SUBCHANNEL, the CPU is released for other work, and the channel subsystem assembles or disassembles data and synchronizes the transfer of data bytes between the I/O device and main storage. To accomplish this, the channel subsystem maintains and updates an address and a count that describe the destination or source of data in main storage. Similarly, when an I/O device provides signals that should be brought to the attention of the program, the channel subsystem transforms the signals into status information and stores the information in the subchannel, where it can be retrieved by the program.

Attachment of Input/Output Devices

Channel Paths

The channel subsystem communicates with I/O devices by means of channel paths between the channel subsystem and control units. A control unit may be accessible by the channel subsystem by more than one channel path. Similarly, an I/O device may be accessible by the channel subsystem through more than one control unit, each having one or more channel paths to the channel subsystem.

Devices that are attached to the channel subsystem by multiple channel paths configured to a subchannel, may be accessed by the channel subsystem using any of the available channel paths. Similarly, a device having the dynamic-reconnection feature and operating in the multipath mode can be initialized to operate such that the device may choose any of the available channel paths configured to the subchannel, when logically reconnecting to the channel subsystem to continue a chain of I/O operations.

The channel subsystem may contain more than one type of channel path. Examples of channel-path types used by the channel subsystem are the ESCON I/O interface, FICON I/O interface, FICON-converted I/O interface, and IBM System/360 and System/370 I/O interface. The term "serial-I/O interface" is used to refer the ESCON I/O interface, the FICON I/O interface, and the FICON-converted I/O interface. The term "parallel-I/O interface" is used to refer to the IBM System/360 and System/370 I/O interface.

The ESCON I/O interface is described in the System Library publication IBM Enterprise Systems Architecture/390 ESCON I/O Interface, SA22-7202, which is hereby incorporated herein by reference in its entirety.

The FICON I/O interface is described in the ANSI standards document Fibre Channel—Single-Byte Command Code Sets-2 (FC-SB-2).

The IBM System/360 and System/370 I/O interface is described in the System Library publication IBM System/360 and System/370 I/O Interface Channel to Control Unit OEMI, GA22-6974, which is hereby incorporated herein by reference in its entirety.

Depending on the type of channel path, the facilities provided by the channel path, and the I/O device, an I/O operation may occur in one of three modes, frame-multiplex mode, burst mode, or byte-multiplex mode.

In the frame-multiplex mode, the I/O device may stay logically connected to the channel path for the duration of the execution of a channel program. The facilities of a channel path capable of operating in the frame-multiplex mode may be shared by a number of concurrently operating I/O devices. In this mode the information required to complete an I/O operation is divided into frames that may be interleaved with frames from I/O operations for other I/O devices. During this period, multiple I/O devices are considered to be logically connected to the channel path.

In the burst mode, the I/O device monopolizes a channel path and stays logically connected to the channel path for the transfer of a burst of information. No other device can communicate over the channel path during the time a burst is transferred. The burst can consist of a few bytes, a whole block of data, a sequence of blocks with associated control and status information (the block lengths may be zero), or status information that monopolizes the channel path. The facilities of the channel path capable of operating in the burst mode may be shared by a number of concurrently operating I/O devices.

Some channel paths can tolerate an absence of data transfer for about a half minute during a burst-mode operation, such as occurs when a long gap on magnetic tape is read. An equipment malfunction may be indicated when an absence of data transfer exceeds the prescribed limit.

In the byte-multiplex mode, the I/O device stays logically connected to the channel path only for a short interval of time. The facilities of a channel path capable of operating in the byte-multiplex mode may be shared by a number of concurrently operating I/O devices. In this mode, all I/O operations are split into short intervals of time during which only a segment of information is transferred over the channel path. During such an interval, only one device and its associated subchannel are logically connected to the channel path. The intervals associated with the concurrent operation of multiple I/O devices are sequenced in response to demands from the devices. The channel-subsystem facility associated with a subchannel exercises its controls for any one operation only for the time required to transfer a segment of information. The segment can consist of a single byte of data, a few bytes of data, a status report from the device, or a control sequence used for the initiation of a new operation.

Ordinarily, devices with high data-transfer-rate requirements operate with the channel path in the frame-multiplex mode, slower devices operate in the burst mode, and the slowest devices operate in the byte-multiplex mode. Some control units have a manual switch for setting the desired mode of operation.

An I/O operation that occurs on a parallel-I/O-interface type of channel path may occur in either the burst mode or the byte-multiplex mode depending on the facilities provided by the channel path and the I/O device. For improved performance, some channel paths and control units are provided with facilities for high-speed transfer and data streaming. See the System Library publication IBM System/360 and System/370 I/O Interface Channel to Control Unit OEMI, GA22-6974, for a description of those two facilities, which is hereby incorporated herein by reference in its entirety.

An I/O operation that occurs on a serial-I/O-interface-type of channel path may occur in either the frame-multiplex mode or the burst mode. For improved performance, some control units attaching to the serial-I/O interface provide the capability to provide sense data to the program concurrent with the presentation of unit-check status, if permitted to do so by the program.

Depending on the control unit or channel subsystem, access to a device through a subchannel may be restricted to a single channel-path type.

The modes and features described above affect only the protocol used to transfer information over the channel path and the speed of transmission. No effects are observable by CPU or channel programs with respect to the way these programs are executed.

Control Units

A control unit provides the logical capabilities necessary to operate and control an I/O device and adapts the characteristics of each device so that it can respond to the standard form of control provided by the channel subsystem.

Communication between the control unit and the channel subsystem takes place over a channel path. The control unit accepts control signals from the channel subsystem, controls the timing of data transfer over the channel path, and provides indications concerning the status of the device.

The I/O device attached to the control unit may be designed to perform only certain limited operations, or it may perform many different operations. A typical operation is moving a recording medium and recording data. To accomplish its operations, the device needs detailed signal sequences peculiar to its type of device. The control unit decodes the commands received from the channel subsystem, interprets them for the particular type of device, and provides the signal sequence required for the performance of the operation.

A control unit may be housed separately, or it may be physically and logically integrated with the I/O device, the channel subsystem, or a CPU. In the case of most electromechanical devices, a well-defined interface exists between the device and the control unit because of the difference in the type of equipment the control unit and the device require. These electromechanical devices often are of a type where only one device of a group attached to a control unit is required to transfer data at a time (magnetic-tape units or disk-access mechanisms, for example), and the control unit is shared among a number of I/O devices. On the other hand, in some electronic I/O devices, such as the channel-to-channel adapter, the control unit does not have an identity of its own.

From the programmer's point of view, most functions performed by the control unit can be merged with those performed by the I/O device. Therefore, normally no specific mention of the control-unit function is made in this description; the performance of I/O operations is described as if the I/O devices communicated directly with the channel subsystem. Reference is made to the control unit only when emphasizing a function performed by it or when describing how the sharing of the control unit among a number of devices affects the performance of I/O operations.

I/O Devices

An input/output (I/O) device provides external storage, a means of communication between data-processing systems, or a means of communication between a system and its environment. I/O devices include such equipment as magnetic-tape units, direct-access-storage devices (for example, disks), display units, typewriter-keyboard devices, printers, teleprocessing devices, and sensor-based equipment. An I/O device may be physically distinct equipment, or it may share equipment with other I/O devices.

Most types of I/O devices, such as printers, or tape devices, use external media, and these devices are physically distinguishable and identifiable. Other types are solely electronic and do not directly handle physical recording media. The channel-to-channel adapter, for example, provides for data transfer between two channel paths, and the data never reaches a physical recording medium outside main storage. Similarly, communication controllers may handle the transmission of information between the data-processing system and a remote station, and its input and output are signals on a transmission line.

In the simplest case, an I/O device is attached to one control unit and is accessible from one channel path. Switching equipment is available to make some devices accessible from two or more channel paths by switching devices among control units and by switching control units among channel paths. Such switching equipment provides multiple paths by which an I/O device may be accessed. Multiple channel paths to an I/O device are provided to improve performance or I/O availability, or both, within the system. The management of multiple channel paths to devices is under the control of the channel subsystem and the device, but the channel paths may indirectly be controlled by the program.

I/O Addressing

Four different types of I/O addressing are provided by the channel subsystem for the necessary addressing of the various components: channel-path identifiers, subchannel numbers, device numbers, and, though not visible to programs, addresses dependent on the channel-path type. When the multiple-subchannel-set facility is installed, the subchannel-set identifier (SSID) is also used in I/O addressing.

Subchannel-Set Identifier

The subchannel-set identifier (SSID) is a two-bit value assigned to each provided subchannel set.

Channel-Path Identifier

The channel-path identifier (CHPID) is a system-unique eight-bit value assigned to each installed channel path of the system. A CHPID is used to address a channel path. A CHPID is specified by the second-operand address of RESET CHANNEL PATH and used to designate the channel path that is to be reset. The channel paths by which a device is accessible are identified in the subchannel-information block (SCHIB), each by its associated CHPID, when STORE SUBCHANNEL is executed. The CHPID can also be used in operator messages when it is necessary to identify a particular channel path. A system model may provide as many as 256 channel paths. The maximum number of channel paths and the assignment of CHPIDs to channel paths depends on the system model.

Subchannel Number

A subchannel number is a system-unique 16-bit value used to address a subchannel. This value is unique within a subchannel set of a channel subsystem. The subchannel is addressed by eight I/O instructions: CANCEL SUBCHANNEL, CLEAR SUBCHANNEL, HALT SUBCHANNEL, MODIFY SUBCHANNEL, RESUME SUBCHANNEL, START SUBCHANNEL, STORE SUBCHANNEL, and TEST SUBCHANNEL. All I/O functions relative to a specific I/O device are specified by the program by designating a subchannel assigned to the I/O device. Subchannels in each subchannel set are always assigned subchannel numbers within a single range of contiguous numbers. The lowest-numbered subchannel is subchannel 0. The highest-numbered subchannel of the channel subsystem has a subchannel number equal to one less than the number of subchannels provided. A maximum of 65,536 subchannels can be provided in each subchannel set. Normally, subchannel numbers are only used in communication between the CPU program and the channel subsystem.

Device Number

Each subchannel that has an I/O device assigned to it also contains a parameter called the device number. The device number is a 16-bit value that is assigned as one of the parameters of the subchannel at the time the device is assigned to the subchannel. The device number uniquely identifies a device to the program.

The device number provides a means to identify a device, independent of any limitations imposed by the system model, the configuration, or channel-path protocols. The device number is used in communications concerning the device that take place between the system and the system operator. For example, the device number is entered by the system operator to designate the input device to be used for initial program loading.

Programming Note: The device number is assigned at device-installation time and may have any value. However, the user must observe any restrictions on device-number assignment that may be required by the control program, support programs, or the particular control unit or I/O device.

Device Identifier

A device identifier is an address, not apparent to the program, that is used by the channel subsystem to communicate with I/O devices. The type of device identifier used depends on the specific channel-path type and the protocols provided. Each subchannel contains one or more device identifiers.

For a channel path of the parallel-I/O-interface type, the device identifier is called a device address and consists of an eight-bit value. For the ESCON I/O interface, the device identifier consists of a four-bit control-unit address and an eight-bit device address. For the FICON I/O interface, the device identifier consists of an eight-bit control-unit-image ID and an eight-bit device address. For the FICON-converted I/O interface, the device identifier consists of a four-bit control-unit address and an eight-bit device address.

The device address identifies the particular I/O device (and, on the parallel-I/O interface, the control unit) associated with a subchannel. The device address may identify, for example, a particular magnetic-tape drive, disk-access mechanism, or transmission line. Any number in the range 0-255 can be assigned as a device address.

Fibre-Channel Extensions

The fibre-channel-extensions (FCX) facility is an optional facility that provides for the formation of a channel program that is composed of a transport-control word (TCW) that designates a transport-command-control block (TCCB) and a transport-status block (TSB). The TCCB includes a transport-command area (TCA) which contains a list of up to 30 I/O commands that are in the form of device-command words (DCWs). A TCW and its TCCB may specify either a read or a write operation. In addition to the IRB, the TSB contains the completion status and other information related to the TCW channel program.

The FCX facility provides the ability to directly or indirectly designate any or all of the TCCB, the input data storage area, and the output data storage area. When a storage area is designated directly, the TCW specifies the location of a single, contiguous block of storage. When a storage area is designated indirectly, the TCW designates the location of a list of one or more transport-indirect-data-address words (TIDAWs). TIDAW lists and the storage area designated by each TIDAW in a list are restricted from crossing 4 K-byte boundaries The FCX facility also provides an interrogate operation that may be initiated by the CANCEL SUBCHANNEL instruction to determine the state of an I/O operation.

I/O-Command Words

An I/O-command word specifies a command and contains information associated with the command. When the FCX facility is installed, there are two elemental forms of I/O command words which are the channel-command word (CCW) and the device-command word (DCW).

A CCW is 8-bytes in length and specifies the command to be executed. For commands that initiate certain operations the CCW also designates the storage area associated with the operation, the count of data bytes, the action to be taken when the command completes, and other options. All I/O devices recognize CCWs.

A DCW is 8-bytes in length and specifies the command to be executed. the count of data bytes, and other options. I/O devices that support FCX recognize DCWs.

Transport Command Word (TCW)

A TCW designates a transport-command-control block (TCCB) which contains a list of commands to be transported to and executed by an I/O device. The TCW also designates the storage areas for the commands in the TCCB as well as a transport-status block (TSB) to contain the status of the I/O operation.

Channel Program Organization

When the FCX facility is not installed, there is a single form of channel program which is the CCW channel program. When the FCX facility is installed, there is an additional form of channel program which is the TCW channel program. Both forms of channel programs are described below.

CCW Channel Program

A channel program that is composed of one or more CCWs is called a CCW channel program (CCP). Such a channel program contains one or more CCWs that are logically linked and arranged for sequential execution by the channel subsystem.

TCW Channel Program

A channel program that is composed of a single TCW is called a TCW channel program. A TCW designates a transport-command-control block (TCCB) that contains from 1 to 30 DCWs. The DCWs within the TCCB are logically linked and arranged for sequential execution. For DCWs that specify control information, the TCCB also contains the control information for those commands. The TCW also designates the storage area or areas for the DCWs that specify the transfer of data from or to the device and the location of a transport-status block (TSB) for completion status. The TCCB and the storage areas for the transfer of data may be specified as either contiguous or noncontiguous storage.

The TCW also designates a TSB for completion status.

Execution of I/O Operations

I/O operations are initiated and controlled by information with four types of formats: the instruction START SUBCHANNEL, transport-command words, I/O-command words, and orders. The START SUBCHANNEL instruction is executed by a CPU and is part of the CPU program that supervises the flow of requests for I/O operations from other programs that manage or process the I/O data.

When START SUBCHANNEL is executed, parameters are passed to the target subchannel requesting that the channel subsystem perform a start function with the I/O device associated with the subchannel. The channel subsystem performs the start function by using information at the subchannel, including the information passed during the execution of the START SUBCHANNEL instruction, to find an accessible channel path to the device. Once the device has been selected, the execution of an I/O operation is accomplished by the decoding and execution of a CCW by the channel subsystem and the I/O device, for CCW channel programs, or for TCW channel programs, by transporting the TCCB to the I/O device by the channel subsystem and the decoding and execution of a DCW by the device. I/O-command words, and transport-command words are fetched from main storage, although the modifier bits in the command code of a CCW DCW may specify device-dependent conditions for the execution of an operation at the device.

Operations peculiar to a device, such as rewinding tape or positioning the access mechanism on a disk drive, are specified by orders that are decoded and executed by I/O devices. Orders may be transferred to the device as modifier bits in the command code of a control command, may be transferred to the device as data during a control or write operation, or may be made available to the device by other means.

Start-Function Initiation

CPU programs initiate I/O operations with the instruction START SUBCHANNEL. This instruction passes the contents of an operation-request block (ORB) to the subchannel.

If the ORB specifies a CCW channel program, the contents of the ORB include the subchannel key, the address of the first CCW to be executed, and a specification of the format of the CCWs. The CCW specifies the command to be executed and the storage area, if any, to be used. If the ORB specifies a TCW channel program, the contents of the ORB include the subchannel key and the address of the TCW to be executed. The TCW designates the TCCB which contains the commands to be transported to the device for execution, the storage area or areas, if any, to be used for data transfer, and the TSB to contain the status of the I/O operation.

When the ORB contents have been passed to the subchannel, the execution of START SUBCHANNEL is complete. The results of the execution of the instruction are indicated by the condition code set in the program-status word.

When facilities become available and the ORB specifies a CCW channel program, the channel subsystem fetches the first CCW and decodes it according to the format bit specified in the ORB. If the format bit is zero, format-0 CCWs are specified. If the format bit is one, format-1 CCWs are specified. Format-0 and format-1 CCWs contain the same information, but the fields are arranged differently in the format-1 CCW so that 31-bit addresses can be specified directly in the CCW. When facilities become available and the ORB specifies a TCW channel program, the channel subsystem fetches the designated TCW and transports the designated TCCB to the device. Storage areas designated by the TCW for the transfer of data to or from the device are 64-bit addresses.

Subchannel Operation Modes

There are two modes of subchannel operation. A subchannel enters transport mode when the FCX facility is installed and the start function is set at the subchannel as the result of the execution of a START SUBCHANNEL instruction that specifies a TCW channel program. The subchannel remains in transport mode until the start function is reset at the subchannel. At all other times, the subchannel is in command mode.

Path Management

If ORB specifies a CCW channel program and the first CCW passes certain validity tests and does not have the suspend flag specified as one or if the ORB specifies a TCW channel program and the designated TCW passes certain validity tests, the channel subsystem attempts device selection by choosing a channel path from the group of channel paths that are available for selection. A control unit that recognizes the device identifier connects itself logically to the channel path and responds to its selection.

If the ORB specifies a CCW channel program, the channel subsystem sends the command-code part of the CCW over the channel path, and the device responds with a status byte indicating whether the command can be executed. The control unit may logically disconnect from the channel path at this time, or it may remain connected to initiate data transfer.

If the ORB specifies a TCW channel program, the channel subsystem uses information in the designated TCW to transfer the TCCB to the control unit. The contents of the TCCB are ignored by the channel subsystem and only have meaning to the control unit and I/O device.

If the attempted selection does not occur as a result of either a busy indication or a path-not-operational condition, the channel subsystem attempts to select the device by an alternate channel path if one is available. When selection has been attempted on all paths available for selection and the busy condition persists, the operation remains pending until a path becomes free. If a path-not-operational condition is detected on one or more of the channel paths on which device selection was attempted, the program is alerted by a subsequent I/O interruption. The I/O interruption occurs either upon execution of the channel program (assuming the device was selected on an alternate channel path) or as a result of the execution being abandoned because path-not-operational conditions were detected on all of the channel paths on which device selection was attempted.

Channel-Program Execution

If the command is initiated at the device and command execution does not require any data to be transferred to or from the device, the device may signal the end of the operation immediately on receipt of the command code. In operations that involve the transfer of data, the subchannel is set up so that the channel subsystem will respond to service requests from the device and assume further control of the operation.

An I/O operation may involve the transfer of data to or from one storage area, designated by a single CCW or TCW or to or from a number of noncontiguous storage areas. In the latter case, generally a list of CCWs is used for the execution of the I/O operation, with each CCW designating a contiguous storage area and the CCWs are coupled by data chaining. Data chaining is specified by a flag in the CCW and causes the channel subsystem to fetch another CCW upon the exhaustion or filling of the storage area designated by the current CCW. The storage area designated by a CCW fetched on data chaining pertains to the I/O operation already in progress at the I/O device, and the I/O device is not notified when a new CCW is fetched.

Provision is made in the CCW format for the programmer to specify that, when the CCW is decoded, the channel subsystem request an I/O interruption as soon as possible, thereby notifying a CPU program that chaining has progressed at least as far as that CCW in the channel program.

To complement dynamic address translation in CPUs, CCW indirect data addressing and modified CCW indirect data addressing are provided.

When the ORB specifies a CCW channel program and CCW-indirect-data addressing is used, a flag in the CCW specifies that an indirect-data-address list is to be used to designate the storage areas for that CCW. Each time the boundary of a block of storage is reached, the list is referenced to determine the next block of storage to be used. The ORB specifies whether the size of each block of storage is 2 K bytes or 4 K bytes.

When the ORB specifies a CCW channel program and modified-CCW-indirect-data addressing is used, a flag in the ORB and a flag in the CCW specify that a modified-indirect-data-address list is to be used to designate the storage areas for that CCW. Each time the count of bytes specified for a block of storage is reached, the list is referenced to determine the next block of storage to be used. Unlike when indirect data addressing is used, the block may be specified on any boundary and length up to 4 K, provided a data transfer across a 4 K-byte boundary is not specified.

When the ORB specifies a TCW channel program and transport-indirect-data addressing is used, flags in the TCW specify whether a transport-indirect-data-address list is to be used to designate the storage areas containing the TCCB and whether a transport-indirect-data-address list is used to designate the data storage areas associated with the DCWs in the TCCB. Each time the count of bytes specified for a block of storage is reached, the corresponding transport-indirect-data-address list is referenced to determine the next storage block to be used.

CCW indirect data addressing and modified CCW indirect data addressing permit essentially the same CCW sequences to be used for a program running with dynamic address translation active in the CPU as would be used if the CPU were operating with equivalent contiguous real storage. CCW indirect data addressing permits the program to designate data blocks having absolute storage addresses up to $2^{64}-1$ independent of whether format-0 or format-1 CCWs have been specified in the ORB. Modified CCW indirect data addressing permits the program to designate data blocks having absolute storage addresses up to $2^{64}-1$, independent of whether format-0 or format-1 CCWs have been specified in the ORB.

In general, the execution of an I/O operation or chain of operations involves as many as three levels of participation:

1. Except for effects due to the integration of CPU and channel-subsystem equipment, a CPU is busy for the duration of the execution of START SUBCHANNEL, which lasts until the addressed subchannel has been passed the ORB contents.

2. The subchannel is busy for a new START SUBCHANNEL from the receipt of the ORB contents until the primary interruption condition is cleared at the subchannel.

3. The I/O device is busy from the initiation of the first operation at the device until either the subchannel becomes suspended or the secondary interruption condition is placed at the subchannel. In the case of a suspended subchannel, the device again becomes busy when the execution of the suspended channel program is resumed.

Conclusion of I/O Operations

The conclusion of an I/O operation normally is indicated by two status conditions: channel end and device end. The channel-end condition indicates that the I/O device has received or provided all data associated with the operation and no longer needs channel-subsystem facilities. This condition is called the primary interruption condition, and the channel end in this case is the primary status. Generally, the primary interruption condition is any interruption condition that relates to an I/O operation and that signals the conclusion at the subchannel of the I/O operation or chain of I/O operations.

The device-end signal indicates that the I/O device has concluded execution and is ready to perform another operation. This condition is called the secondary interruption condition, and the device end in this case is the secondary status. Generally, the secondary interruption condition is any interruption condition that relates to an I/O operation and that signals the conclusion at the device of the I/O operation or chain of operations. The secondary interruption condition can occur concurrently with, or later than, the primary interruption condition.

Concurrent with the primary or secondary interruption conditions, both the channel subsystem and the I/O device can provide indications of unusual situations.

The conditions signaling the conclusion of an I/O operation can be brought to the attention of the program by I/O interruptions or, when the CPUs are disabled for I/O interruptions, by programmed interrogation of the channel subsystem. In the former case, these conditions cause storing of the I/O-interruption code, which contains information concerning the interrupting source. In the latter case, the interruption code is stored as a result of the execution of TEST PENDING INTERRUPTION.

When the primary interruption condition is recognized, the channel subsystem attempts to notify the program, by means of an interruption request, that a subchannel contains information describing the conclusion of an I/O operation at the subchannel. For command-mode interruptions, the information identifies the last CCW used and may provide its residual byte count, thus describing the extent of main storage used. For transport-mode interruptions, the information identifies the current TCW and the TSB associated with the channel program that contains additional status about the I/O operation, such as residual byte count. In addition to information about the channel program, both the channel subsystem and the I/O device may provide additional indications of unusual conditions as part of either the primary or the secondary interruption condition. The information contained at the subchannel may be stored by the execution of TEST SUBCHANNEL or the execution of STORE SUBCHANNEL. This information, when stored, is called a subchannel-status word (SCSW).

Chaining when Using a CCW Channel Program

When the ORB specifies a CCW channel program, facilities are provided for the program to initiate the execution of a chain of I/O operations with a single START SUBCHANNEL instruction. When the current CCW specifies command chaining and no unusual conditions have been detected during the operation, the receipt of the device-end signal causes the channel subsystem to fetch a new CCW. If the CCW passes certain validity tests and the suspend flag is not specified as a one in the new CCW, execution of a new command is initiated at the device. If the CCW fails to pass the validity tests, the new command is not initiated, command chaining is suppressed, and the status associated with the new CCW causes an interruption condition to be generated. If the suspend flag is specified as a one and this value is valid because of a one value in the suspend control, bit 4 of word 1 of the associated ORB, execution of the new command is not initiated, and command chaining is concluded.

Execution of the new command is initiated by the channel subsystem in the same way as in the previous operation. The ending signals occurring at the conclusion of an operation caused by a CCW specifying command chaining are not made available to the program. When another I/O operation is initiated by command chaining, the channel subsystem continues execution of the channel program. If, however, an unusual condition has been detected, command chaining is suppressed, the channel program is terminated, an interruption condition is generated, and the ending signals causing the termination are made available to the program.

The suspend-and-resume function provides the program with control over the execution of a channel program. The initiation of the suspend function is controlled by the setting of the suspend-control bit in the ORB. The suspend function is signaled to the channel subsystem during channel-program execution when the suspend-control bit in the ORB is one and the suspend flag in the first CCW or in a CCW fetched during command chaining is one.

Suspension occurs when the channel subsystem fetches a CCW with the suspend flag validly (because of a one value of the suspend-control bit in the ORB) specified as one. The command in this CCW is not sent to the I/O device, and the device is signaled that the chain of commands is concluded. A subsequent RESUME SUBCHANNEL instruction informs the channel subsystem that the CCW that caused suspension may have been modified and that the channel subsystem must refetch the CCW and examine the current setting of the suspend flag. If the suspend flag is found to be zero in the CCW, the channel subsystem resumes execution of the chain of commands with the I/O device.

Chaining when Using a TCW Channel Program

When the ORB specifies a TCW channel program, facilities are also provided for the program to initiate the execution of a chain of device operations with a single START SUBCHANNEL instruction. Command chaining may be specified for those DCWs designated by a single TCW. When the current DCW specifies command chaining and no unusual conditions have been detected during the operation, recognition of the successful execution of the DCW causes the next DCW in the current TCCB to be processed.

If the next DCW passes certain validity tests, execution of a new command is initiated at the device and the DCW becomes the current DCW. If the DCW fails to pass the validity tests, the new command is not initiated, command chaining is suppressed, the channel program is terminated, and the status associated with the new DCW causes an interruption condition to be generated.

Execution of the new command is initiated in the same way as in the previous operation. The ending signals occurring at the conclusion of an operation caused by a DCW that is not the last specified DCW are not made available to the program. When another I/O operation is initiated by command chaining, execution of the channel program continues. If, however, an unusual condition has been detected, command chaining is suppressed, the channel program is terminated, an interruption condition is generated, and status is made available to the program that identifies the unusual condition.

Premature Conclusion of I/O Operations

Channel-program execution may be terminated prematurely by CANCEL SUBCHANNEL, HALT SUBCHANNEL or CLEAR SUBCHANNEL. The execution of CANCEL SUBCHANNEL causes the channel subsystem to terminate the start function at the subchannel if the channel program has not been initiated at the device. When the start function is terminated by the execution of CANCEL SUBCHANNEL, the channel subsystem sets condition code 0 in response to the CANCEL SUBCHANNEL instruction. The execution of HALT SUBCHANNEL causes the channel subsystem to issue the halt signal to the I/O device and terminate channel-program execution at the subchannel. When channel-program execution is terminated by the execution of HALT SUBCHANNEL, the program is notified of the termination by means of an I/O-interruption request. When the subchannel is in command mode, the interruption request is generated when the device presents status for the terminated operation. When the subchannel is in transport mode, the interruption request is generated immediately. If, however, the halt signal was issued to the device during command chaining after the receipt of device end but before the next command was transferred to the device, the interruption request is generated after the device has been signaled. In the latter case, the device-status field of the SCSW will contain zeros. The execution of CLEAR SUBCHANNEL clears the subchannel of indications of the channel program in execution, causes the channel subsystem to issue the clear signal to the I/O device, and causes the channel subsystem to generate an I/O-interruption request to notify the program of the completion of the clear function.

I/O Interruptions

Conditions causing I/O-interruption requests are asynchronous to activity in CPUs, and more than one condition can occur at the same time. The conditions are preserved at the subchannels until cleared by TEST SUBCHANNEL or CLEAR SUBCHANNEL, or reset by an I/O-system reset.

When an I/O-interruption condition has been recognized by the channel subsystem and indicated at the subchannel, an I/O-interruption request is made pending for the I/O-interruption subclass specified at the subchannel. The I/O-interruption subclass for which the interruption is made pending is under programmed control through the use of MODIFY SUBCHANNEL. A pending I/O interruption may be accepted by any CPU that is enabled for interruptions from its I/O-interruption subclass. Each CPU has eight mask bits, in control register 6, that control the enablement of that CPU for each of the eight I/O-interruption subclasses, with the I/O mask, bit 6 in the PSW, being the master I/O-interruption mask for the CPU.

When an I/O interruption occurs at a CPU, the I/O-interruption code is stored in the I/O-communication area of that CPU, and the I/O-interruption request is cleared. The I/O-interruption code identifies the subchannel for which the interruption was pending. The conditions causing the generation of the interruption request may then be retrieved from the subchannel explicitly by TEST SUBCHANNEL or by STORE SUBCHANNEL.

A pending I/O-interruption request may also be cleared by TEST PENDING INTERRUPTION when the corresponding I/O-interruption subclass is enabled but the PSW has I/O interruptions disabled or by TEST SUBCHANNEL when the CPU is disabled for I/O interruptions from the corresponding I/O-interruption subclass. A pending I/O-interruption request may also be cleared by CLEAR SUBCHANNEL. Both CLEAR SUBCHANNEL and TEST SUBCHANNEL clear the preserved interruption condition at the subchannel as well.

Normally, unless the interruption request is cleared by CLEAR SUBCHANNEL, the program issues TEST SUBCHANNEL to obtain information concerning the execution of the operation.

Clear Subchannel

The designated subchannel is cleared, the current start or halt function, if any, is terminated at the designated subchannel, and the channel subsystem is signaled to asynchronously perform the clear function at the designated subchannel and at the associated device.

General register 1 contains a subsystem-identification word (SID) that designates the subchannel to be cleared.

If a start or halt function is in progress, it is terminated at the subchannel.

The subchannel is made no longer status pending. All activity, as indicated in the activity-control field of the SCSW, is cleared at the subchannel, except that the subchannel is made clear pending. Any functions in progress, as indicated in the function-control field of the SCSW, are cleared at the subchannel, except for the clear function that is to be performed because of the execution of this instruction.

When the subchannel is operating in transport mode and condition code 2 is set, the CPU may signal the channel subsystem to asynchronously perform the interrogate function, and end the instruction.

The channel subsystem is signaled to asynchronously perform the clear function. The clear function is summarized below in the section "Associated Functions" and is described in detail in thereafter.

Condition code 0 is set to indicate that the actions described above have been taken.

Associated Functions

Subsequent to the execution of CLEAR SUBCHANNEL, the channel subsystem asynchronously performs the clear function. If conditions allow, the channel subsystem chooses a channel path and attempts to issue the clear signal to the device to terminate the I/O operation, if any. The subchannel then becomes status pending. Conditions encountered by the channel subsystem that preclude issuing the clear signal to the device do not prevent the subchannel from becoming status pending.

When the subchannel becomes status pending as a result of performing the clear function, data transfer, if any, with the associated device has been terminated. The SCSW stored when the resulting status is cleared by TEST SUBCHANNEL has the clear-function bit stored as one. If the channel subsystem can determine that the clear signal was issued to the device, the clear-pending bit is stored as zero in the SCSW. Otherwise, the clear-pending bit is stored as one, and other indications are provided that describe in greater detail the condition that was encountered.

Measurement data is not accumulated, and device-connect time is not stored in the extended-status word for the subchannel, for a start function that is terminated by CLEAR SUBCHANNEL.

Special Conditions

Condition code 3 is set, and no other action is taken, when the subchannel is not operational for CLEAR SUBCHANNEL. A subchannel is not operational for CLEAR SUBCHANNEL when the subchannel is not provided in the channel subsystem, has no valid device number assigned to it, or is not enabled.

CLEAR SUBCHANNEL can encounter the program exceptions described or listed below.

When the multiple-subchannel-set facility is not installed, bits 32-47 of general register 1 must contain 0001 hex; otherwise, an operand exception is recognized.

When the multiple-subchannel-set facility is installed, bits 32-44 of general register 1 must contain zeros, bits 45-46 must contain a valid value, and bit 47 must contain the value one; otherwise, an operand exception is recognized.

Resulting Condition Code:
0 Function initiated
1—
2—
3 Not operational
Program Exceptions:
Operand
Privileged operation
Clear Function Subsequent to the execution of CLEAR SUBCHANNEL, the channel subsystem performs the clear function. Performance of the clear function consists in (1) performing a path-management operation, (2) modifying fields at the subchannel, (3) issuing the clear signal to the associated device, and (4) causing the subchannel to be made status pending, indicating the completion of the clear function.

Clear-Function Path Management

A path-management operation is performed as part of the clear function in order to examine channel-path conditions for the associated subchannel and to attempt to choose an available channel path on which the clear signal can be issued to the associated device.

Channel-path conditions are examined in the following order:

1. If the channel subsystem is actively communicating or attempting to establish active communication with the device to be signaled, the channel path that is in use is chosen.

2. If the channel subsystem is in the process of accepting a no-longer-busy indication (which will not cause an interruption condition to be recognized) from the device to be signaled, and the associated subchannel has no allegiance to any channel path, the channel path that is in use is chosen.

3. If the associated subchannel has a dedicated allegiance for a channel path, that channel path is chosen.

4. If the associated subchannel has a working allegiance for one or more channel paths, one of those channel paths is chosen.

5. If the associated subchannel has no allegiance for any channel path, if a last-used channel path is indicated, and if that channel path is available for selection, that channel path is chosen. If that channel path is not available for selection, either no channel path is chosen or a channel path is chosen from the set of channel paths, if any, that are available for selection (as though no last-used channel path were indicated).

6. If the associated subchannel has no allegiance for any channel path, if no last-used channel path is indicated, and if there exist one or more channel paths that are available for selection, one of those channel paths is chosen.

If none of the channel-path conditions listed above apply, no channel path is chosen.

For item 4, for item 5 under the specified conditions, and for item 6, the channel subsystem chooses a channel path from a set of channel paths. In these cases, the channel subsystem may attempt to choose a channel path, provided that the following conditions do not apply:

1. A channel-path-terminal condition exists for the channel path.

2. For a parallel or ESCON channel path: Another subchannel has an active allegiance for the channel path.

For a FICON channel path: The channel path is currently being used to actively communicate with the maximum number of subchannels that can have concurrent active communications.

3. The device to be signaled is attached to a type-1 control unit, and the subchannel for another device attached to the same control unit has an allegiance to the same channel path, unless the allegiance is a working allegiance and primary status has been accepted by that subchannel.

4. The device to be signaled is attached to a type-3 control unit, and the subchannel for another device attached to the same control unit has a dedicated allegiance to the same channel path.

Clear-Function Subchannel Modification

Path-management-control indications at the subchannel are modified during performance of the clear function. Effectively, this modification occurs after the attempt to choose a channel path, but prior to the attempt to select the device to issue the clear signal. The path-management-control indications that are modified are as follows:

1. The state of all eight possible channel paths at the subchannel is set to operational for the subchannel.

2. The last-path-used indication is reset to indicate no last-used channel path.

3. Path-not-operational conditions, if any, are reset.

Clear-Function Signaling and Completion

Subsequent to the attempt to choose a channel path and the modification of the path-management-control fields, the channel subsystem, if conditions allow, attempts to select the device to issue the clear signal. Conditions associated with the subchannel and the chosen channel path, if any, affect (1) whether an attempt is made to issue the clear signal, and (2) whether the attempt to issue the clear signal is successful. Independent of these conditions, the subchannel is subsequently set status pending, and the performance of the clear function is complete. These conditions and their effect on the clear function are described as follows:

No Attempt is Made to Issue the Clear Signal: The channel subsystem does not attempt to issue the clear signal to the device if any of the following conditions exist:

1. No channel path was chosen.

2. The chosen channel path is no longer available for selection.

3. A channel-path-terminal condition exists for the chosen channel path.

4. For parallel and ESCON channel paths: The chosen channel path is currently being used to actively communicate with a different device. For FICON channel paths: The chosen channel path is currently being used to actively communicate with the maximum number of devices that can have concurrent active communications.

5. The device to be signaled is attached to a type-1 control unit, and the subchannel for another device attached to the same control unit has an allegiance to the same channel path, unless the allegiance is a working allegiance and primary status has been accepted by that subchannel.

6. The device to be signaled is attached to a type-3 control unit, and the subchannel for another device attached to the same control unit has a dedicated allegiance to the same channel path.

If any of the conditions above exist, the subchannel remains clear pending and is set status pending, and the performance of the clear function is complete.

The Attempt to Issue the Clear Signal is not Successful: When the channel subsystem attempts to issue the clear signal to the device, the attempt may not be successful because of the following conditions:

1. The control unit or device signals a busy condition when the channel subsystem attempts to select the device to issue the clear signal.

2. A path-not-operational condition is recognized when the channel subsystem attempts to select the device to issue the clear signal.

3. An error condition is encountered when the channel subsystem attempts to issue the clear signal.

If any of the conditions above exists and the channel subsystem either determines that the attempt to issue the clear signal was not successful or cannot determine whether the attempt was successful, the subchannel remains clear pending and is set status pending, and the performance of the clear function is complete.

The Attempt to Issue the Clear Signal is Successful: When the channel subsystem determines that the attempt to issue the clear signal was successful, the subchannel is no longer clear pending and is set status pending, and the performance of the clear function is complete. When the subchannel becomes status pending, the I/O operation, if any, with the associated device has been terminated.

Programming Note: Subsequent to the performance of the clear function, any nonzero status, except control unit end alone, that is presented to the channel subsystem by the device is passed to the program as unsolicited alert status. Unsolicited status consisting of control unit end alone or zero status is not presented to the program.

Modify Subchannel

The information contained in the subchannel-information block (SCHIB) is placed in the program-modifiable fields at the subchannel. As a result, the program influences, for that subchannel, certain aspects of I/O processing relative to the clear, halt, resume, and start functions and certain I/O support functions.

General register 1 contains a subsystem-identification word (SID) that designates the subchannel that is to be modified as specified by certain fields of the SCHIB. The second-operand address is the logical address of the SCHIB and must be designated on a word boundary; otherwise, a specification exception is recognized.

The channel-subsystem operations that may be influenced due to placement of SCHIB information in the subchannel are:

I/O processing (E field)
Interruption processing (interruption parameter and ISC field)
Path management (D, LPM, and POM fields)
Monitoring and address-limit checking (measurement-block index, LM, and MM fields)
Measurement-block-format control (F field)
Extended-measurement-word-mode enable (X field)
Concurrent-sense facility (S field)
Measurement-block address (MBA)

Bits 0, 1, 6, and 7 of word 1, and bits 0-28 of word 6 of the SCHIB operand must be zeros, and bits 9 and 10 of word 1 must not both be ones. When the extended-I/O-measurement-block facility is installed and a format-1 measurement block is specified, bits 26-31 of word 11 must be specified as zeros. When the extended-I/O-measurement-block facility is not installed, bit 29 of word 6 must be specified as zero; otherwise, an operand exception is recognized. When the extended-I/O-measurement-word facility is not installed, or is installed but not enabled, bit 30 of word 6 must be specified as zero; otherwise, an operand exception is recognized. The remaining fields of the SCHIB are ignored and do not affect the processing of MODIFY SUBCHANNEL.

Condition code 0 is set to indicate that the information from the SCHIB has been placed in the program-modifiable fields at the subchannel, except that, when the device-number-valid bit (V) at the designated subchannel is zero, then condition code 0 is set, and the information from the SCHIB is not placed in the program-modifiable fields.

Special Conditions

Condition code 1 is set, and no other action is taken, when the subchannel is status pending.

Condition code 2 is set, and no other action is taken, when a clear, halt, or start function is in progress at the subchannel.

Condition code 3 is set, and no other action is taken, when the subchannel is not operational for MODIFY SUBCHANNEL. A subchannel is not operational for MODIFY SUBCHANNEL when the subchannel is not provided in the channel subsystem.

MODIFY SUBCHANNEL can encounter the program exceptions described or listed below.

In word 1 of the SCHIB, bits 0, 1, 6, and 7 must be zeros and, when the address-limit-checking facility is installed, bits 9 and 10 must not both be ones. In word 6 of the SCHIB, bits 0-28 must be zeros. Otherwise an operand exception is recognized.

When the extended-I/O-measurement-block facility is installed and a format-1 measurement block is specified, bits 26-31 of word 11 must be specified as zeros; otherwise, an operand exception is recognized. When the extended-I/O-measurement-block facility is not installed, bit 29 of word 6 must be specified as zero; otherwise, an operand exception is recognized. When the extended-I/O-measurement-word facility is not installed, or is installed but not enabled, bit 30 of word 6 must be specified as zero; otherwise, an operand exception is recognized.

When the multiple-subchannel-set facility is not installed, bits 32-47 of general register 1 must contain 0001 hex; otherwise, an operand exception is recognized.

When the multiple-subchannel-set facility is installed, bits 32-44 of general register 1 must contain zeros, bits 45-46 must contain a valid value, and bit 47 must contain the value one; otherwise, an operand exception is recognized.

The second operand must be designated on a word boundary; otherwise, a specification exception is recognized. The execution of MODIFY SUBCHANNEL is suppressed on all addressing and protection exceptions.

Resulting Condition Code:
0 Function completed
1 Status pending
2 Busy
3 Not operational
Program Exceptions:
Access (fetch, operand 2)
Operand
Privileged operation
Specification
Programming Notes:

1. If a device signals I/O-error alert while the associated subchannel is disabled, the channel subsystem issues the clear signal to the device and discards the I/O-error-alert indication without generating an I/O-interruption condition.

2. If a device presents unsolicited status while the associated subchannel is disabled, that status is discarded by the channel subsystem without generating an I/O-interruption condition. However, if the status presented contains unit check, the channel subsystem issues the clear signal for the associated subchannel and does not generate an I/O-interruption condition. This should be taken into account when the program uses MODIFY SUBCHANNEL to enable a subchannel. For example, the medium on the associated device that was present when the subchannel became disabled may have been replaced, and, therefore, the program should verify the integrity of that medium.

3. It is recommended that the program inspect the contents of the subchannel by subsequently issuing STORE SUBCHANNEL when MODIFY SUBCHANNEL sets condition code 0. Use of STORE SUBCHANNEL is a method for determining if the designated subchannel was changed or not. Failure to inspect the subchannel following the setting of condition code 0 by MODIFY SUBCHANNEL may result in conditions that the program does not expect to occur.

Start Subchannel

The channel subsystem is signaled to asynchronously perform the start function for the associated device, and the execution parameters that are contained in the designated ORB are placed at the designated subchannel.

General register 1 contains a subsystem-identification word that designates the subchannel to be started. The second-operand address is the logical address of the ORB and must be designated on a word boundary; otherwise, a specification exception is recognized.

The execution parameters contained in the ORB are placed at the subchannel.

When START SUBCHANNEL is executed, the subchannel is status pending with only secondary status, and the extended-status-word-format bit (L) is zero, the status-pending condition is discarded at the subchannel.

The subchannel is made start pending, and the start function is indicated at the subchannel. If the second operand designates a command-mode ORB, the subchannel remains in command mode. If the second operand designates a transport-mode ORB, the subchannel enters transport mode. When the subchannel enters transport mode, the LPUM is set to zero if no previous dedicated allegiance exists; otherwise the LPUM is not changed.

Logically prior to the setting of condition code 0, path-not-operational conditions at the subchannel, if any, are cleared.

The channel subsystem is signaled to asynchronously perform the start function. The start function is summarized below in the section "Associated Functions" and is described in detail thereafter.

Condition code 0 is set to indicate that the actions described above have been taken.

Associated Functions

Subsequent to the execution of START SUBCHANNEL, the channel subsystem asynchronously performs the start function.

The contents of the ORB, other than the fields that must contain all zeros, are checked for validity. On some models, the fields of the ORB that must contain zeros are checked asynchronously, instead of during the execution of the instruction. When invalid fields are detected asynchronously, the subchannel becomes status pending with primary, secondary, and alert status and with deferred condition code 1 and program check indicated. In this situation, the I/O operation or chain of I/O operations is not initiated at the device, and the condition is indicated by the start-pending bit being stored as one when the SCSW is cleared by the execution of TEST SUBCHANNEL.

On some models, path availability is tested asynchronously, instead of during the execution of the instruction. When no channel path is available for selection, the subchannel becomes status pending with primary and secondary status and with deferred condition code 3 indicated. The I/O operation or chain of I/O operations is not initiated at the device, and this condition is indicated by the start-pending bit being stored as one when the SCSW is cleared by the execution of TEST SUBCHANNEL.

If conditions allow, a channel path is chosen, and execution of the channel program that is designated in the ORB is initiated.

Special Conditions

Condition code 1 is set, and no other action is taken, when the subchannel is status pending when START SUBCHANNEL is executed. On some models, condition code 1 is not set when the subchannel is status pending with only secondary status; instead, the status-pending condition is discarded.

Condition code 2 is set, and no other action is taken, when a start, halt, or clear function is currently in progress at the subchannel.

Condition code 3 is set, and no other action is taken, when the subchannel is not operational for START SUBCHANNEL. A subchannel is not operational for START SUBCHANNEL if the subchannel is not provided in the channel subsystem, has no valid device number associated with it, or is not enabled.

A subchannel is also not operational for START SUBCHANNEL, on some models, when no channel path is available for selection. On these models, the lack of an available channel path is detected as part of the START SUBCHANNEL execution. On other models, channel-path availability is only tested as part of the asynchronous start function.

START SUBCHANNEL can encounter the program exceptions described or listed below.

In word 1 of the command-mode ORB, bits 26-30 must be zeros, and, in word 2 of the command-mode ORB, bit 0 must be zero. Otherwise, on some models, an operand exception is recognized. On other models, an I/O-interruption condition is generated, indicating program check, as part of the asynchronous start function.

START SUBCHANNEL can also encounter the program exceptions listed below.

When the multiple-subchannel-set facility is not installed, bits 32-47 of general register 1 must contain 0001 hex; otherwise, an operand exception is recognized.

When the multiple-subchannel-set facility is installed, bits 32-44 of general register 1 must contain zeros, bits 45-46 must contain a valid value, and bit 47 must contain the value one; otherwise, an operand exception is recognized.

The second operand must be designated on a word boundary; otherwise, a specification exception is recognized. The execution of START SUBCHANNEL is suppressed on all addressing and protection exceptions.

Resulting Condition Code:
0 Function initiated
1 Status pending
2 Busy
3 Not operational
Program Exceptions:
Access (fetch, operand 2)
Operand
Privileged operation
Specification
Start Function and Resume Function The start and resume functions initiate I/O operations as described below. The start function applies to subchannels operating in either command mode or transport mode. The resume function applies only to subchannels operating in command mode.

Subsequent to the execution of START SUBCHANNEL and RESUME SUBCHANNEL, the channel subsystem performs the start and resume functions, respectively, to initiate an I/O operation with the associated device. Performance of a start or resume function consists of: (1) performing a path-management operation, (2) performing an I/O operation or chain of I/O operations with the associated device, and (3) causing the subchannel to be made status pending, indicating the completion of the start function. The start function initiates the execution of a channel program that is designated in the ORB, which in turn is designated as the operand of START SUBCHANNEL, in contrast to the resume function that initiates the execution of a suspended channel program, if any, beginning at the CCW that caused suspension; otherwise, the resume function is performed as if it were a start function.

Start-Function and Resume-Function Path Management

A path-management operation is performed by the channel subsystem during the performance of either a start or a resume function to choose an available channel path that can be used for device selection to initiate an I/O operation with that device. The actions taken are as follows:

1. If the subchannel is currently start pending and device active, the start function remains pending at the subchannel until the secondary status for the previous start function has been accepted from the associated device and the subchannel is made start pending alone. When the status is accepted and does not describe an alert interruption condition, the subchannel is not made status pending, and the performance of the pending start function is subsequently initiated. If the status describes an alert interruption condition, the subchannel becomes status pending with secondary and alert status, the pending start function is not initiated, deferred condition code 1 is set, and the start-pending bit remains one. If the subchannel is currently start pending alone, the performance of the start function is initiated as described below.

2. If a dedicated allegiance exists at the subchannel for a channel path, the channel subsystem chooses that path for device selection. If a busy condition is encountered while attempting to select the device and a dedicated allegiance exists at the subchannel, the start function remains pending until the internal indication of busy is reset for that channel path. When the internal indication of busy is reset, the performance of the pending start function is initiated on that channel path.

3. If no channel path is available for selection and no dedicated allegiance exists in the subchannel for a channel path, a channel path is not chosen.

4. If all channel paths that are available for selection have been tried and one or more of them are being used to actively communicate with other devices, or, alternatively, if the channel subsystem has encountered either a control-unit-busy or a device-busy condition on one or more of those channel paths, or a combination of those conditions on one or more of those channel paths, the start function remains pending at the subchannel until a channel path, control unit, or device, as appropriate, becomes available.

5. If (1) the start function is to be initiated on a channel path with a device attached to a type-1 control unit and (2) no other device is attached to the same control unit whose subchannel has either a dedicated allegiance to the same channel path or a working allegiance to the same channel path where primary status has not been received for that subchannel, then that channel path is chosen if it is available for selection; otherwise, that channel path is not chosen. If, however, another channel path to the device is available for selection and no allegiances exist as described above, that channel path is chosen. If no other channel path is available for selection, the start or resume function, as appropriate, remains pending until a channel path becomes available.

6. If the device is attached to a type-3 control unit, and if at least one other device is attached to the same control unit whose subchannel has a dedicated allegiance to the same channel path, another channel path that is available for selection may be chosen, or the start function remains pending until the dedicated allegiance for the other device is cleared.

7. If a channel path has been chosen and a busy indication is received during device selection to initiate the execution of the first command of a pending CCW channel program or to transport the TCCB of a pending TCW channel program, the channel path over which the busy indication is received is not used again for that device or control unit (depending on the device-busy or control-unit-busy indication received) until the internal indication of busy is reset.

8. If, during an attempt to select the device in order to initiate the execution of the first command specified for the start or implied for the resume function for a CCW channel program, or to initiate the transportation of the TCCB for the start function for a TCW channel program, (as described in action 7 above), the channel subsystem receives a busy indication, it performs one of the following actions:

a. If the device is specified to be operating in the multipath mode and the busy indication received is device busy, then the start or resume function remains pending until the internal indication of busy is reset.

b. If the device is specified to be operating in the multipath mode and the busy indication received is control unit busy, or if the device is specified to be operating in the single-path mode, the channel subsystem attempts selection of the device by choosing an alternate channel path that is available for selection and continues the path-management operation until either the start or the resume function is initiated or selection of the device has been attempted on all channel paths that are available for selection. If the start or resume function has not been initiated by the channel subsystem after all channel paths available for selection have been chosen, the start or resume function remains pending until the internal indication of busy is reset.

c. If the subchannel has a dedicated allegiance, then action 2 on page 15-20 applies.

9. When, during the selection attempt to transfer the first command for a CCW channel program, or to transport the TCCB for a TCW channel program, the device appears not operational and the corresponding channel path is operational for the subchannel, a path-not-operational condition is recognized, and the state of the channel path changes at the subchannel from operational for the subchannel to not operational for the subchannel. The path-not-operational conditions at the subchannel, if any, are preserved until the subchannel next becomes clear pending, start pending, or resume pending (if the subchannel was suspended), at which time the path-not-operational conditions are cleared. If, however, the corresponding channel path is not operational for the subchannel, a path-not-operational condition is not recognized. When the device appears not operational during the selection attempt to transfer the first command or TCCB on a channel path that is available for selection, one of the following actions occurs:

a. If a dedicated allegiance exists for that channel path, then it is the only channel path that is available for selection; therefore, further attempts to initiate the start or resume function are abandoned, and an interruption condition is recognized.

b. If no dedicated allegiance exists and there are alternate channel paths available for selection that have not been tried, one of those channel paths is chosen to attempt device selection and transfer the first command for a CCW channel program, or the TCCB for a TCW channel program.

c. If no dedicated allegiance exists, no alternate channel paths are available for selection that have not been tried, and the device has appeared operational on at least one of the channel paths that were tried, the start or resume function remains pending at the subchannel until a channel path, a control unit, or the device, as appropriate, becomes available.

d. If no dedicated allegiance exists, no alternate channel paths are available for selection that have not been tried, and the device has appeared not operational on all channel paths that were tried, further attempts to initiate the start or resume function are abandoned, and an interruption condition is recognized.

10. When the subchannel is active and an I/O operation is to be initiated with a device, all device selections occur according to the LPUM indication if the multipath mode is not specified at the subchannel. For example, if command chaining is specified for a CCW channel program, the channel subsystem transfers the first and all subsequent commands describing a chain of I/O operations over the same channel path.

Execution of I/O Operations

After a channel path is chosen, the channel subsystem, if conditions allow, initiates the execution of an I/O operation with the associated device. Execution of additional I/O operations may follow the initiation and execution of the first I/O operation.

For subchannels operating in command mode, the channel subsystem can execute seven types of commands: write, read, read backward, control, sense, sense ID, and transfer in channel. Each command, except transfer in channel, initiates a corresponding I/O operation. Except for periods when channel-program execution is suspended at the subchannel, the subchannel is active from the acceptance of the first command until the primary interruption condition is recognized at the subchannel. If the primary interruption condition is recognized before the acceptance of the first command, the subchannel does not become active. Normally, the primary interruption condition is caused by the channel-end signal or, in the case of command chaining, the channel-end signal for the last CCW of the chain. The device is active until the secondary interruption condition is recognized at the subchannel. Normally, the secondary interruption condition is caused by the device-end signal or, in the case of command chaining, the device-end signal for the last CCW of the chain.

For subchannels operating in transport mode, the channel subsystem can transport six types of commands for execution: write, read, control, sense, sense ID, and interrogate. Each command initiates a corresponding device operation. When one or more commands are transported to the I/O device in a TCCB, the subchannel remains start pending until primary status is presented.

Programming Notes:

In the single-path mode, all transfers of commands, data, and status for the I/O operation or chain of I/O operations occur on the channel path over which the first command was transferred to the device.

When the device has the dynamic-reconnection feature installed, an I/O operation or chain of I/O operations may be performed in the multipath mode. To operate in the multipath mode, MODIFY SUBCHANNEL must have been previously executed for the subchannel with bit 13 of word 1 of the SCHIB specified as one. In addition, the device must be set up for the multipath mode by the execution of certain model-dependent commands appropriate to that type of device. The general procedures for handling multipath-mode operations are as follows:

1. Setup a. A set-multipath-mode type of command must be successfully executed by the device on each channel path that is to be a member of the multipath group being set up; otherwise, the multipath mode of operation may give unpredictable results at the subchannel. If, for any reason, one or more physically available channel paths to the device are not included in the multipath group, these channel paths must not be available for selection while the subchannel is operating in the multipath mode. A channel path can be made not available for selection by having the corresponding LPM bit set to zero either in the SCHIB prior to the execution of MODIFY SUBCHANNEL or in the ORB prior to the execution of START SUBCHANNEL.

b. When a set-multipath-mode type of command is transferred to a device, only a single channel path must be logically available in order to avoid alternate channel-path selection for the execution of that start function; otherwise, device-busy conditions may be detected by the channel subsystem on more than one channel path, which may cause unpredictable results for subsequent multipath-mode operations. This type of setup procedure should be used whenever the membership of a multipath group is changed.

2. Leaving the Multipath Mode

To leave the multipath mode and continue processing in the single-path mode, either of the following two procedures may be used:

a. A disband-multipath-mode type of command may be executed for any channel path of the multipath group. This command must be followed by either (1) the execution of MODIFY SUBCHANNEL with bit 13 of word 1 of the SCHIB specified as zero, or (2) the specification of only a single channel path as logically available in the LPM. A start function must not be performed at a subchannel operating in the multipath mode with multiple channel paths available for selection while the device is operating in single-path mode; otherwise, unpredictable results may occur at the subchannel for that function or subsequent start functions.

b. A resign-multipath-mode type of command is executed on each channel path of the multipath group (the reverse of the setup). This command must be followed by either (1) the execution of MODIFY SUBCHANNEL with bit 13 of word 1 of the SCHIB specified as zero, or (2) the specification of only a single channel path as logically available in the LPM. No start function may be performed at a subchannel operating in the multipath mode with multiple channel paths available for selection while the device is operating in single-path mode; otherwise, unpredictable results may occur at the subchannel for that or subsequent start functions.

Blocking of Data

Data recorded by an I/O device is divided into blocks. The length of a block depends on the device; for example, a block can be a card, a line of printing, or the information recorded between two consecutive gaps on magnetic tape.

The maximum amount of information that can be transferred in one I/O operation is one block. An I/O operation is terminated when the associated main-storage area is exhausted or the end of the block is reached, whichever occurs first. For some operations, such as writing on a magnetic-tape unit or at an inquiry station, blocks are not defined, and the amount of information transferred is controlled only by the program.

Operation-Request Block

The operation-request block (ORB) is the operand of START SUBCHANNEL. The ORB specifies the parameters to be used in controlling that particular start function. These parameters include the interruption parameter, the subchannel key, the address of first CCW or the TCW, operation-control bits, priority-control numbers, and a specification of the logical availability of channel paths to the designated device.

The contents of the ORB are placed at the designated subchannel during the execution of START SUBCHANNEL, prior to the setting of condition code 0. If the execution will result in a nonzero condition code, the contents of the ORB are not placed at the designated subchannel.

The two rightmost bits of the ORB address must be zeros, placing the ORB on a word boundary; otherwise, a specification exception is recognized. When the fibre-channel-extensions (FCX) facility is installed, the channel-program-type control (B) (word 1, bit 13) of the ORB specifies the type of channel program that is designated by the ORB. When B is zero, the ORB designates a CCW channel program. When the B is one, the ORB designates a TCW channel program. Only I/O-devices that support FCX recognize TCW channel programs.

If the contents of an ORB that designates a CCW channel program are placed at the designated subchannel during the execution of START SUBCHANNEL, the subchannel remains in command mode. Thus, such an ORB is also known as a command-mode ORB. If the contents of an ORB that designates a TCW channel program are placed at the designated subchannel during execution of START SUBCHANNEL, the subchannel enters transport mode. Thus, such an ORB is also known as a transport-mode ORB.

Test Pending Interruption

The I/O-interruption code for a pending I/O interruption at a subchannel is stored at the location designated by the second-operand address, and the pending I/O-interruption request is cleared.

The second-operand address, when nonzero, is the logical address of the location where the two-word I/O-interruption code, consisting of words 0 and 1, is to be stored. The second-operand address must be designated on a word boundary; otherwise, a specification exception is recognized.

If the second-operand address is zero, the three-word I/O-interruption code, consisting of words 0-2, is stored at real locations 184-195. In this case, low-address protection and key-controlled protection do not apply.

In the access-register mode when the second-operand address is zero, it is unpredictable whether access-register translation occurs for access register B2. If the translation occurs, the resulting address-space-control element is not used; that is, the interruption code still is stored at real locations 184-195.

Pending I/O-interruption requests are accepted only for those I/O-interruption subclasses allowed by the I/O-interruption-subclass mask in control register 6 of the CPU executing the instruction. If no I/O-interruption requests exist that are allowed by control register 6, the I/O-interruption code is not stored, the second-operand location is not modified, and condition code 0 is set.

If a pending I/O-interruption request is accepted, the I/O-interruption code is stored, the pending I/O-interruption request is cleared, and condition code 1 is set. The I/O-interruption code that is stored is the same as would be stored if an I/O interruption had occurred. However, PSWs are not swapped as when an I/O-interruption occurs, execution of the instruction is defined as follows:

Subsystem-Identification Word (SID):

Bits 32-63 of the SID are placed in word 0.

Interruption Parameter: Word 1 contains a four-byte parameter that was specified by the program and passed to the subchannel in word 0 of the ORB or the PMCW. When a device presents alert status and the interruption parameter was not previously passed to the subchannel by an execution of START SUBCHANNEL or MODIFY SUBCHANNEL, this field contains zeros.

Interruption-Identification Word: Word 2, when stored, contains the interruption-identification word, which further identifies the source of the I/O-interruption. Word 2 is stored only when the second-operand address is zero.

The interruption-identification word is defined as follows:

A bit (A): Bit 0 of the interruption-identification word specifies the type of pending I/O-interruption request that was cleared. When bit 0 is zero, the I/O-interruption request was associated with a subchannel.

I/O-Interruption Subclass (ISC): Bit positions 2-4 of the interruption-identification word contain an unsigned binary integer, in the range 0-7, that specifies the I/O-interruption subclass associated with the subchannel for which the pending I/O-interruption request was cleared. The remaining bit positions are reserved and stored as zeros.

Special Conditions

TEST PENDING INTERRUPTION can encounter the program exceptions described or listed below.

The second operand must be designated on a word boundary; otherwise, a specification exception is recognized.

The execution of TEST PENDING INTERRUPTION is suppressed on all addressing and protection exceptions.

Resulting Condition Code:

0 Interruption code not stored

1 Interruption code stored 2—

3—

Program Exceptions:

Access (store, operand 2, second-operand address nonzero only)

Privileged operation

Specification

Programming Notes:

1. TEST PENDING INTERRUPTION should only be executed with a second-operand address of zero when I/O interruptions are masked off. Otherwise, an I/O-interruption code stored by the instruction may be lost if an I/O interruption occurs. The I/O-interruption code that identifies the source of an I/O interruption taken subsequent to TEST PENDING INTERRUPTION is also stored at real locations 184-195, replacing an I/O-interruption code that was stored by the instruction.

2. In the access-register mode when the second-operand address is zero, an access exception is recognized if access-register translation occurs and the access register is in error. This exception can be prevented by making the B2 field zero or by placing 00000000 hex, 00000001 hex, or any other valid contents in the access register.

Store Subchannel

Control and status information for the designated subchannel is stored in the designated SCHIB.

General register 1 contains a subsystem-identification word that designates the subchannel for which the information is to be stored. The second-operand address is the logical address of the SCHIB and must be designated on a word boundary; otherwise, a specification exception is recognized.

When the extended-I/O-measurement-block facility is not installed, the information that is stored in the SCHIB consists of a path-management-control word, a SCSW, and three words of model-dependent information. When the extended-I/O-measurement-block facility is installed, the information that is stored in the SCHIB consists of a path-management-control word, a SCSW, the measurement-block-address field, and one word of model-dependent information.

The execution of STORE SUBCHANNEL does not change any information at the subchannel.

Condition code 0 is set to indicate that control and status information for the designated subchannel has been stored in the SCHIB. When the execution of STORE SUBCHANNEL results in the setting of condition code 0, the information in the SCHIB indicates a consistent state of the subchannel.

Special Conditions

Condition code 3 is set, and no other action is taken, when the designated subchannel is not operational for STORE SUBCHANNEL. A subchannel is not operational for STORE SUBCHANNEL if the subchannel is not provided in the channel subsystem.

STORE SUBCHANNEL can encounter the program exceptions described or listed below.

When the multiple-subchannel-set facility is not installed, bits 32-47 of general register 1 must contain 0001 hex; otherwise, an operand exception is recognized.

When the multiple-subchannel-set facility is installed, bits 32-44 of general register 1 must contain zeros, bits 45-46 must contain a valid value, and bit 47 must contain the value one; otherwise, an operand exception is recognized.

The second operand must be designated on a word boundary; otherwise, a specification exception is recognized.

Resulting Condition Code:

0 SCHIB stored

1—

2—

3 Not operational

Program Exceptions:

Access (store, operand 2)

Operand

Privileged operation

Specification

Programming Notes:

1. Device status that is stored in the SCSW may include device-busy, control-unit-busy, or control-unit-end indications.

2. The information that is stored in the SCHIB is obtained from the subchannel. The STORE SUBCHANNEL instruction does not cause the channel subsystem to interrogate the addressed device.

3. STORE SUBCHANNEL may be executed at any time to sample conditions existing at the subchannel, without causing any pending status conditions to be cleared.

4. Repeated execution of STORE SUBCHANNEL without an intervening delay (for example, to determine when a subchannel changes state) should be avoided because repeated accesses of the subchannel by the CPU may delay or prohibit accesses of the subchannel by a channel subsystem to update the subchannel.

Test Subchannel

Control and status information for the subchannel is stored in the designated IRB.

General register 1 contains a subsystem-identification word that designates the subchannel for which the information is to be stored. The second-operand address is the logical address of the IRB and must be designated on a word boundary; otherwise, a specification exception is recognized.

The information that is stored in the IRB consists of a SCSW, an extended-status word, and an extended-control word.

If the subchannel is status pending, the status-pending bit of the status-control field is stored as one. Whether or not the subchannel is status pending has an effect on the functions that are performed when TEST SUBCHANNEL is executed.

When the subchannel is status pending and TEST SUBCHANNEL is executed, information, as described above, is stored in the IRB, followed by the clearing of certain conditions and indications that exist at the subchannel. If the subchannel is in transport mode, the clearing of these conditions, specifically the start function, places the subchannel in command mode. If an I/O-interruption request is pending for the subchannel, the request is cleared. Condition code 0 is set to indicate that these actions have been taken.

When the subchannel is not status pending and TEST SUBCHANNEL is executed, information is stored in the IRB, and no conditions or indications are cleared. Condition code 1 is set to indicate that these actions have been taken.

Special Conditions

Condition code 3 is set, and no other action is taken, when the subchannel is not operational for TEST SUBCHANNEL. A subchannel is not operational for TEST SUBCHANNEL if the subchannel is not provided, has no valid device number associated with it, or is not enabled.

TEST SUBCHANNEL can encounter the program exceptions described or listed below.

When the multiple-subchannel-set facility is not installed, bits 32-47 of general register 1 must contain 0001 hex; otherwise, an operand exception is recognized.

When the multiple-subchannel-set facility is installed, bits 32-44 of general register 1 must contain zeros, bits 45-46 must contain a valid value, and bit 47 must contain the value one; otherwise, an operand exception is recognized.

The second operand must be designated on a word boundary; otherwise, a specification exception is recognized.

When the execution of TEST SUBCHANNEL is terminated on addressing and protection exceptions, the state of the subchannel is not changed.

Resulting Condition Code:
0 IRB stored; subchannel status pending
1 IRB stored; subchannel not status pending
2—
3 Not operational
Program Exceptions:
Access (store, operand 2)
Operand
Privileged operation
Specification
Programming Notes:

1. Device status that is stored in the SCSW may include device-busy, control-unit-busy, or control-unit-end indications.

2. The information that is stored in the IRB is obtained from the subchannel. The TEST SUBCHANNEL instruction does not cause the channel subsystem to interrogate the addressed device.

3. When an I/O interruption occurs, it is the result of a status-pending condition at the subchannel, and typically TEST SUBCHANNEL is executed to clear the status. TEST SUBCHANNEL may also be executed at any other time to sample conditions existing at the subchannel.

4. Repeated execution of TEST SUBCHANNEL to determine when a start function has been completed should be avoided because there are conditions under which the completion of the start function may or may not be indicated. For example, if the channel subsystem is holding an interface-control-check (IFCC) condition in abeyance (for any subchannel) because another subchannel is already status pending, and if the start function being tested by TEST SUBCHANNEL has as the only path available for selection the channel path with the IFCC condition, then the start function may not be initiated until the status-pending condition in the other subchannel is cleared, allowing the IFCC condition to be indicated at the subchannel to which it applies.

5. Repeated execution of TEST SUBCHANNEL without an intervening delay, for example, to determine when a subchannel changes state, should be avoided because repeated accesses of the subchannel by the CPU may delay or prohibit accessing of the subchannel by the channel subsystem. Execution of TEST SUBCHANNEL by multiple CPUs for the same subchannel at approximately the same time may have the same effect and also should be avoided.

6. The priority of I/O-interruption handling by a CPU can be modified by the execution of TEST SUBCHANNEL. When TEST SUBCHANNEL is executed and the designated subchannel has an I/O-interruption request pending, that I/O-interruption request is cleared, and the SCSW is stored, without regard to any previously established priority. The relative priority of the remaining I/O-interruption requests is unchanged As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 10:
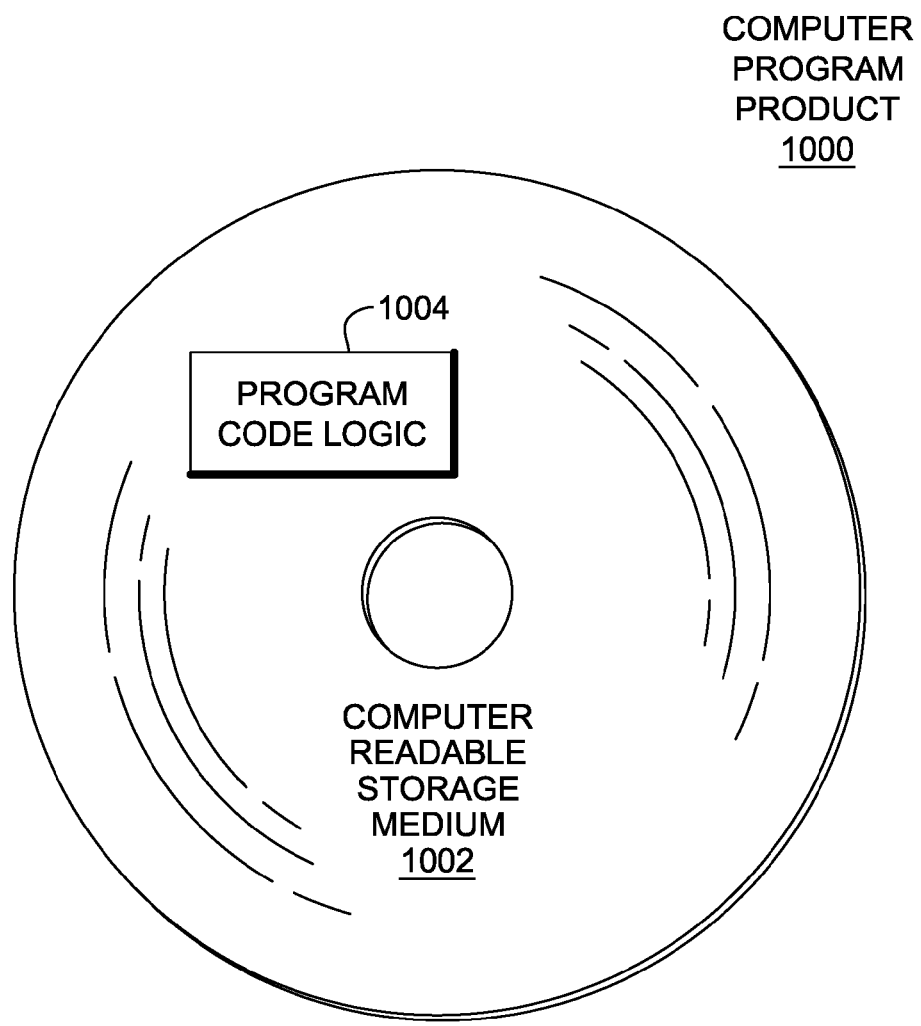
FIG. 10 depicts one embodiment of a computer program product incorporating one or more aspects of the present invention.

Referring now to FIG. 10, in one example, a computer program product 1000 includes, for instance, one or more non-transitory computer readable storage media 1002 to store computer readable program code means or logic 1004 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. As examples, servers other than z196 servers can include, use and/or benefit from one or more aspects of the present invention. Further, other instructions and/or commands may be used; and the instructions/commands may include additional, fewer and/or different information than described herein. Many variations are possible.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 11:
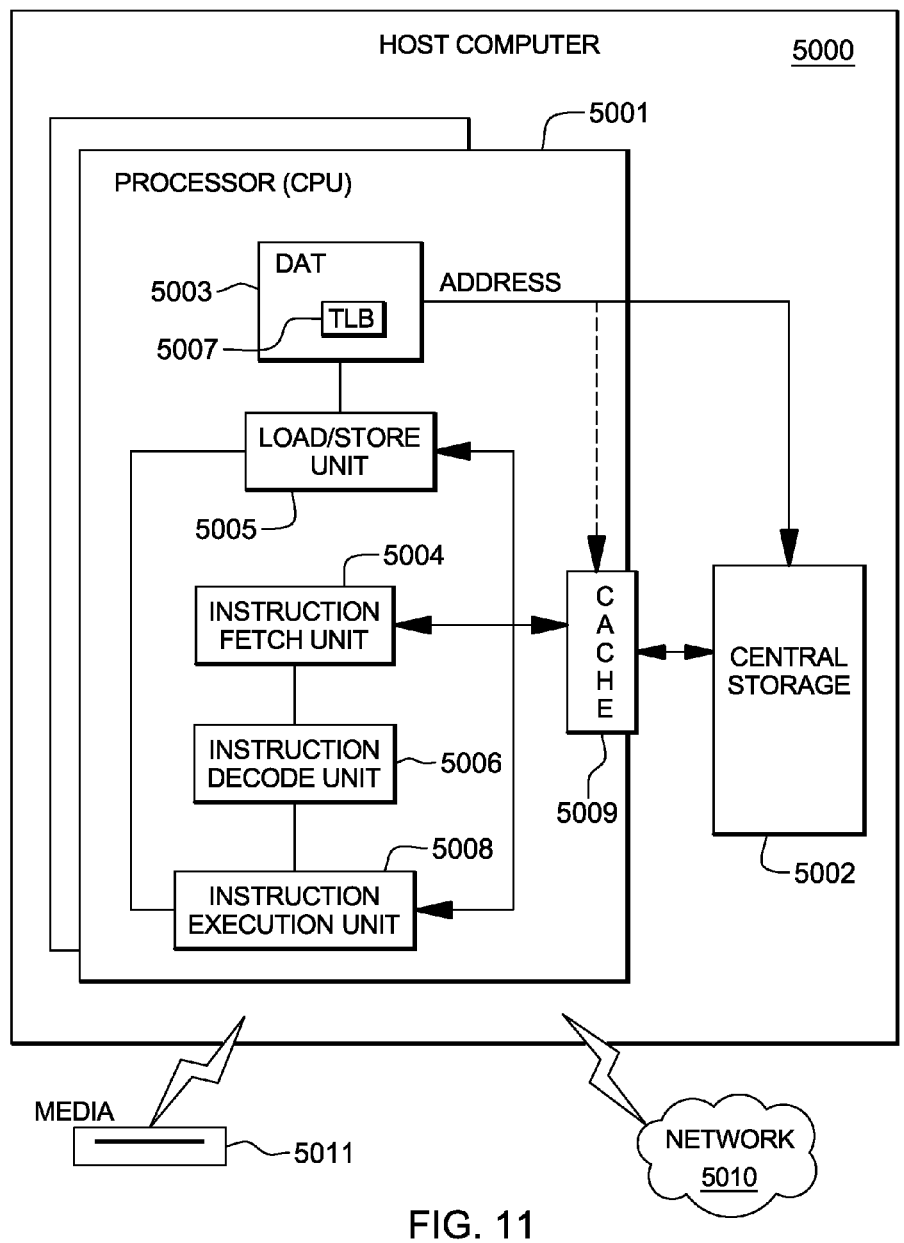
FIG. 11 depicts one embodiment of a host computer system to incorporate and use one or more aspects of the present invention.

Referring to FIG. 11, representative components of a Host Computer system 5000 to implement one or more aspects of the present invention are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture®). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with the present invention). Referring to FIG. 11, software program code which embodies the present invention is typically accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 12:
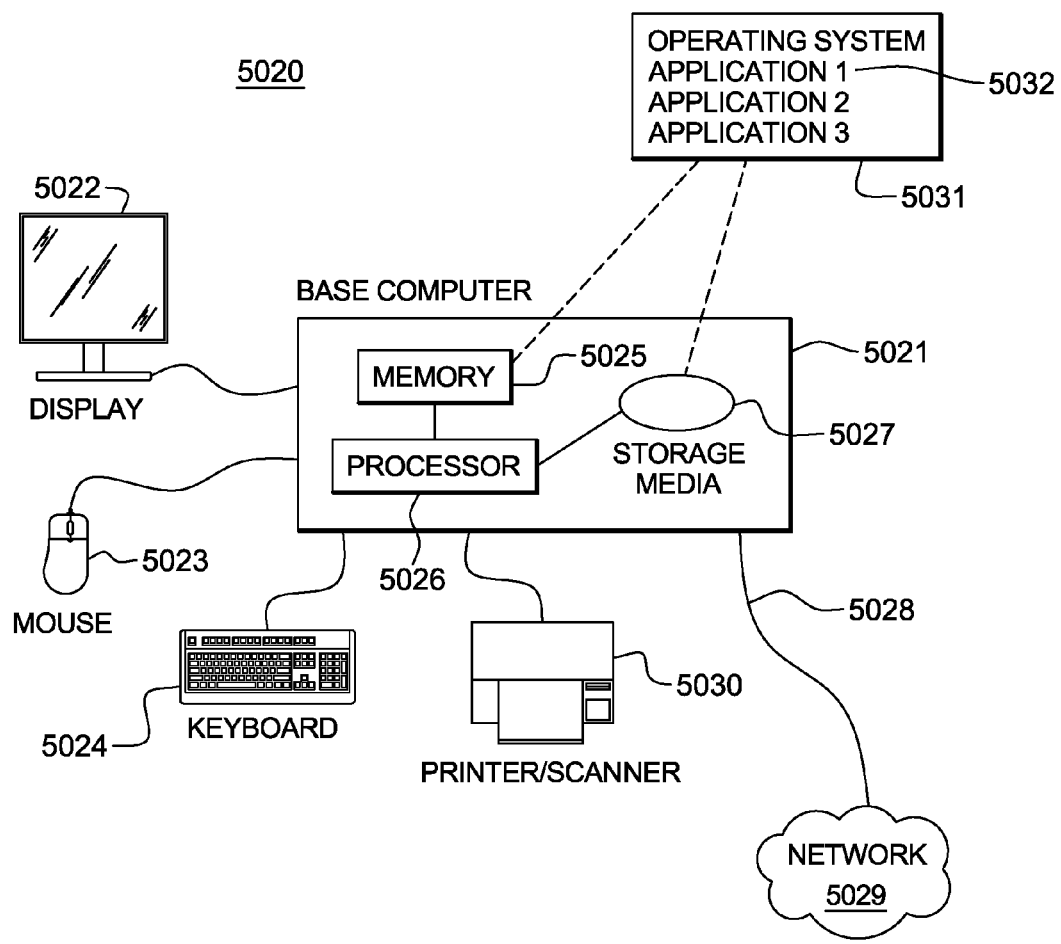
FIG. 12 depicts a further example of a computer system to incorporate and use one or more aspects of the present invention.

FIG. 12 illustrates a representative workstation or server hardware system in which the present invention may be practiced. The system 5020 of FIG. 12 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 13:
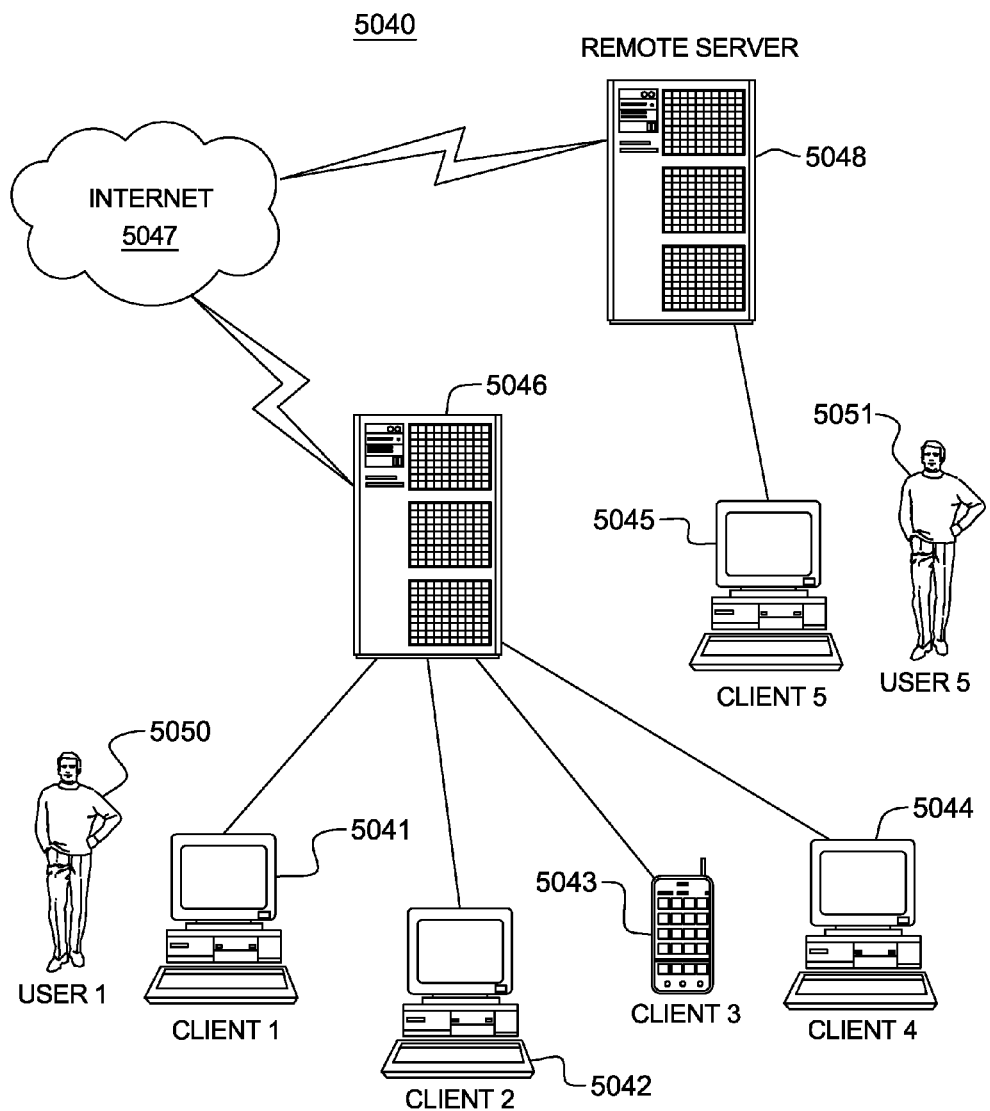
FIG. 13 depicts another example of a computer system comprising a computer network to incorporate and use one or more aspects of the present invention.

FIG. 13 illustrates a data processing network 5040 in which the present invention may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 13, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z® server available from International Business Machines Corporation.

Referring concurrently to FIG. 12 and FIG. 13, software programming code which may embody the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 14:
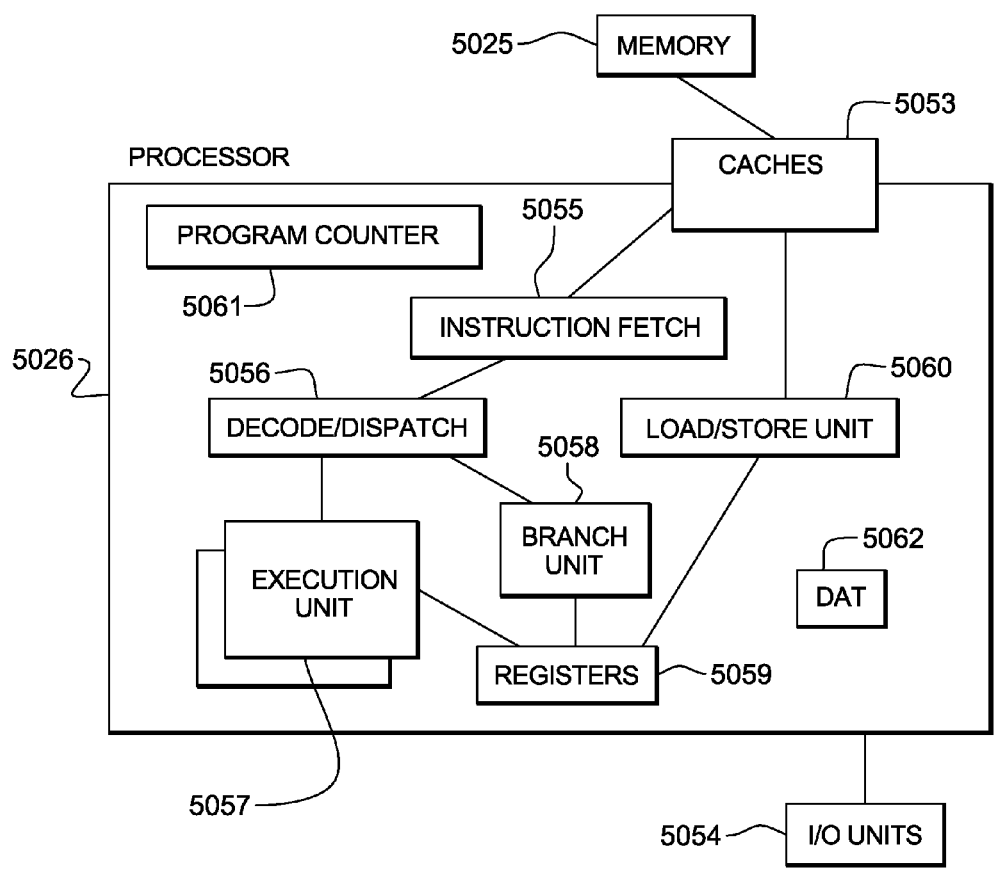
FIG. 14 depicts one embodiment of various elements of a computer system to incorporate and use one or more aspects of the present invention.

Referring to FIG. 14, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 15A:
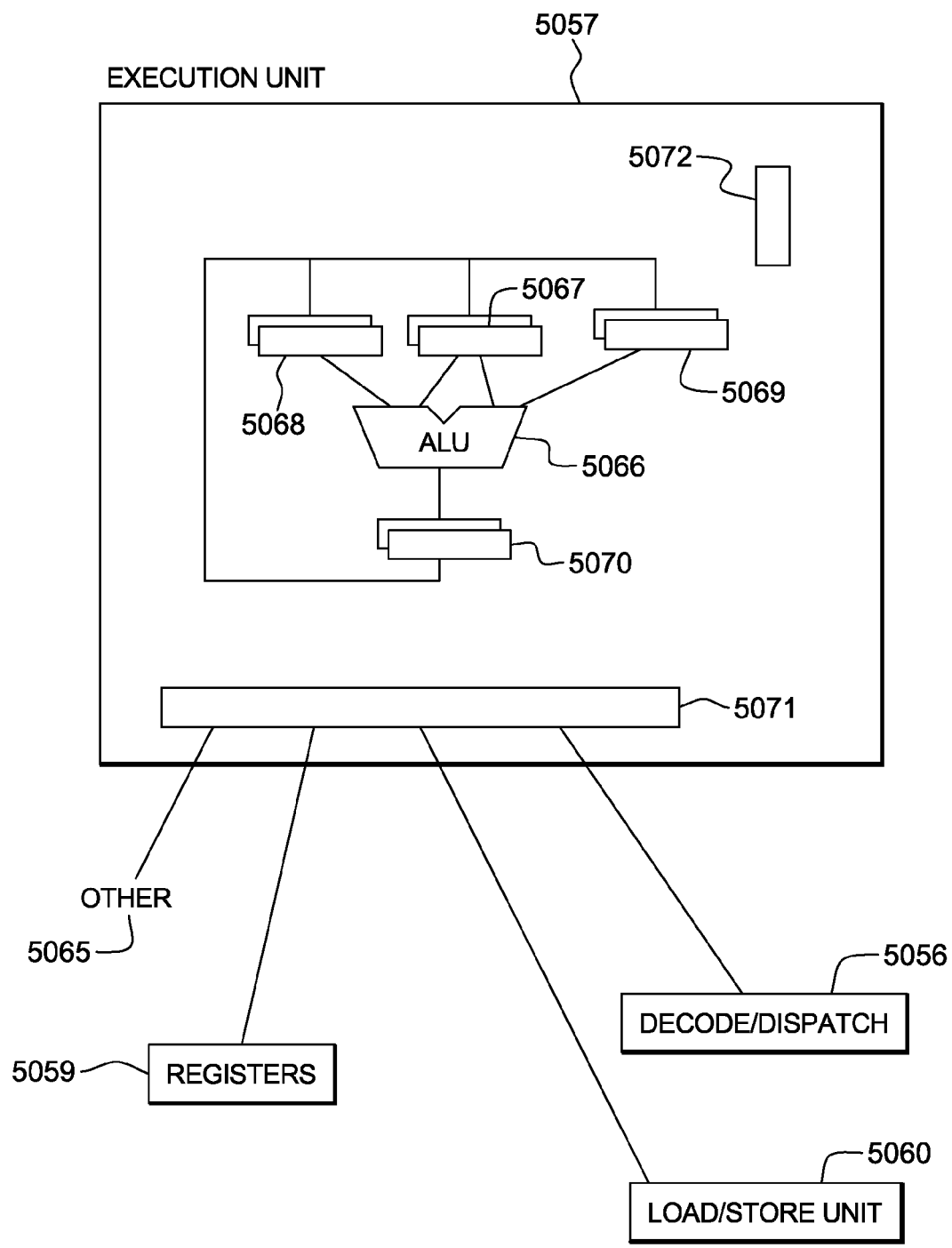
FIG. 15A depicts one embodiment of the execution unit of the computer system of FIG. 14 to incorporate and use one or more aspects of the present invention.

A processor 5026 typically has one or more units 5057, 5058, 5060 for executing the function of the instruction. Referring to FIG. 15A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 15B:
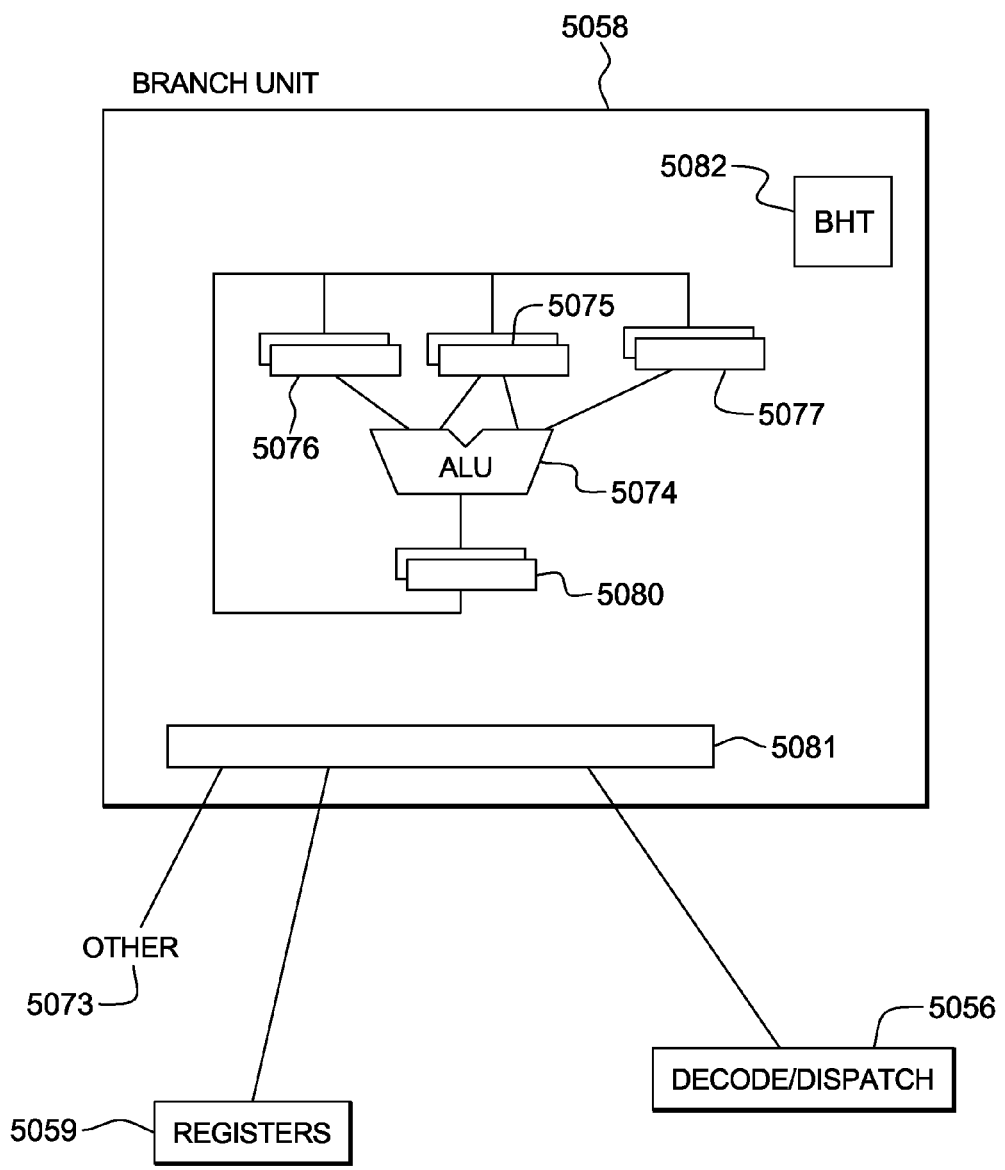
FIG. 15B depicts one embodiment of the branch unit of the computer system of FIG. 14 to incorporate and use one or more aspects of the present invention.
Figure 15C:
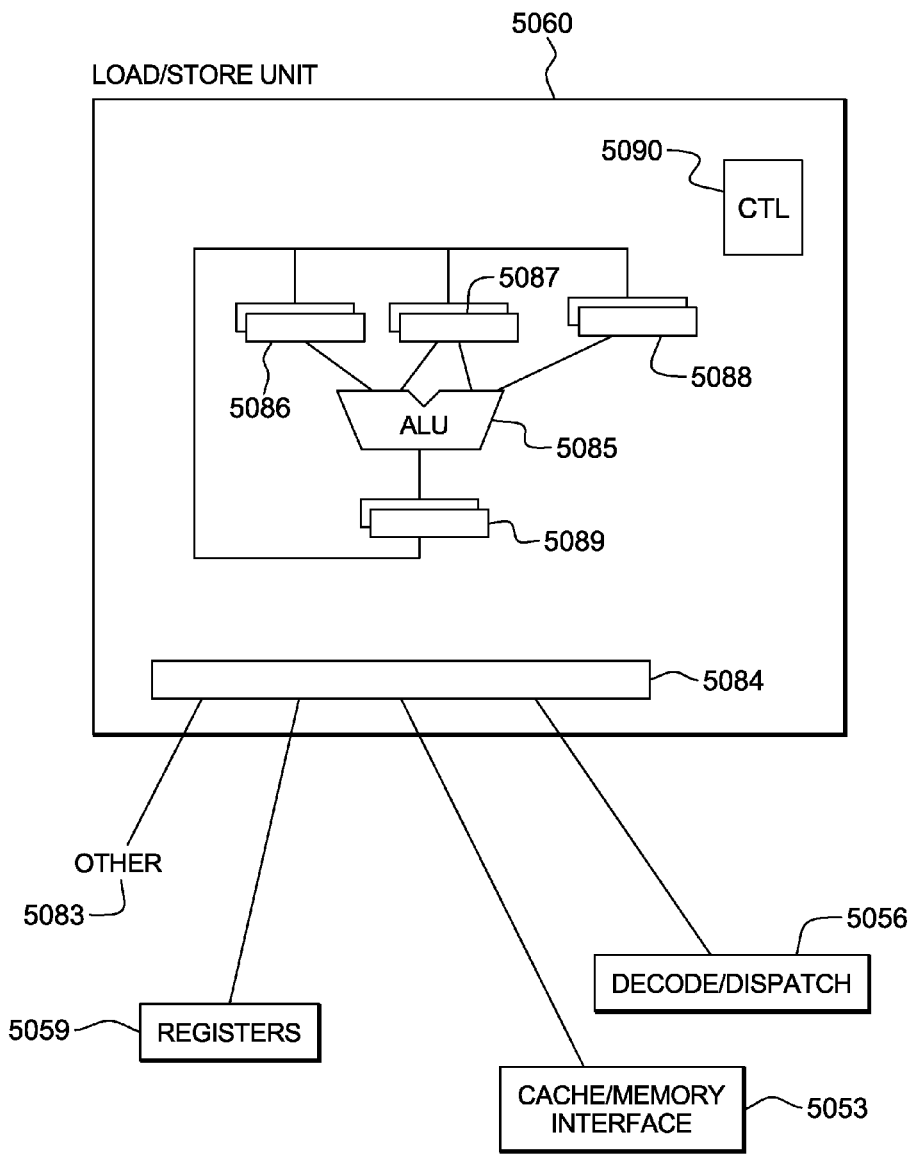
FIG. 15C depicts one embodiment of the load/store unit of the computer system of FIG. 14 to incorporate and use one or more aspects of the present invention.

Referring to FIG. 15B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Referring to FIG. 16C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 14) provide the processor with means for attaching to peripheral devices including tape, disc, printers, displays, and networks for example. I/O units are often presented to the computer program by software drivers. In mainframes, such as the System z® from IBM®, channel adapters and open system adapters are I/O units of the mainframe that provide the communications between the operating system and peripheral devices.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture®, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 16:
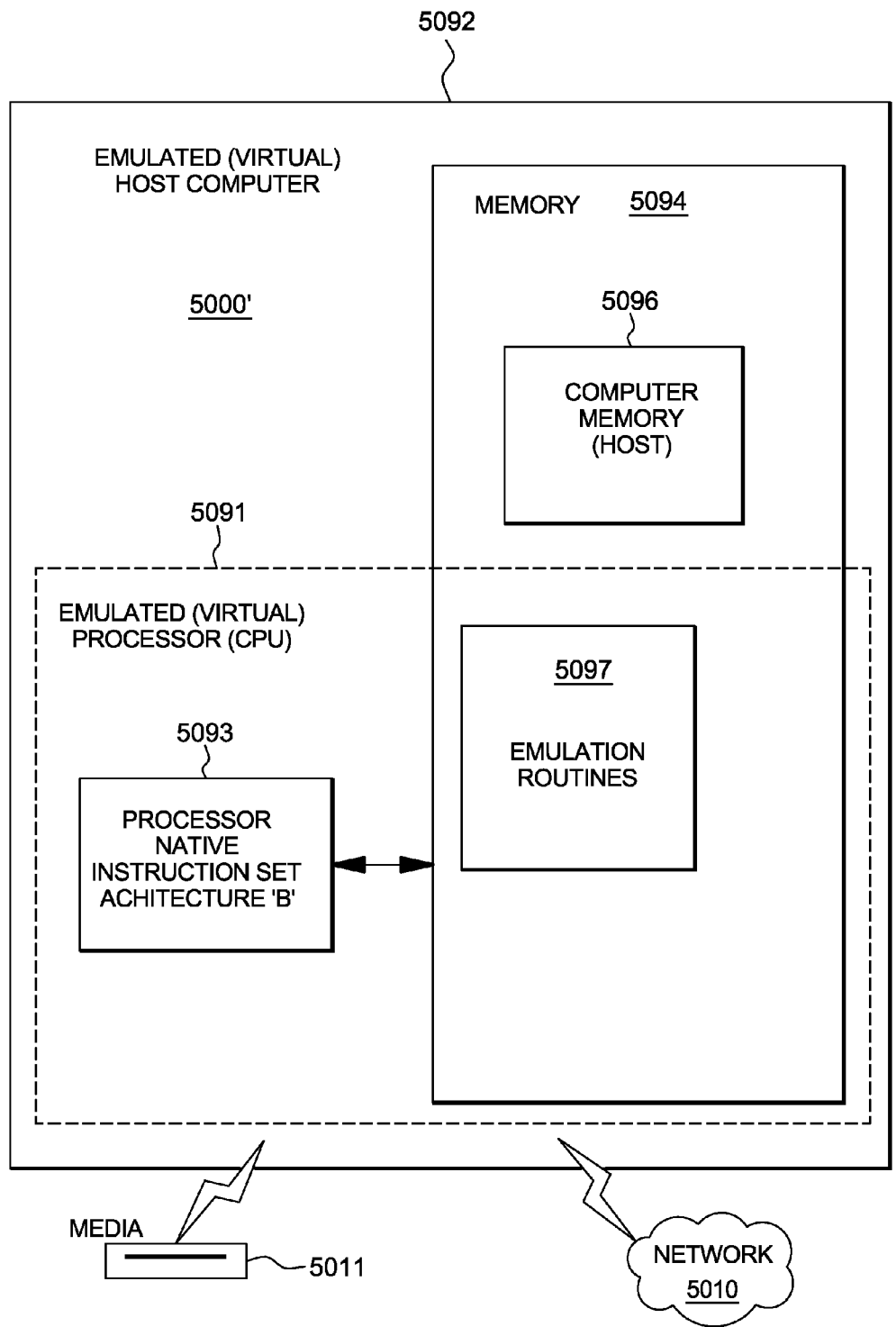
FIG. 16 depicts one embodiment of an emulated host computer system to incorporate and use one or more aspects of the present invention.

In FIG. 16, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for executing a Start Subchannel instruction in a computing environment comprising main storage and storage class memory, said computer program product comprising:
a non-transitory computer readable storage medium readable by a processing circuit and storing instructions for execution by the processing circuit for performing a method comprising:
based on determining that a subchannel identified by the Start Subchannel instruction is an Asynchronous Data Mover (ADM) subchannel, performing:
obtaining an operation request block from main storage, the operation request block comprising an address of an operation block;
based on the address of the operation block, obtaining the operation block from main storage, the operation block consisting of a request block, a response block, and one or more first move specification blocks (MSBs), wherein the request block comprises an MSB count field having a value indicating a number of MSBs associated with a request associated with the operation request block, wherein the response block is configured to hold exception conditions, wherein each first move specification block is configured to include a first operation code field, a first block count field, a first main storage address field, a first storage class memory address field, a first block size field and a first flags field;
obtaining a first move specification block of the one or more first move specification blocks, wherein the first flags field of the first move specification block comprises a branch-to-next MSB (BNM) indicator;
based on the BNM indicator having a first BNM value, performing an operation based on a first operation code in the obtained first move specification block, the operation being performed on a number of blocks of storage class memory of a size determined by the first block size field, wherein the number of blocks is determined from the first block count field; and
based on the BNM indicator having a second BNM value:
branching to a second non-contiguous MSB located at an address specified by the first main storage address field of the first MSB, wherein the second MSB comprises a second block size field, a second block count field and a second operation code; and
performing an operation based on the second operation code in the obtained second MSB, the operation being performed on a number of blocks of storage class memory of a size determined by the second block size field, wherein the number of blocks is determined from the second block count field.

2. The computer program product of claim 1, wherein the method further comprises:
based on determining that all of the first MSBs in the operation block have not been used based on the value indicating the number of one or more first MSBs that are included in the operation, repeating the method using a next first MSB beginning with the obtaining the first MSB operation.

3. The computer program product of claim 1, wherein based on the first operation code or the second operation code being set to a first value, the performing comprises performing a read operation in which the blocks of data are moved from storage class memory to main storage.

4. The computer program product of claim 1, wherein based on the first operation code or the second operation code being set to a second value, the performing comprises performing a write operation in which the blocks of data are moved from main storage to storage class memory.

5. The computer program product of claim 1, wherein based on the first operation code or the second operation code being set to a third value, the performing comprises performing a clear operation.

6. The computer program product of claim 1, wherein based on the first operation code or the second operation code being set to a fourth value, the performing comprises performing a release operation.

7. The computer program product of claim 1, wherein the size designated in the first block size field or second block size field is either 4K-byte or 1M-byte.

8. The computer program product of claim 1, wherein the method further comprises generating one or more status conditions, based on completion of the operation, the one or more status conditions accessible to an issuer of the Start Subchannel instruction.

9. The computer program product of claim 1, wherein the response block is configured to indicate one or more errors and is populated based on an error condition detected during execution of the operation.

10. The computer program product of claim 1, wherein based on the BNM indicator having the second BNM value, the first operation code field, the first block size field, the first block count field and the first storage class memory address field have no meaning.

11. A computer system for executing a Start Subchannel instruction in a computing environment comprising main storage and storage class memory, said computer system comprising:
a memory; and
a processor in communications with the memory, wherein the computer system is configured to perform a method, said method comprising:
based on determining that a subchannel identified by the Start Subchannel instruction is an Asynchronous Data Mover (ADM) subchannel, performing:
obtaining an operation request block from main storage, the operation request block comprising an address of an operation block;
based on the address of the operation block, obtaining the operation block from main storage, the operation block consisting of a request block, a response block, and one or more first move specification blocks (MSBs), wherein the request block comprises an MSB count field having a value indicating a number of MSBs associated with a request associated with the operation request block, wherein the response block is configured to hold exception conditions, wherein each first move specification block is configured to include a first operation code field, a first block count field, a first main storage address field, a first storage class memory address field, a first block size field and a first flags field;
obtaining a first move specification block of the one or more first move specification blocks, wherein the first flags field of the first move specification block comprises a branch-to-next MSB (BNM) indicator;

based on the BNM indicator having a first BNM value, performing an operation based on a first operation code in the obtained first move specification block, the operation being performed on a number of blocks of storage class memory of a size determined by the first block size field, wherein the number of blocks is determined from the first block count field; and based on the BNM indicator having a second BNM value:
  branching to a second non-contiguous MSB located at an address specified by the first main storage address field of the first MSB, wherein the second MSB comprises a second block size field, a second block count field and a second operation code; and
  performing an operation based on the second operation code in the obtained second MSB, the operation being performed on a number of blocks of storage class memory of a size determined by the second block size field, wherein the number of blocks is determined from the second block count field.

12. The computer system of claim 11, wherein the method further comprises:
  based on determining that all of the first MSBs in the operation block have not been used based on the value indicating the number of one or more first MSBs that are included in the operation, repeating the method using a next first MSB beginning with the obtaining the first MSB operation.

13. The computer system of claim 11, wherein based on the first operation code or the second operation code being set to a first value, the performing comprises performing a read operation in which the blocks of data are moved from storage class memory to main storage.

14. The computer system of claim 11, wherein based on the first operation code or the second operation code being set to a second value, the performing comprises performing a write operation in which the blocks of data are moved from main storage to storage class memory.

15. The computer system of claim 11, wherein based on the first operation code or the second operation code being set to a third value, the performing comprises performing a clear operation.

16. The computer system of claim 11, wherein based on the first operation code or the second operation code being set to a fourth value, the performing comprises performing a release operation.

17. The computer system of claim 11, wherein the method further comprises generating one or more status conditions, based on completion of the operation, the one or more status conditions accessible to an issuer of the Start Subchannel instruction.

* * * * *